(12) United States Patent
Kitamura et al.

(10) Patent No.: US 10,855,982 B2
(45) Date of Patent: Dec. 1, 2020

(54) IMAGE PROCESSING APPARATUS AND METHOD

(71) Applicant: SONY CORPORATION, Tokyo (JP)

(72) Inventors: Takuya Kitamura, Tokyo (JP); Nobuo Ueki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/342,423

(22) PCT Filed: Nov. 28, 2017

(86) PCT No.: PCT/JP2017/042533
§ 371 (c)(1),
(2) Date: Apr. 16, 2019

(87) PCT Pub. No.: WO2018/110270
PCT Pub. Date: Jun. 21, 2018

(65) Prior Publication Data
US 2019/0289286 A1 Sep. 19, 2019

(30) Foreign Application Priority Data
Dec. 12, 2016 (JP) ................. 2016-240353

(51) Int. Cl.
H04N 19/58 (2014.01)
H04N 19/105 (2014.01)
(Continued)

(52) U.S. Cl.
CPC ........... H04N 19/105 (2014.11); H04N 19/11 (2014.11); H04N 19/114 (2014.11);
(Continued)

(58) Field of Classification Search
CPC .... H04N 19/58; H04N 19/105; H04N 19/172; H04N 19/159
See application file for complete search history.

(56) References Cited

U.S. PATENT DOCUMENTS 6,052,417 A * 4/2000 Fujiwara ............. H04N 19/503
375/240.12
2009/0257485 A1 10/2009 Youn
(Continued)

FOREIGN PATENT DOCUMENTS

CN 101562749 A 10/2009
CN 106464886 A 2/2017
(Continued)

OTHER PUBLICATIONS

International Search Report and Written Opinion of PCT Application No. PCT/JP2017/042533, dated Feb. 13, 2018, 10 pages of ISRWO.

Primary Examiner — Tsion B Owens
(74) Attorney, Agent, or Firm — Chip Law Group

(57) ABSTRACT

The present disclosure relates to image processing apparatus and method intended to be capable of suppressing deterioration in image quality. [Solution] A predicated image is generated using inter-prediction and constrained intra-prediction, the inter-prediction using as a reference image an image of a past frame processed before a current frame, the constrained intra-prediction using no neighboring pixels subjected to inter-prediction, the image of the past frame being encoded, stored in a frame memory, read from the frame memory, and then decoded. The present disclosure is applicable to, in one example, an image processing apparatus, an image coding apparatus, or the like.

18 Claims, 42 Drawing Sheets

(51) Int. Cl.
*H04N 19/159* (2014.01)
*H04N 19/172* (2014.01)
*H04N 19/137* (2014.01)
*H04N 19/11* (2014.01)
*H04N 19/426* (2014.01)
*H04N 19/114* (2014.01)
*H04N 19/14* (2014.01)

(52) U.S. Cl.
CPC ........... *H04N 19/137* (2014.11); *H04N 19/14* (2014.11); *H04N 19/159* (2014.11); *H04N 19/172* (2014.11); *H04N 19/426* (2014.11); *H04N 19/58* (2014.11)

(56) References Cited

U.S. PATENT DOCUMENTS

2016/0219273 A1* 7/2016 Pettersson .............. H04N 19/70
2016/0373740 A1* 12/2016 Nagumo .............. H04N 19/503

FOREIGN PATENT DOCUMENTS

| EP | 0874525 A2 | 10/1998 |
| JP | 10-304374 A | 11/1998 |
| JP | 2009-260977 A | 11/2009 |
| JP | 2017-525175 A | 8/2017 |
| WO | 2015/133320 A1 | 9/2015 |
| WO | 2015/192989 A1 | 12/2015 |

\* cited by examiner

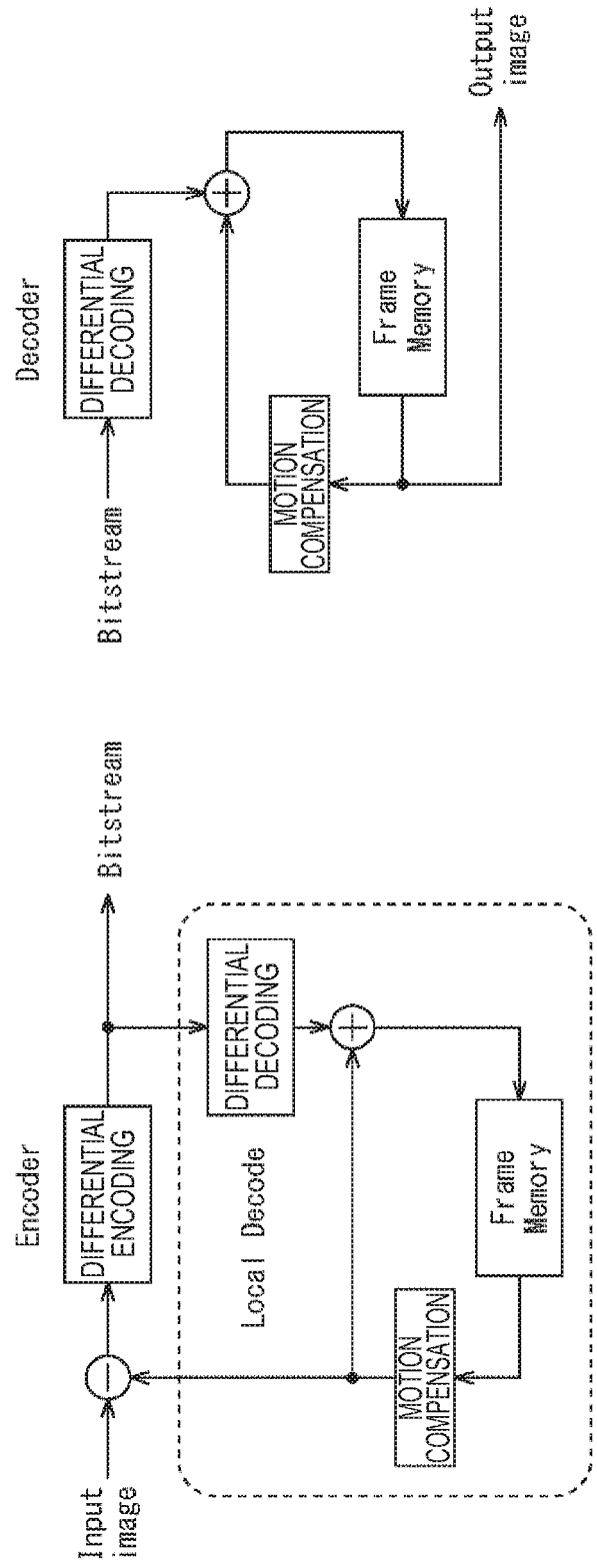

| | Descriptor |
|---|---|
| slice_segment_header() { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ){ | |
|     if( dependent_slice_segments_enabled_flag ) | |
|       dependent_slice_segment_flag | ue(v) |
|     slice_segment_address | ue(v) |
|   } | |
|   if( !dependent_slice_segment_flag ) { | |
|     for( i = 0; i < num_extra_slice_header_bits; i++ ) | |
|       slice_reserved_flag[i] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( nal_unit_type != IDR_W_RADL && nal_unit_type != IDR_N_LP ) { | |
|       slice_pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |
|         num_long_term_pics | ue(v) |
|         for( i = 0; i < num_long_term_sps + num_long_term_pics; i++ ){ | |
|           if( i < num_long_term_sps ){ | |
|             if( num_long_term_ref_pics_sps > 1 ) | |
|               lt_idx_sps[i] | u(v) |
|           } else { | |
|             poc_lsb_lt[i] | u(v) |
|             used_by_curr_pic_lt_flag[i] | u(1) |
|           } | |
|           delta_poc_msb_present_flag[i] | u(1) |
|           if( delta_poc_msb_present_flag[i] ) | |
|             delta_poc_msb_cycle_lt[i] | ue(v) |
|         } | |
|       } | |
|       if( sps_temporal_mvp_enabled_flag ) | |
|         slice_temporal_mvp_enabled_flag | u(1) |
|     } | |

(The bracketed region on the right is labeled 502.)

FIG. 31

| | C | Descriptor |
|---|---|---|
| slice_header( ) { | | |
| first_mb_in_slice | 2 | ue(v) |
| slice_type | 2 | ue(v) |
| pic_parameter_set_id | 2 | ue(v) |
| frame_num | 2 | u(v) |
| if( !frame_mbs_only_flag ) { | | |
|   field_pic_flag | 2 | u(1) |
|   if( field_pic_flag ) | | |
|     bottom_field_flag | 2 | u(1) |
| } | | |
| if( nal_unit_type == 5 ) | | |
|   idr_pic_id | 2 | ue(v) |
| if( pic_order_cnt_type == 0 ) { | | |
|   pic_order_cnt_lsb | 2 | u(v) |
|   if( pic_order_present_flag && !field_pic_flag ) | | |
|     delta_pic_order_cnt_bottom | 2 | se(v) |
| } | | |
| if( pic_order_cnt_type == 1 && !delta_pic_order_always_zero_flag ) { | | |
|   delta_pic_order_cnt[ 0 ] | 2 | se(v) |
|   if( pic_order_present_flag && !field_pic_flag ) | | |
|     delta_pic_order_cnt[ 1 ] | 2 | se(v) |
| } | | |
| if( redundant_pic_cnt_present_flag ) | | |
|   redundant_pic_cnt | 2 | ue(v) |
| if( slice_type == B ) | | |
|   direct_spatial_mv_pred_flag | 2 | u(1) |
| if( slice_type == P || slice_type == SP || slice_type == B ) { | | |
|   num_ref_idx_active_override_flag | 2 | u(1) |
|   if( num_ref_idx_active_override_flag ) { | | |
|     num_ref_idx_l0_active_minus1 | 2 | ue(v) |
|     if( slice_type == B ) | | |
|       num_ref_idx_l1_active_minus1 | 2 | ue(v) |
|   } | | |
| } | | |
| ref_pic_list_reordering( ) | | |
| if( ( weighted_pred_flag && ( slice_type == P || slice_type == SP ) ) || | | |
|   ( weighted_bipred_idc == 1 && slice_type == B ) ) | | |
|   pred_weight_table( ) | | |
| if( nal_ref_idc != 0 ) | | |
|   dec_ref_pic_marking( ) | 2 | |
| if( entropy_coding_mode_flag && slice_type != I && slice_type != SI ) | | |
|   cabac_init_idc | 2 | ue(v) |
| slice_qp_delta | 2 | se(v) |
| if( slice_type == SP || slice_type == SI ) { | | |
|   if( slice_type == SP ) | | |
|     sp_for_switch_flag | 2 | u(1) |
|   slice_qs_delta | 2 | se(v) |

— 503

| | | |
|---|---|---|
| if( deblocking_filter_control_present_flag ) { | | |
|   disable_deblocking_filter_idc | 2 | ue(v) |
|   if( disable_deblocking_filter_idc != 1 ) { | | |
|     slice_alpha_c0_offset_div2 | 2 | se(v) |
|     slice_beta_offset_div2 | 2 | se(v) |
|   } | | |
| } | | |
| if( num_slice_groups_minus1 > 0 && | | |
|   slice_group_map_type >= 3 && slice_group_map_type <= 5) | | |
|   slice_group_change_cycle | 2 | u(v) |
| } | | |

Constrained Intra Prediction

|  | UPPER RIGHT BLOCK INTRA-PREDICTION |
|---|---|
| UPPER BLOCK INTRA-PREDICTION | NOT USED |
|  | CURRENT BLOCK INTRA-PREDICTION |
| UPPER LEFT BLOCK INTRA-PREDICTION | |
| LEFT BLOCK INTER-PREDICTION | NOT USED |
| LOWER LEFT BLOCK INTER-PREDICTION | |

HEVC: VALUE OF PIXEL OF INTER-PREDICTED BLOCK IS FILLED WITH VALUE OF NEIGHBORING PIXELS OF INTRA-PREDICTION
AVC: DC PREDICTION IS PERFORMED IN CASE OF PRESENCE OF INTER-PREDICTED BLOCK

FIG. 40

| pic_parameter_set_rbsp( ) { | Descriptor |
|---|---|
| pps_pic_parameter_set_id | ue(v) |
| pps_seq_parameter_set_id | ue(v) |
| dependent_slice_segments_enabled_flag | u(1) |
| output_flag_present_flag | u(1) |
| num_extra_slice_header_bits | u(3) |
| sign_data_hiding_enabled_flag | u(1) |
| cabac_init_present_flag | u(1) |
| num_ref_idx_l0_default_active_minus1 | ue(v) |
| num_ref_idx_l1_default_active_minus1 | ue(v) |
| init_qp_minus26 | se(v) |
| constrained_intra_pred_flag | u(1) — 551 |
| transform_skip_enabled_flag | u(1) |
| cu_qp_delta_enabled_flag | u(1) |
| if( cu_qp_delta_enabled_flag ) | |
|   diff_cu_qp_delta_depth | ue(v) |
| pps_cb_qp_offset | se(v) |
| pps_cr_qp_offset | se(v) |
| pps_slice_chroma_qp_offsets_present_flag | u(1) |
| weighted_pred_flag | u(1) |
| weighted_bipred_flag | u(1) |
| transquant_bypass_enabled_flag | u(1) |
| tiles_enabled_flag | u(1) |
| entropy_coding_sync_enabled_flag | u(1) |
| if( tiles_enabled_flag ) { | |
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width_minus1[ i ] | ue(v) |
|     for( i = 0; i < num_tile_rows_minus1; i++ ) | |
|       row_height_minus1[ i ] | ue(v) |
|     loop_filter_across_tiles_enabled_flag | u(1) |
| pps_loop_filter_across_slices_enabled_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |

FIG. 41

IMAGE PROCESSING APPARATUS AND METHOD

CROSS REFERENCE TO RELATED APPLICATIONS

This application is a U.S. National Phase of International Patent Application No. PCT/JP2017/042533 filed on Nov. 28, 2017, which claims priority benefit of Japanese Patent Application No. JP 2016-240353 filed in the Japan Patent Office on Dec. 12, 2016. Each of the above-referenced applications is hereby incorporated herein by reference in its entirety.

TECHNICAL FIELD

The present disclosure relates to image processing apparatuses and methods, and in particular, to an image processing apparatus and method capable of suppressing deterioration in image quality.

Background Art

In a case of implementing image coding by hardware, in many cases, a frame memory used to save a reference frame is typically mounted as an external dynamic random-access memory (DRAM) chip separated from large-scale integration (LSI) for coding. In such a frame memory, it is necessary to save a plurality of reference frames or to have high-speed access capability in processing such as motion estimation (ME) or motion compensation (MC), which necessitates sufficient high data storage capacity and sufficiently wide data input or output band.

However, the recent increase in the capacity of image data or 4K televisions has a tendency to increase the data amount to be handled by an image coder. Accordingly, external DRAM chips are necessary to have higher capacity and wider band, which is one of causes for increase in product cost.

In view of this, techniques for compressing and storing image data are conceived (e.g., refer to Non-Patent Literature 1 and Non-Patent Literature 2).

CITATION LIST

Non-Patent Literature

Non-Patent Literature 1: "Video Coding Using Compressed Reference Frames" by Madhukar Budagavi and Minhua Zhou Non-Patent Literature 2: "A Lossless Frame Recompression Scheme for Reducing DRAM Power in Video Encoding" by Xuena Bao, Dajiang Zhou, and Satoshi Goto

DISCLOSURE OF INVENTION

Technical Problem

The technique disclosed in Non-Patent Literature 2 however employs lossless compression (lossless coding), so a way of getting access to reference memory is likely to be complicated. In addition, lossless compression is generally likely to provide a lower compression ratio and smaller reduction effects of DRAM capacity or memory access band, as compared with lossy compression (lossy coding). While, the technique disclosed in Non-Patent Literature 1 compresses (lossy coding) the reference data using fixed-length compression, so it is possible to easily perform data input and output to the frame memory.

However, in this case, lossy compression of reference data in decoding of encoded data of an image is similarly necessary to suppress deterioration in image quality. In the case where no lossy compression of reference data is performed unlike a typical HEVC decoder, the deterioration in image quality caused by lossy compression on the encoding side is likely to be accumulated and increased in the temporal direction of the image by a loop of a decoder (decoding processing).

The present disclosure is made in view of such a situation, and it is intended to be capable of suppressing deterioration in image quality.

Solution to Problem

An image processing apparatus according to an aspect of the present technology is an image processing apparatus including: a predicated image generator configured to generate a predicated image using inter-prediction and constrained intra-prediction, the inter-prediction using as a reference image an image of a past frame processed before a current frame, the constrained intra-prediction using no neighboring pixels subjected to inter-prediction, the image of the past frame being encoded, stored in a frame memory, read from the frame memory, and then decoded.

A controller configured to control whether or not constrained intra-prediction is performed as intra-prediction on the basis of an image may further be included.

The controller may control whether or not constrained intra-prediction is performed as intra-prediction on the basis of a distance between a current frame and an I-picture.

The controller may control whether or not constrained intra-prediction is performed as intra-prediction on the basis of an integrated value of coding difficulty levels from an I-picture to a current frame in storing in the frame memory.

A control information generator configured to generate control information relating to the constrained intra-prediction may further be included.

The image of the past frame may be encoded and stored in the frame memory as an image of a long-term reference frame or a short-term reference frame, and the predicted image generator may be configured to generate the predicated image using inter-prediction and the constrained intra-prediction, the inter-prediction using as a reference image an image of the long-term reference frame or the short-term reference frame, which is decoded after being read from the frame memory.

The long-term reference frame may be updated at a predetermined period longer than the short-term reference frame, and the predicted image generator may be configured to, in the inter-prediction, refer to the image of the long-term reference frame in a case where a current frame is a frame having an interval of the period and refer to the image of the short-term reference frame in a case where a current frame is an other frame.

The predicted image generator, in the case where a current frame is the other frame, may adaptively select whether to refer to the image of the short-term reference frame or to refer to the image of the long-term reference frame.

The predicted image generator may refer to the image of the long-term reference frame in a case where a difference between a current frame and an immediate previous frame is equal to or larger than a difference between the current frame and the long-term reference frame.

A controller configured to control a length of the period may further be included.

The controller may decrease the period in a case where a difference between a current frame and the long-term reference frame is equal to or larger than a predetermined threshold value.

The controller may increase the period in a case where a difference between a current frame and the long-term reference frame is smaller than a predetermined threshold value.

The long-term reference frame may be fixed to an I-picture, and the predicated image generator may be configured to, in the inter-prediction, refer to an image of an I-picture set in the long-term reference frame in a case where a current frame is a frame having an interval of a predetermined period longer than the short-term reference frame and refer to the image of the short-term reference frame in a case where a current frame is an other frame.

The predicted image generator, in the case where a current frame is the other frame, may adaptively select whether to refer to the image of the short-term reference frame or to refer to the image of the I-picture.

The predicted image generator may refer to the image of the I-picture in a case where a difference between a current frame and an immediate previous frame is equal to or larger than a difference between the current frame and the long-term reference frame.

A selection unit configured to adaptively select whether the predicated image generator is configured to, in the inter-prediction, refer to the image of the long-term reference frame being updated at a predetermined period longer than the short-term reference frame in a case where a current frame is a frame having an interval of the period and refer to the image of the short-term reference frame in a case where a current frame is an other frame, or whether the predicated image generator is configured to, in the inter-prediction, refer to an image of an I-picture set in the long-term reference frame being fixed to an I-picture in a case where a current frame is a frame having an interval of a predetermined period longer than the short-term reference frame and refer to the image of the short-term reference frame in a case where a current frame is an other frame may further be included.

The selection unit may perform selection depending on whether or not a difference between a current frame and a long-term reference frame is equal to or larger than a predetermined threshold value.

A controller configured to control whether or not to encode the image of the past frame to be stored in the frame memory, in which the predicted image generator, in a case where the image of the past frame is controlled to be encoded by the controller, is configured to generate the predicated image using inter-prediction and the constrained intra-prediction, the inter-prediction using as a reference image an image of the long-term reference frame or the short-term reference frame, which is decoded after being read from the frame memory may further be included.

A differential image generator configured to generate a differential image between an input image and the predicted image generated by the predicted image generator; a first encoder configured to encode the differential image generated by the differential image generator; a first decoder configured to decode encoded data of the differential image obtained by the first encoder; a second encoder configured to encode decoded image of the differential image obtained by the first decoder; the frame memory storing encoded data of the decoded image obtained by the second encoder as an encoded image of the past frame; and a second decoder configured to decode the encoded image of the past frame read from the frame memory may further be included.

An image processing method according to an aspect of the present technology is an image processing method including: generating a predicated image using inter-prediction and constrained intra-prediction, the inter-prediction using as a reference image an image of a past frame processed before a current frame, the constrained intra-prediction using no neighboring pixels subjected to inter-prediction, the image of the past frame being encoded, stored in a frame memory, read from the frame memory, and then decoded.

In image processing apparatus and method according to an aspect of the present technology, a predicated image is generated using inter-prediction and constrained intra-prediction, the inter-prediction using as a reference image an image of a past frame processed before a current frame, the constrained intra-prediction using no neighboring pixels subjected to inter-prediction, the image of the past frame being encoded, stored in a frame memory, read from the frame memory, and then decoded.

Advantageous Effects of Invention

According to the present disclosure, it is possible to processing an image. In particular, it is possible to suppress deterioration in image quality.

BRIEF DESCRIPTION OF DRAWINGS

FIGS. 1A and 1B are diagrams illustrated to describe an example of image encoding and decoding.

FIG. 29 is a block diagram illustrating an example of syntax in the case of HEVC.

FIG. 30 is a block diagram illustrating an example of syntax in the case of HEVC.

FIG. 31 is a block diagram illustrating an example of syntax in the case of AVC.

FIG. 32 is a block diagram illustrating an example of syntax in the case of AVC.

FIG. 36 is a diagram illustrated to describe an example of constrained intra-prediction.

FIG. 40 is a block diagram illustrating an example of syntax in the case of HEVC.

FIG. 41 is a block diagram illustrating an example of syntax in the case of AVC.

MODE(S) FOR CARRYING OUT THE INVENTION

Figure 2B:
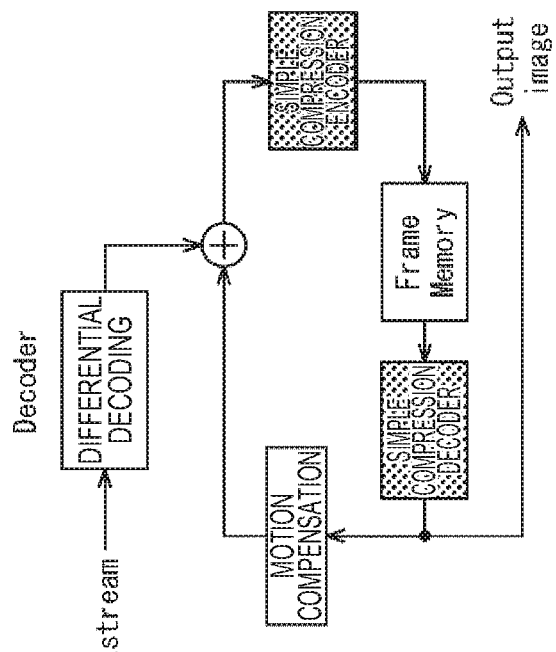
FIGS. 2A and 2B are diagrams illustrated to describe an example of image encoding and decoding using simple compression.

The preferred modes for carrying out the present disclosure (hereinafter referred to as embodiments) are described below. Moreover, the description is given in the following order.

1. Image encoding and decoding using simple encoding
2. First embodiment (image coding device in which GOP structure is controlled)
3. Second embodiment (image coding device using long-term reference frame)
4. Third embodiment (image coding device controlling execution of simple compression)
5. Fourth embodiment (image coding device in HEVC/AVC)
6. Fifth embodiment (image coding device performing constrained intra-prediction)
7. Others

1. Image Encoding and Decoding Using Simple Encoding

Encoding and Decoding of Image

In related art, techniques of compressing image data, transmitting it, and decompressing the transmitted data are considered. This makes it possible to reduce the amount of information at transmission. For such compression and decompression technique of image data, standardization of the specifications for encoding and decoding schemes such as moving picture experts group 2 (MPEG-2), MPEG-4 Part 10 (hereinafter also referred to as advanced video coding, or AVC), and high efficiency video coding (HEVC) has been developed.

In these encoding and decoding schemes, it is possible to refer to an image of a frame processed in the past and to be used for coding of the current frame. In one example, at the time of encoding, a predicted image of an image (input image) of a frame to be processed is generated by "motion compensation", and a differential image between the input image and the predicted image is encoded by "differential encoding" as shown in FIG. 1A. This makes it possible to suppress an increase in the code amounts of the encoded data. Then, the predicted image is generated using an image of the frame processed in the past. This image may be obtained by decoding an image, which is encoded with "differential encoding", by "differential decoding" or the like. Then, the accumulation of the obtained image in "frame memory" makes it possible to refer to it as an image of the past frame.

At the time of decoding, a differential image is obtained by decoding the encoded data by "differential decoding" as shown in FIG. 1B. Then, a predicted image is generated from the image of the frame processed in the past, which is similar to the case of encoding, and a decoded image is generated by adding the resultant image to the differential image. The accumulation of this decoded image in the "frame memory" makes it possible to use it as an image of the past frame for generation of a predicated image.

However, with the recent higher resolution, higher gradation, higher frame rate, or the like of an image, the data amount of an image increases. Thus, the memory capacity or memory bandwidth necessary for the frame memory described above is also increasing, which makes mounting difficult. It is necessary to accumulate image data of one frame or more in the frame memory, so its implementation is often achieved in general by using dynamic random-access memory (DRAM) that has large capacity and inexpensive. However, the increase in the image data amount as described above makes it difficult to read and write data at a rate that the processing is not failed with the bandwidth of a memory bus of DRAM.

Simple Compression and Simple Decompression

Figure 2A:
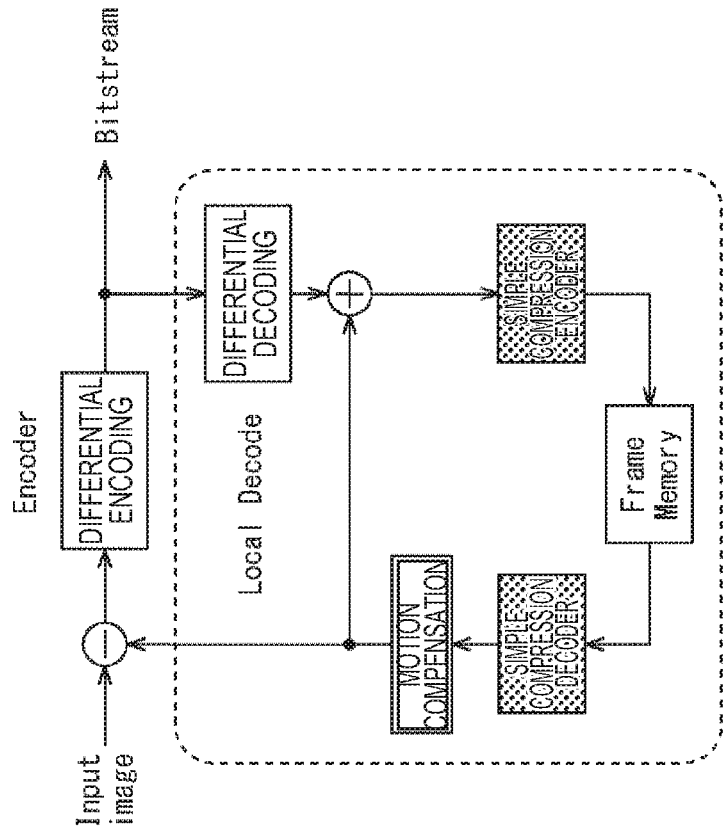

Accordingly, the coding (compression) of image data accumulated in the frame memory is conceived as in the technique disclosed in Patent Literature 1. In one example, in the case of coding, as shown in FIG. 2A, a simple compression encoder encodes (compresses) image data to be accumulated in a frame memory and a simple compression decoder decodes image data (encoded image data (i.e., encoded data of image data)) read from the frame memory. Further, in the case of decoding, similarly, as shown in FIG. 2B, a simple compression encoder encodes (compresses) image data to be accumulated in a frame memory and a simple compression decoder decodes image data (encoded image data (i.e., encoded data of image data)) read from the frame memory. This makes it possible to reduce the data amount to be read or written from or in the frame memory and to implement faster data access (reading and writing), thereby reducing the mounting cost.

Moreover, such encoding and decoding are desirable to be performed in a simpler manner than in the case of encoding and decoding schemes such as AVC or HEVC. In one example, image data is compressed with loss (lossy coding) using fixed-length compression. The use of lossy compression makes it possible to implement highly efficient coding with a simpler manner than in the case of lossless compression. Thus, this makes it possible to perform encoding and decoding at a lower load and at a higher rate. In addition, this makes it possible to facilitate the miniaturization and to reduce the mounting cost. In addition, setting the encoded data to a fixed length makes it possible to manage the encoded data easier. Thus, in one example, even in DRAM or the like that stores the encoded data, this makes it possible to manage the encoded data easier, so it is possible to perform processing such as reading or writing at a higher speed and to achieve implementation at a lower cost.

Such encoding is also referred to as simple encoding (also referred to as simple compression). In addition, decoding corresponding to this simple encoding is also referred to as simple decoding (also referred to as simple decompression). This simple encoding is an image coding technique for reducing the data transfer rate or memory band.

Drift

However, in such a scheme, in a case where no lossy compression of reference data is performed unlike a typical HEVC decoder, the deterioration of image quality caused by lossy compression on the encoding side is likely to be accumulated and increased in the temporal direction of the image by a loop of a decoder (decoding processing). In other words, in the decoded image that is outputted from the decoding side, the deterioration of image quality (also referred to as drift) caused by simple encoding of the image accumulated in the frame memory is likely to be increased.

Figure 3:
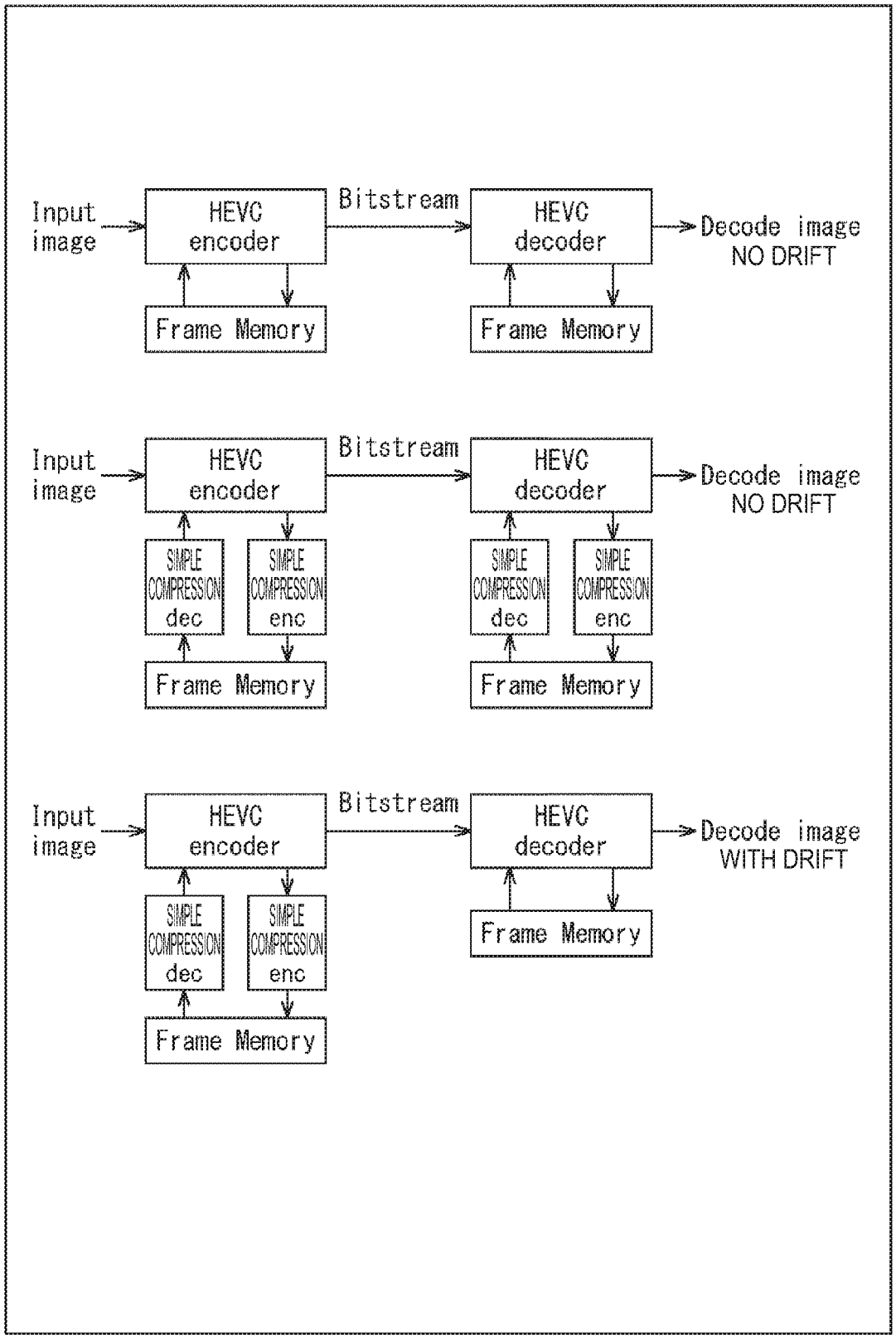
FIG. 3 is a diagram illustrated to describe occurrence of drift.

In one example, as shown in the upper part of FIG. 3, in a case where no simple encoding is performed on images accumulated in the frame memory on both the encoding side and the decoding side, no drift occurs in the decoded image that is outputted from the decoding side. In addition, as shown in the middle part of FIG. 3, even in a case where the simple encoding is performed on the images accumulated in the frame memory on both the encoding side and the decoding side, no drift occurs in the decoded image that is outputted from the decoding side.

On the other hand, as shown in the lower part of FIG. 3, in a case where the simple encoding is performed on the images accumulated in the frame memory only on the encoding side, drift is likely to occur in the decoded image that is outputted from the decoding side.

Figure 4:
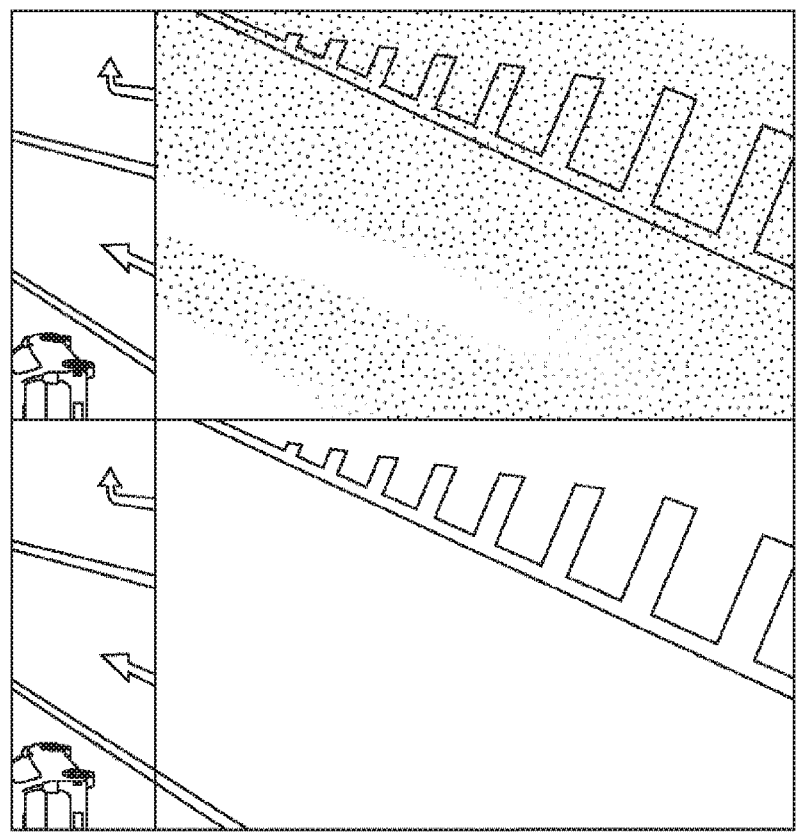
FIG. 4 is a diagram illustrating an example of how drift occurs.
Figure 5:
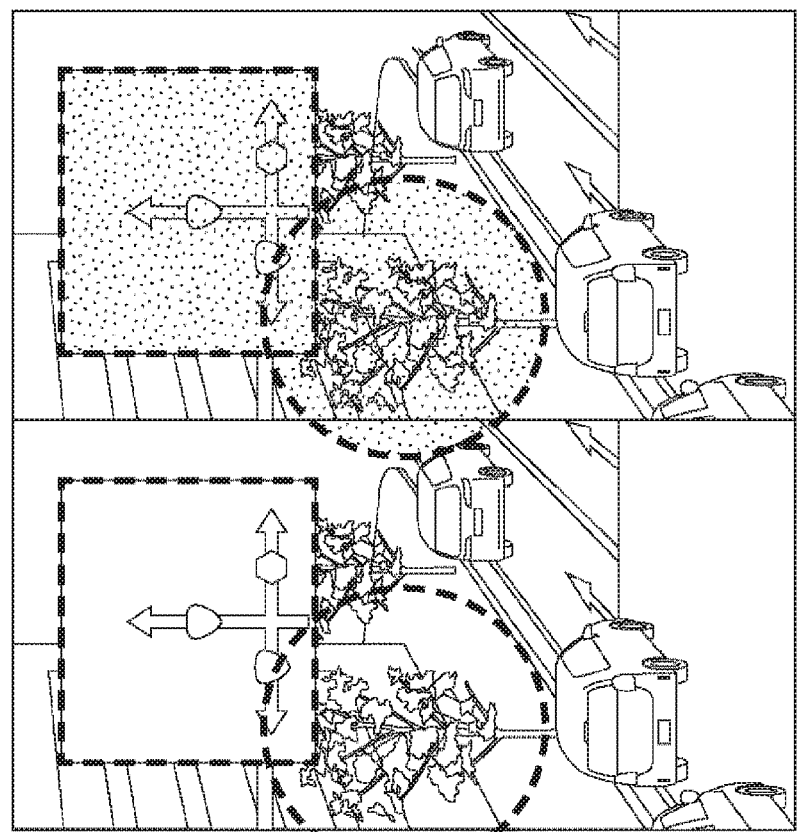
FIG. 5 is a diagram illustrating an example of how drift occurs.

Examples of how the drift occurs are illustrated in FIGS. 4 and 5. In one example, in the case of FIG. 4, drift occurs (generation and increase of noise) in the entire image, and the image on the left side deteriorates in image quality and becomes like the image on the right side. In addition, in one example, in the case of FIG. 5, drift occurs within the dotted line frame, and the image on the left side deteriorates in image quality and becomes like the image on the right side.

Figure 6:
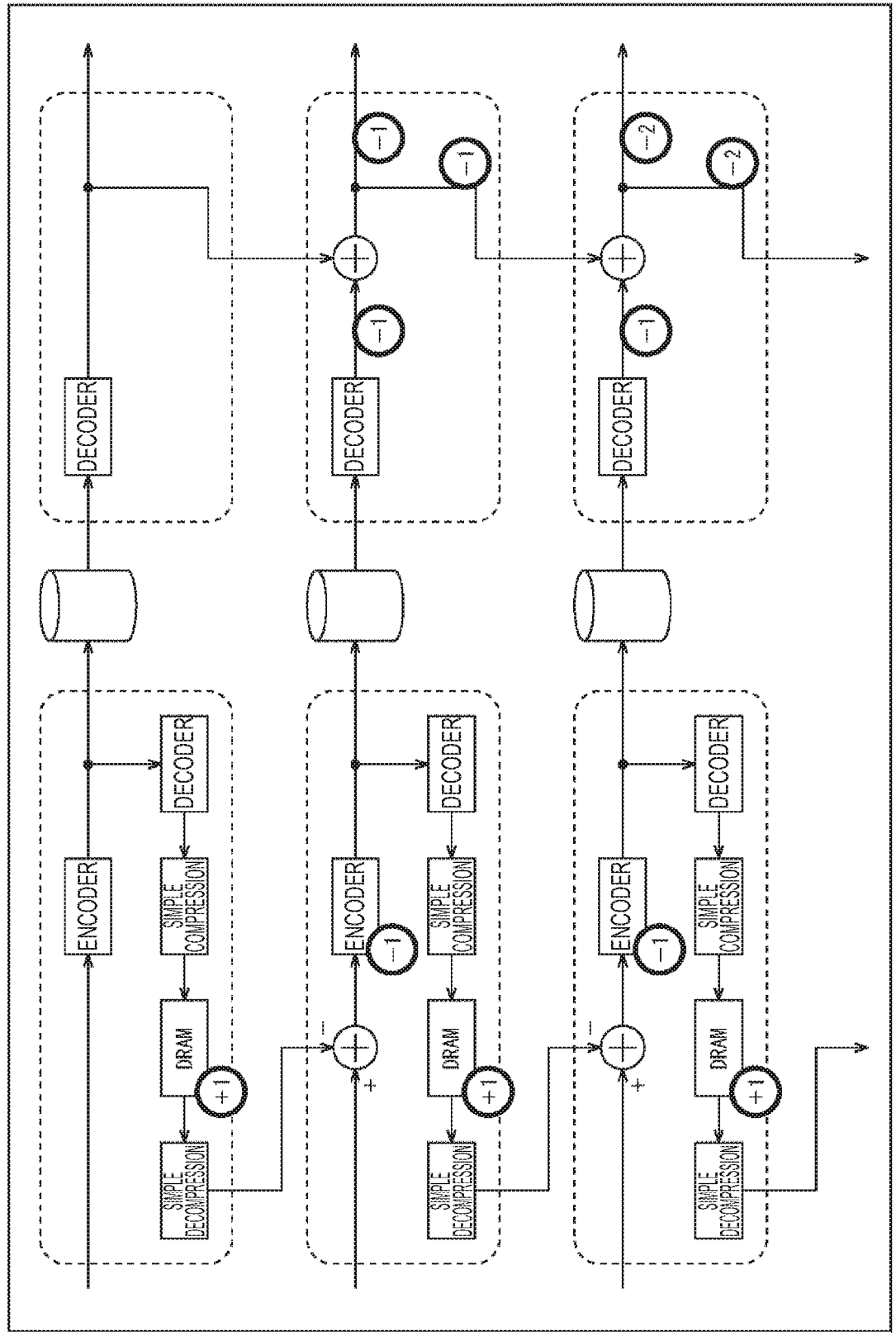
FIG. 6 is a diagram illustrated to describe an example of how drift occurs.

Such drift occurs, in one example, in the example of FIG. 6. On the decoding side, image quality deterioration (+1) occurs every time by simple compression, but it is corrected by addition of a predicated image in a decoder, so deterioration of image quality does not increase. On the other hand, unless simple decompression is performed on the decoding side, image quality deterioration (−1) will be accumulated and increased for each loop.

2. First Embodiment

Control of GOP Structure

Thus, the length (number of frames) of group of picture (GOP) for coding the image data is controlled to be a length so that drift is suppressed. In one example, the interval between I-pictures is controlled to be a length for suppressing drift.

Image Coding Device

Figure 7:
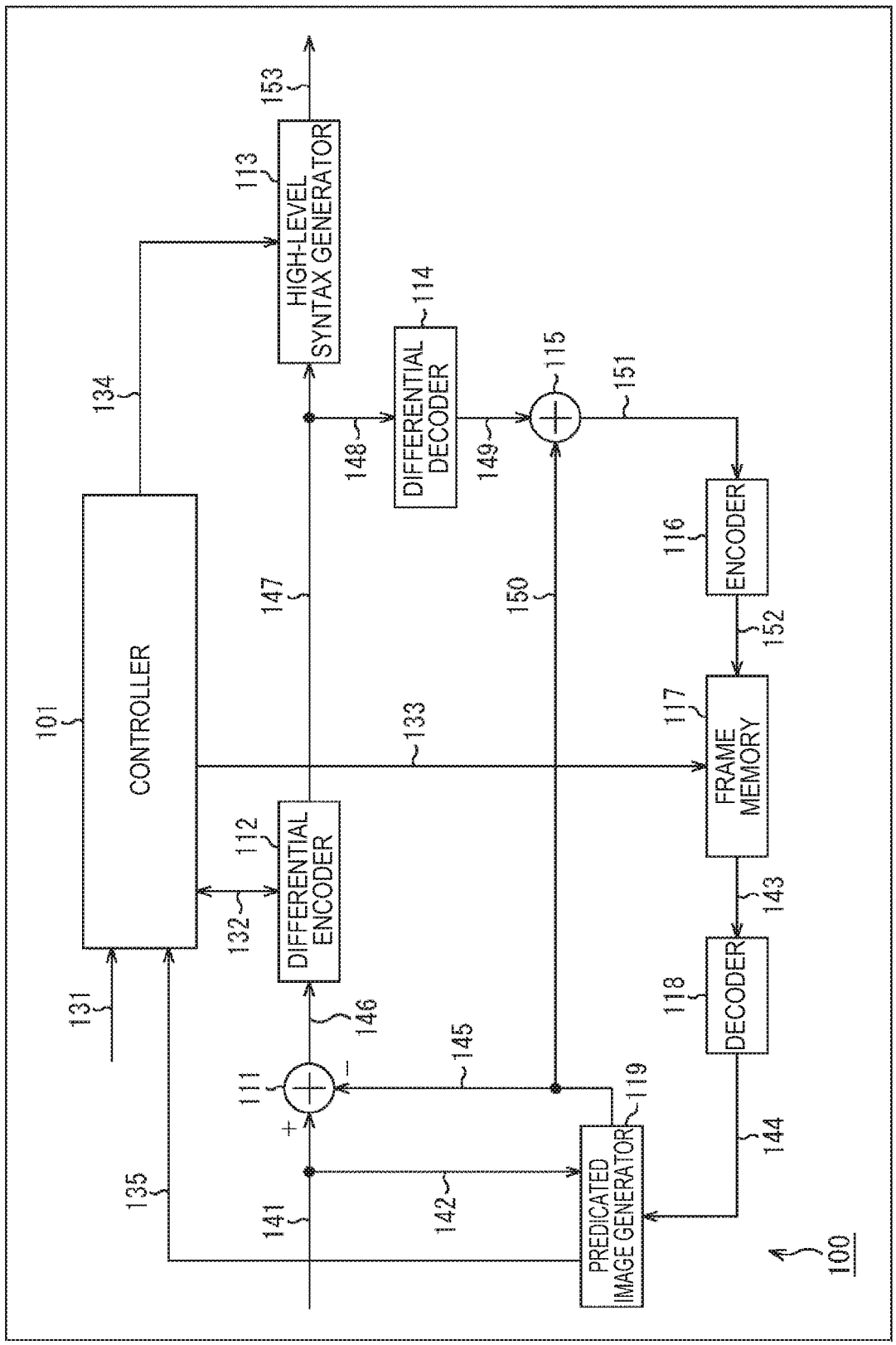
FIG. 7 is a block diagram illustrating an example of a main configuration of an image coding device.

FIG. 7 is a block diagram illustrating an example of a configuration of an image coding device that is an embodiment of an image processing apparatus to which the present technology is applied. An image coding device 100 illustrated in FIG. 7 is a device for coding image data of a moving image. As illustrated in FIG. 7, the image coding device 100 includes a controller 101, an arithmetic operation unit 111, a differential encoder 112, a high-level syntax generator 113, a differential decoder 114, an arithmetic operation unit 115, an encoder 116, a frame memory 117, a decoder 118, and a predicted image generator 119.

The controller 101 performs processing relating to control of coding. In one example, the controller 101 controls the differential encoder 112 and the frame memory 117 (arrow 132 and arrow 133, respectively). In addition, in one example, the controller 101 supplies information relating to encoding to the high-level syntax generator 113 (arrow 134). In addition, in one example, the controller 101 is capable of accepting input from the outside such as user input (arrow 131). In addition, the controller 101 is capable of acquiring information from the differential encoder 112 and the predicted image generator 119 (arrow 132 and arrow 135, respectively).

The arithmetic operation unit 111 obtains a difference (differential image) between an input image (arrow 141) and a predicted image (arrow 145) supplied from the predicted image generator 119. The arithmetic operation unit 111 supplies the differential image to the differential encoder 112 (arrow 146).

The differential encoder 112 encodes the supplied differential image (arrow 146) using any coding scheme to generate encoded data of the differential image under the control of the controller 101. The differential encoder 112 supplies the generated encoded data to the high-level syntax generator 113 (arrow 147). The differential encoder 112 also supplies the encoded data to the differential decoder 114 (arrow 148).

The high-level syntax generator 113 generates high-level syntax for the supplied encoded data (arrow 147). In this event, the high-level syntax generator 113 incorporates the information relating to coding supplied from the controller 101 into the high-level syntax. In other words, the high-level syntax generator 113 includes information relating to coding supplied from the controller 101 in the high-level syntax as necessary or generates new information on the basis of the information relating to coding to include it in the high-level syntax. The high-level syntax generator 113 associates the generated high-level syntax with the encoded data. The high-level syntax generator 113 outputs the high-level syntax and the encoded data to the outside of the image coding device 100 (arrow 153). In one example, the high-level syntax generator 113 outputs the encoded data including the high-level syntax to the outside of the image coding device 100 as a bit stream.

The differential decoder 114 decodes the supplied encoded data (arrow 148) using any decoding scheme corresponding to the encoding scheme of the differential encoder 112. The differential decoder 114 supplies a differential image obtained by the decoding processing to the arithmetic operation unit 115 (arrow 149).

The arithmetic operation unit 115 performs addition of the predicted image (arrow 150) supplied from the predicted image generator 119 to the differential image (arrow 149) supplied from the differential decoder 114 and generates a decoded image corresponding to the input image. The arithmetic operation unit 115 supplies the decoded image to the encoder 116 (arrow 151).

The encoder 116 performs simple encoding on the supplied decoded image (arrow 151). In other words, the encoder 116 performs lossy compression (lossy coding) on the supplied decoded image. In one example, the encoder 116 performs compression (coding) on the supplied decoded image to be a fixed length. Although this simple encoding scheme is optional, in one example, a part of bits on the smaller side of the pixel value may be deleted.

The simple encoding (simple compression) performed as described above makes it possible for the encoder 116 to reduce the data amount to be read or written from or in the frame memory 117, so the increase in the capacity of the frame memory 117 can be suppressed, and faster data access (reading and writing) can be achieved. Thus, the mounting cost can be reduced. Furthermore, the use of lossy compression makes it possible to implement highly efficient coding with a simpler manner than in the case of lossless compression. Thus, the encoder 116 can perform encoding and decoding at a lower load and at a higher rate. In addition, this makes it possible to facilitate the miniaturization and to reduce the mounting cost. In addition, setting the encoded data to a fixed length makes it possible to manage the encoded data easier. Thus, in one example, even in a frame memory 117, this makes it possible to manage the encoded data easier, so it is possible to perform processing such as reading or writing at a higher speed and to achieve implementation at a lower cost.

Moreover, this simple encoding (simple compression) may be performed independently for each block of image data. This makes it possible not only to encode and decode the entire picture but also to encode and decode only a part of a picture. In other words, in a case where only a part of a picture is encoded or decoded, it is possible to suppress unnecessary data encoding and decoding and to perform encoding and decoding more efficiently. In other words, it is possible to suppress an unnecessary load increase in the encoding or decoding and to implement high-speed processing and lower cost. Moreover, this "block" herein indicates any partial area in a picture, and its size, shape, characteristics, or the like is not limited. In one example, this "block" may indicate a data unit such as transform unit (TU), prediction unit (PU), smallest coding unit (SCU), coding unit (CU), largest coding unit (LCU), coding tree block (CTB), sub-block, macro block, tile, and slice, or may indicate a data unit unique to this coding scheme.

The encoder 116 supplies the decoded image subjected to simple encoding (encoded data of the decoded image) to the frame memory 117 (arrow 152).

The frame memory 117 stores the supplied encoded data (arrow 152). The frame memory 117 can be implemented by any storage medium, but it may be implemented by using, in one example, DRAM. The frame memory 117 reads the stored encoded data as necessary and supplies it to the decoder 118 (arrow 143) as an image (reference image) of a frame processed in the past (past frame).

The decoder 118 performs simple decoding (simple decompression) on the encoded data (decoded image subjected to coding) of the decoded image read out from the frame memory 117 using a scheme corresponding to the simple encoding scheme of the encoder 116. This simple decoding scheme is any scheme as long as it corresponds to the simple encoding scheme of the encoder 116. The decoder 118 supplies the decoded image obtained by the simple decoding to the predicted image generator 119 as a reference image (arrow 144).

The predicted image generator 119 generates a predicted image of an input image to be subjected to coding processing. The predicted image generator 119 acquires the input image (arrow 142) and the reference image (arrow 144), and generates a predicted image using them. A way of generating this predicted image is any way, but the predicted image generator 119, in one example, performs inter-prediction similar to AVC, HEVC, or the like using the input image and the predicted image, further performs intra-prediction similar to AVC, HEVC, or the like, and compares predicted images generated by these prediction operations with each other to select an optimum predicted image. The predicted image generator 119 supplies the generated predicted image to the arithmetic operation unit 111 (arrow 145). In addition, the predicted image generator 119 also supplies the predicted image to the arithmetic operation unit 115 (arrow 150). Furthermore, the predicted image generator 119 supplies the information relating to the predicted image to the controller 101.

Control of Length of GOP

Figure 8:
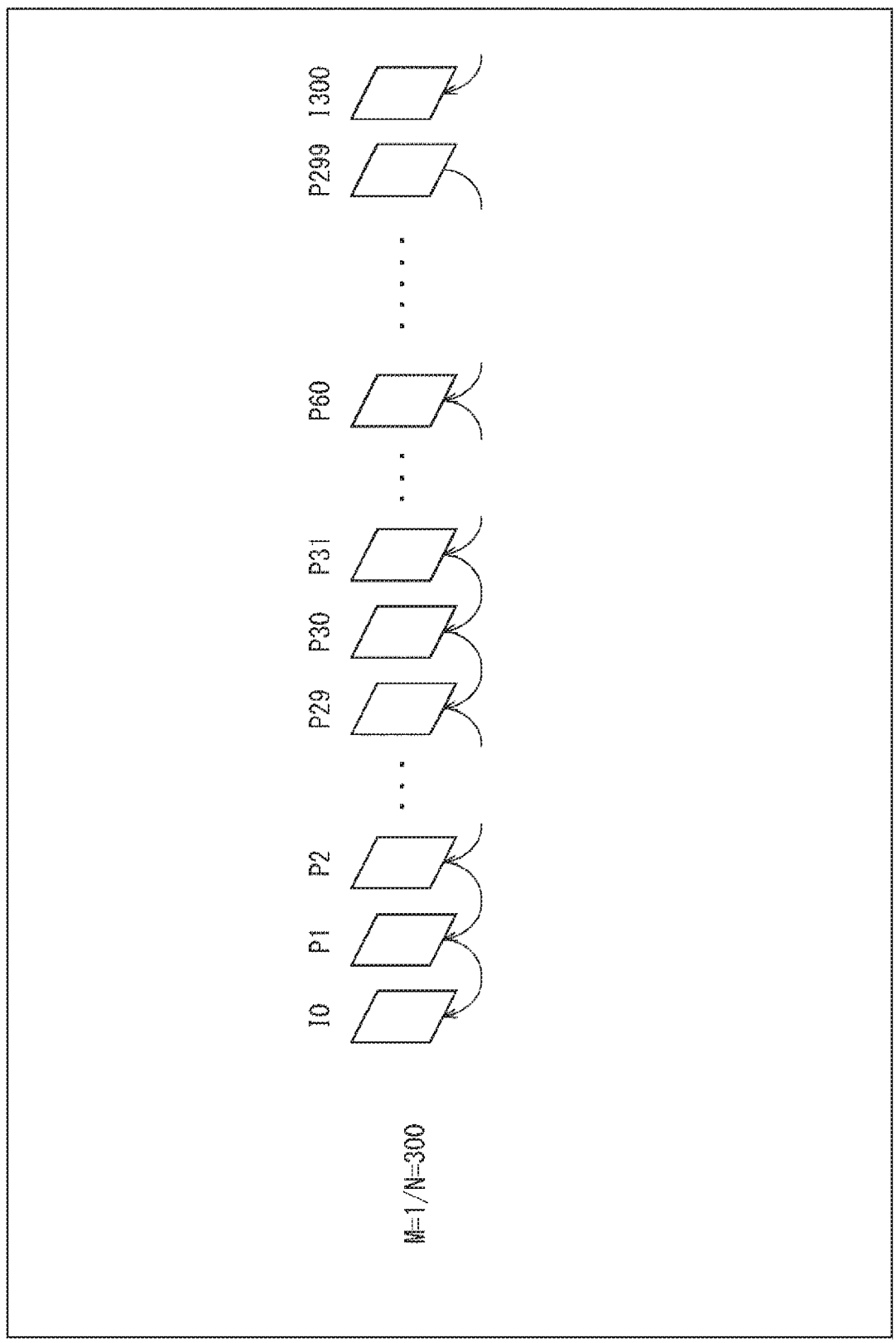
FIG. 8 is a diagram illustrating an example of GOP structure.

In image coding of AVC, HEVC, or the like, the code amount of I-picture is generally larger than that of P-picture or the like. Thus, an approach to increase the number of frames of GOP is considered to reduce the bit rate of encoded data. In one example, in the case of GOP structure illustrated in FIG. 8, the interval between I-pictures is 300 frames, and all the other frames are P-pictures (M=1/N=300). Use of such structure makes it possible to improve coding efficiency. Thus, it is suitable for use in which priority is given to lower rate, in one example, like an image of a monitoring camera. In addition, no use of B-picture makes the configuration simpler and the decoding easier.

However, in the case of this GOP structure, it is necessary to decode sequentially respective frames from the head frame (I-picture) of the GOP regardless of which frame is decoded, which makes one GOP longer (the number of frames increases), so random access is likely to be more difficult. In addition, the reference relationship is simple and the interval in one GOP is made longer, so drift is likely to occur and image quality is likely to be deteriorated.

Thus, the length (the number of frames) of one GOP is limited so that the deterioration of image quality does not exceed the acceptable range. In one example, the interval between I-pictures is set to 30 frames (M=1/N=30) as in the GOP structure illustrated in FIG. 9. In the encoding and decoding of the I-picture, the other frames are not referred to, so the drift is reset. In other words, the increase in the number of I-pictures makes it possible to suppress an increase in deterioration of image quality. Moreover, in FIG. 9, the interval between I-pictures is set to 30 frames (M=30), but the number of frames is optional and may be a number other than 30 frames. As the interval (N) between I-pictures is narrower (as the number of frames decreases), the increase in deterioration of image quality is suppressed (drift hardly occurs), but the coding efficiency decreases. Moreover, the length of one GOP is shorter (the number of frames is smaller) than in the case of FIG. 8, random access is made easier.

The frames included in the GOP are not limited to I-picture and P-picture. In one example, B-picture may be also used as the GOP structure illustrated in FIG. 10. In this structure, the interval between I-pictures is 30 frames, the interval between P-pictures is three frames, and B-pictures are used for the remaining frames (M=3/N=30). Generally, the B-picture has a smaller code amount, so use of such GOP structure makes it possible to improve the coding efficiency as compared with the case of the example of FIG. 9. In general, however, the use of B-picture makes decoding more complicated and so the load is likely to be increased.

Figure 9:
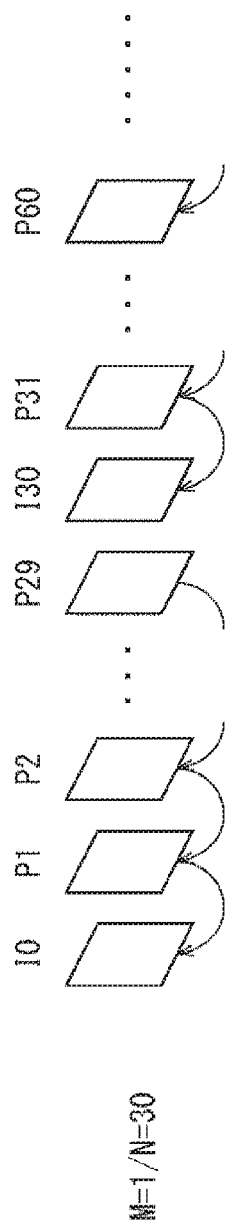
FIG. 9 is a diagram illustrating an example of GOP structure.
Figure 10:
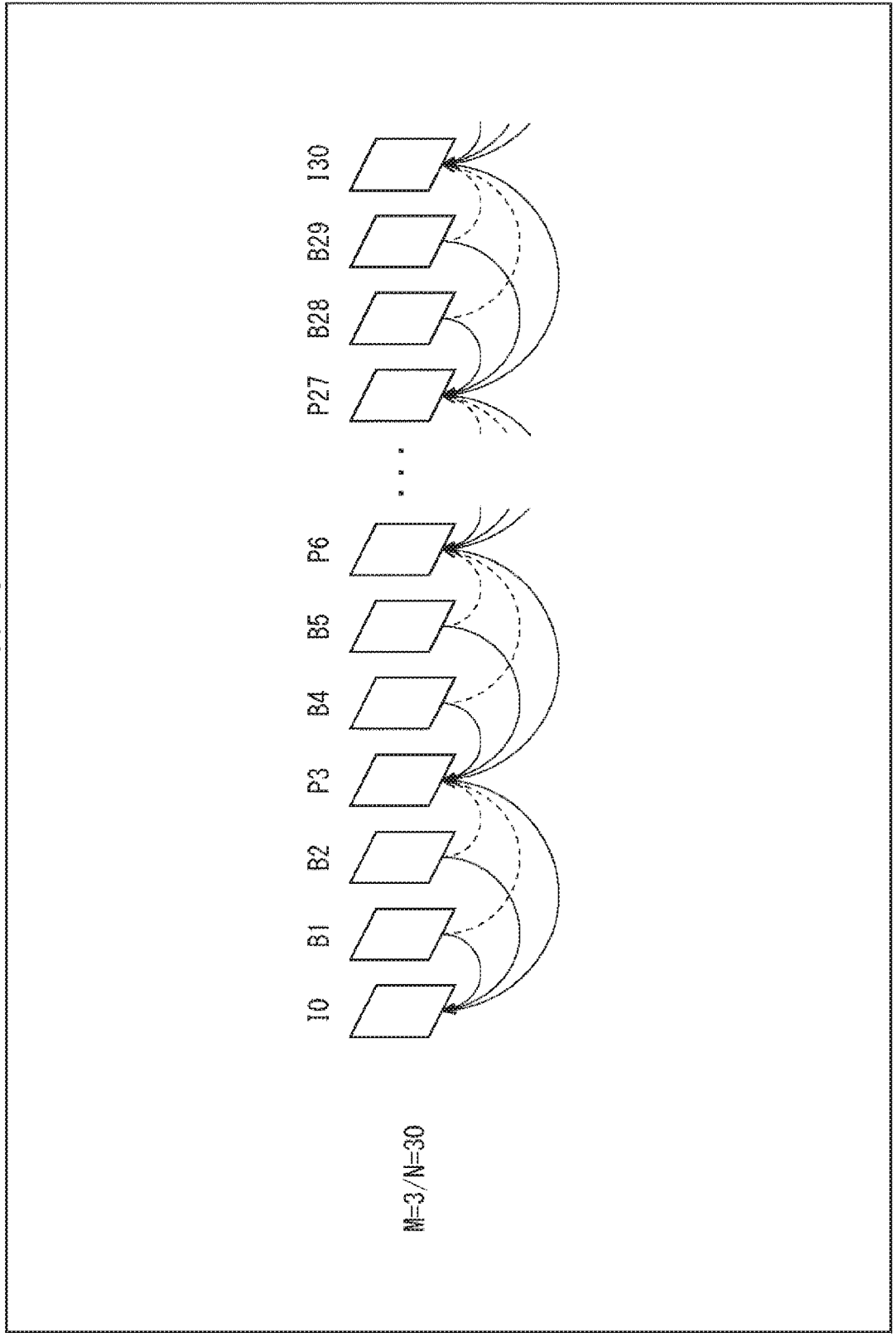
FIG. 10 is a diagram illustrating an example of GOP structure.

In the present embodiment, the GOP structure as illustrated in FIG. 9 or 10 is applied to the image coding device 100 that performs simple encoding and simple decoding on the decoded image stored in the frame memory 117 described with reference to FIG. 7. In other words, in the image coding device 100, the controller 101 sets the GOP structure by limiting the length (the number of frames) of one GOP so that the deterioration of image quality does not exceed the acceptable range. This makes it possible for the image coding device 100 to suppress the drift (increase in image quality deterioration) as described above, thereby suppressing the deterioration in image quality.

Procedure for Image Coding Processing

An example of the procedure for image coding processing executed by the image coding device 100 to encode the input image in this case is described with reference to the flowchart of FIG. 11.

Upon start of the image coding processing, the controller 101 of the image coding device 100 sets the GOP structure to a length (e.g., N=30) that suppresses drift in step S101. In step S102, the high-level syntax generator 113 generates syntax including information indicating the setting in accordance with the setting in step S101.

In step S103, the decoder 118 reads the decoded image subjected to simple encoding (simple encoded data of the decoded image) corresponding to the input image from the frame memory 117 depending on the GOP structure set in step S101, and performs simple decoding on it.

In step S104, the predicted image generator 119 performs prediction processing using intra-prediction and inter-prediction and generates a predicted image corresponding to the input image. The inter-prediction uses the decoded image subjected to simple decoding in step S103 as a reference image.

In step S105, the arithmetic operation unit 111 subtracts the predicted image from the input image to generate a differential image. In step S106, the differential encoder 112 encodes the differential image to generate encoded data of the differential image under the control of the controller 101.

In step S107, the differential decoder 114 decodes the encoded data of the differential image using the decoding scheme corresponding to the encoding scheme of the differential encoder 112. In step S108, the arithmetic operation unit 115 adds the predicted image generated in step S104 to the differential image obtained by the decoding operation to generate a decoded image.

In step S109, the encoder 116 performs simple encoding on the decoded image. In step S110, the frame memory 117 stores a decoded image subjected to simple encoding (simple encoded data of the decoded image). This decoded image is used as a reference image in inter-prediction of the frame to be processed thereafter.

In step S111, the high-level syntax generator 113 associates the high-level syntax generated in step S102 with the encoded data generated in step S106. Then, the high-level syntax generator 113 outputs the encoded data (and high-level syntax) to the outside of the image coding device 100.

Upon completion of the processing of step S111, the image coding processing is terminated.

The image coding processing performed as described above makes it possible to suppress the drift (increase in deterioration of image quality) by the GOP structure (length of the GOP), thereby suppressing deterioration in image quality.

3. Second Embodiment

Use of Long-Term Reference Frame

Moreover, a long-term reference frame may be used instead of controlling the GOP structure (length). In one example, like the GOP structure illustrated in FIG. 12, the interval between I-pictures is set so that a long-term reference frame (Long Term Reference) similar to AVC, HEVC, or the like can be used in the GOP structure of FIG. 8 (M=1/N=300, Long Term Reference). In other words, the frame memory 117 stores the decoded image as a short-term reference frame or a long-term reference frame, and the long-term reference frame is stored for a longer period than the short-term reference frame.

Figure 12:
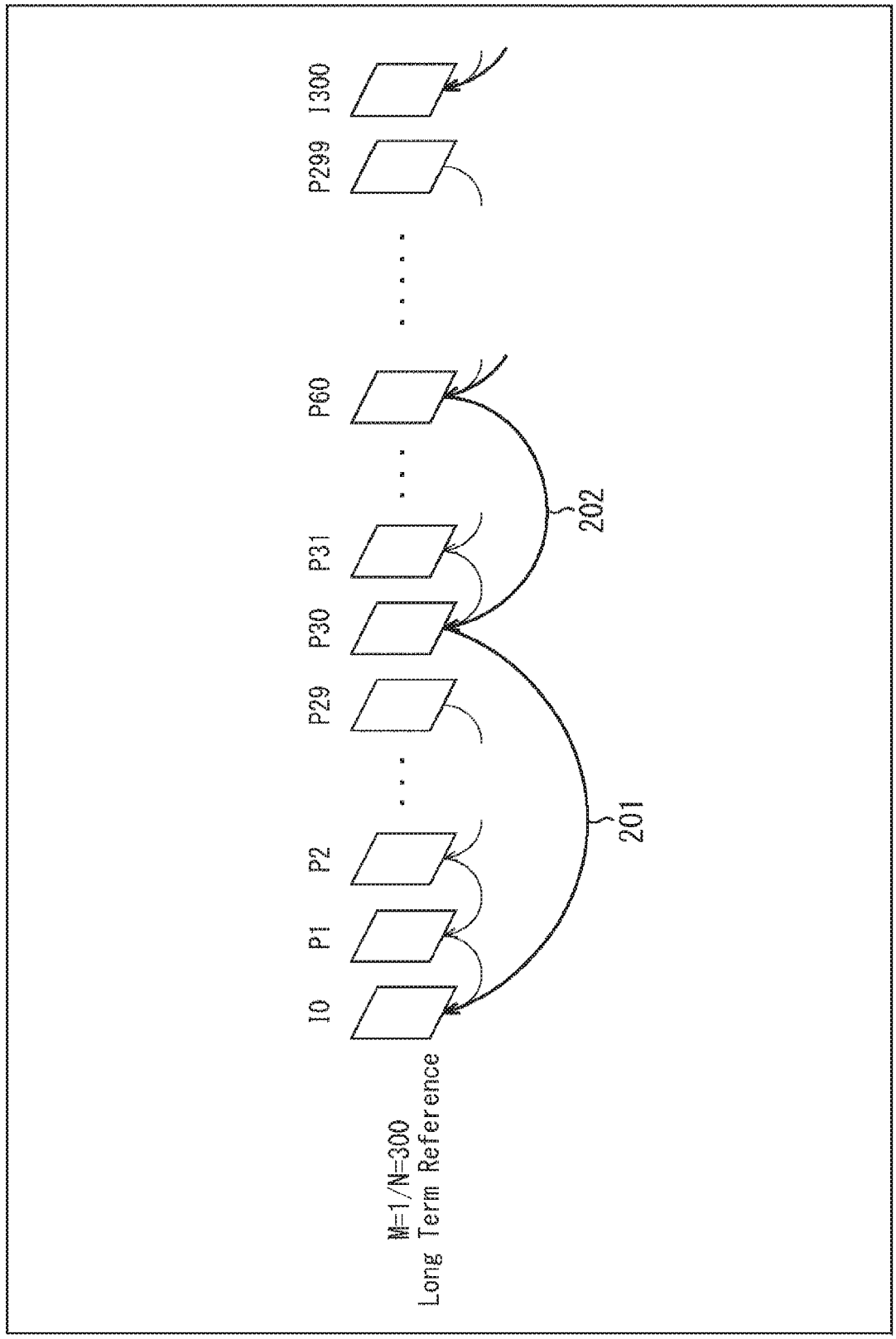
FIG. 12 is a diagram illustrating an example of GOP structure using a long-term reference frame.

In the case of the GOP structure of FIG. 12, one GOP has 300 frames, and the long-term reference frame is applied as a reference image every 30 frames, as indicated by arrows 201 and 202. Then, the long-term reference frame is updated every 30 frames. In one example, frame I0 whose frame number is 0, which is the head frame of the GOP, is set as the long-term reference frame. In addition, in frame P30 whose frame number is 30, the long-term reference frame, that is, the frame I0 before 30 frames is referred to (arrow 201). Furthermore, the frame P30 is set as a new long-term reference frame. Similarly, in frame P60 whose frame number is 60, the long-term reference frame, that is, the frame P30 of 30 frames before is referred to (arrow 202). Furthermore, the frame P60 is set as a new long-term reference frame. Then, in frame P299 whose frame number is 299, the GOP is ended and the frame whose frame number 300 is set as the I-picture (I300) of the next GOP.

When the long-term reference frame is used in this manner, the short-term reference frame, that is, the immediate previous frame is not referred to, so the drift does not continue and an increase in deterioration of image quality is suppressed. Thus, it is possible to suppress deterioration in image quality. In the case of this structure, it is not necessary to shorten the GOP length, so it is possible to improve the coding efficiency as compared with the case of FIG. 9. In addition, in the case of this structure, it is not necessary to use B-picture, so the configuration is simpler than in the case of FIG. 10, thereby making the decoding easier to perform. Furthermore, use of the long-term reference frame as described above makes it possible to omit the decoding of P-picture between them, thereby making random access easier than the case of FIG. 8.

In the present embodiment, the GOP structure illustrated in FIG. 12 is applied to the image coding device 100 that performs simple encoding and simple decoding on the decoded image stored in the frame memory 117 described with reference to FIG. 7. In other words, in the image coding device 100, the frame memory 117 stores the simple encoded data of the decoded image of the past frame processed before the current frame as the image of the long-term reference frame or the short-term reference frame. The image generator 119 generates a predicated image by employing inter-prediction using the image of the long-term reference frame or short-term reference frame subjected to simple decoding after being read from the frame memory 117 as a reference image and intra-prediction similar to AVC, HEVC, or the like. This makes it possible for the image coding device 100 to suppress the drift (increase in image quality deterioration) as described above, thereby suppressing the deterioration in image quality.

Moreover, the length of the GOP (300 frames), the period referring to the long-term reference frame (30 frames), and the period of updating the long-term reference frame (30 frames) illustrated in FIG. 12 are illustrative examples, and they are not limited to these values. These values are any value as long as no contradiction arises. In one example, it is sufficient if the period referring to the long-term reference frame or the period of updating the long-term reference frame is longer than the period of the short-term reference frame and is shorter than the length of the GOP. In addition, also in the case of using the long-term reference frame as described above, B-picture may be used as in the example of FIG. 10. Although this makes it possible to improve coding efficiency, decoding is more complicated.

Procedure for Image Coding Processing

An example of the procedure for image coding processing executed by the image coding device 100 to encode the input image in the case of the present embodiment is described with reference to the flowchart of FIG. 13.

Upon start of the image coding processing, the controller 101 of the image coding device 100 sets so that the long-term reference frame is used in step S131. In step S132, the high-level syntax generator 113 generates syntax including information indicating the setting (e.g., information relating to long-term reference frame) in accordance with the setting in step S131.

In step S133, the decoder 118 reads a decoded image subjected to simple encoding (simple encoded data of the decoded image) of the long-term reference frame or the short-term reference frame corresponding to the input image from the frame memory 117 and performs simple decoding on it, in accordance with the setting in step S131. Moreover, control of referring to which of the long-term reference frame and the short-term reference frame will be described later.

In step S134, the predicted image generator 119 performs prediction processing using intra-prediction similar to AVC, HEVC, or the like, and inter-prediction and generates a predicted image corresponding to the input image. The inter-prediction uses the decoded image subjected to simple decoding in step S133 as a reference image.

Figure 11:
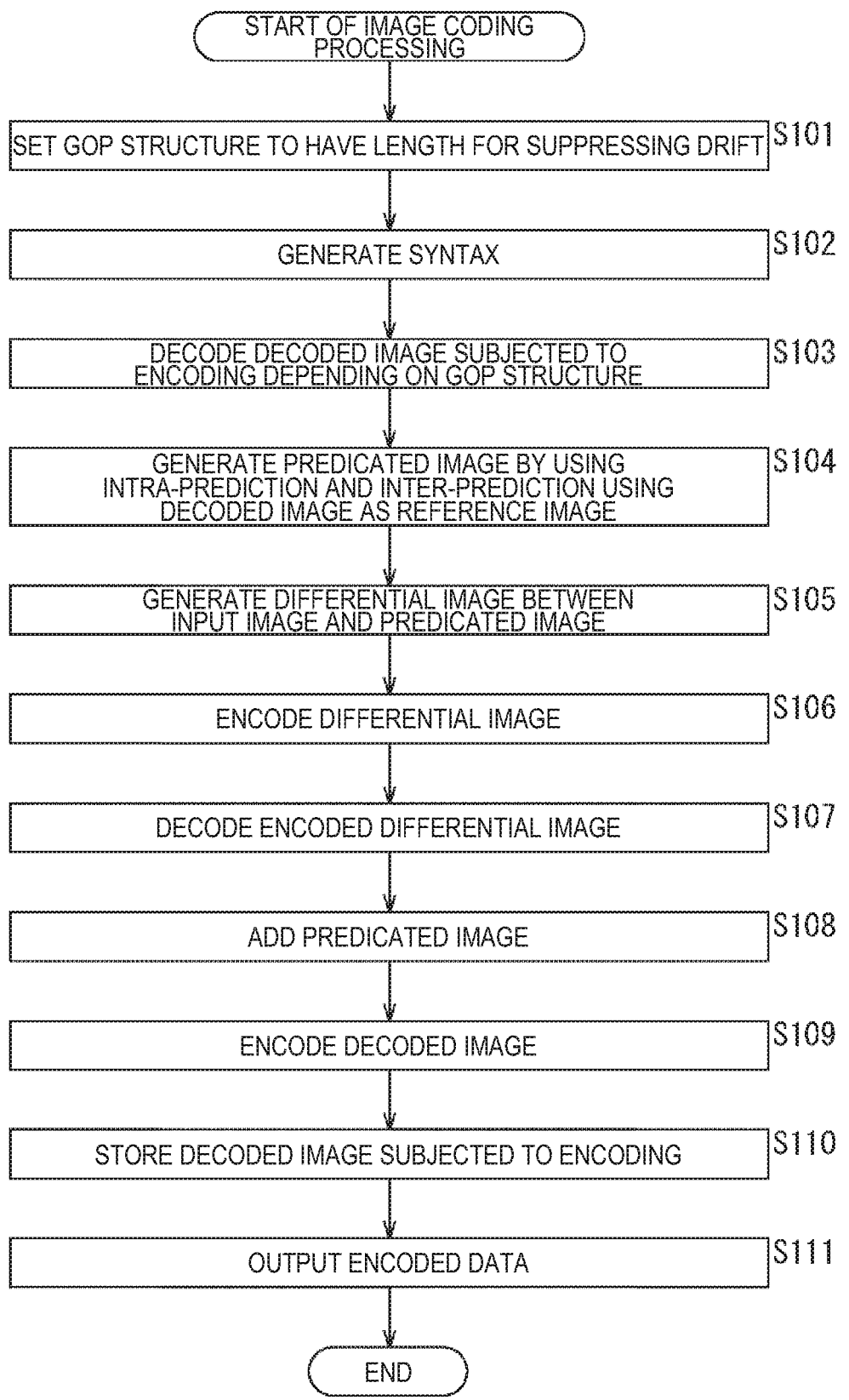
FIG. 11 is a flowchart illustrated to describe an example of a procedure for image coding processing.

The respective processing operations from step S135 to step S141 are executed in a similar manner to the respective processing operations from step S105 to step S111 of FIG. 11. Upon completion of the processing of step S141, the image coding processing is terminated.

Procedure for Reference Frame Control Processing

Figure 13:
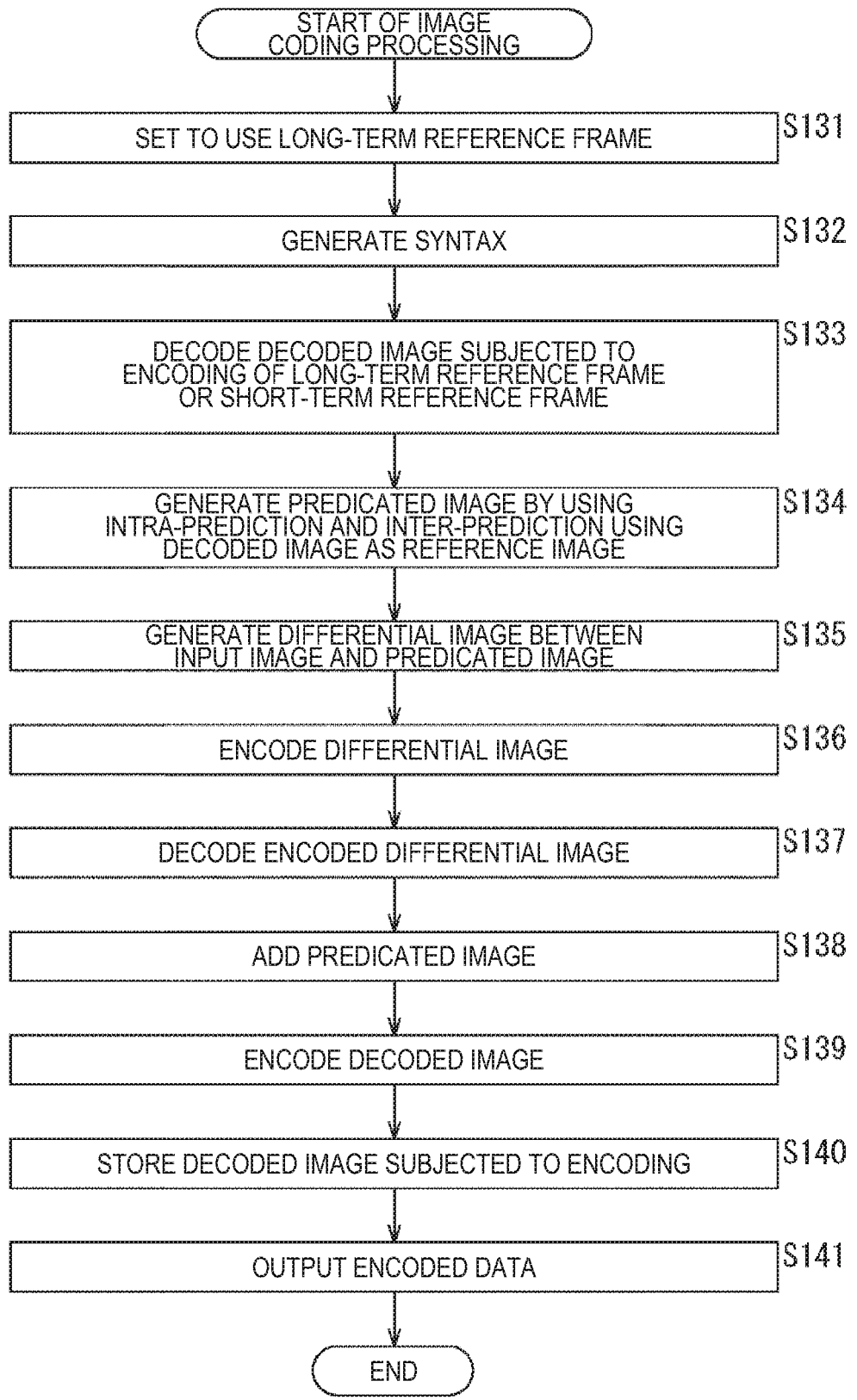
FIG. 13 is a flowchart illustrated to describe an example of a procedure for image coding processing.

In step S133 of FIG. 13, the image coding device 100 performs reference frame control processing to control whether to refer to a long-term reference frame or a short-term reference frame. An example of the procedure for the reference frame control processing is described with reference to the flowchart of FIG. 14.

Upon start of the reference frame control processing, the decoder 118 determines whether or not the frame number of the current frame, which is a frame to be encoded, is a multiple of 30 in step S161. If it is determined that the frame number is a multiple of 30, then the processing proceeds to step S162.

In step S162, the decoder 118 refers to the long-term reference frame, that is, the frame before 30 frames. In other words, the decoder 118 reads the simple encoded data of the frame before 30 frames from the frame memory 117 and decodes it.

In step S163, the frame memory 117 sets the current frame as a long-term reference frame. In other words, the frame memory 117 stores simple encoded data of the current frame supplied from the encoder 116 as a long-term reference frame. Upon completion of the processing of step S163, the reference frame control processing is terminated.

Further, if it is determined in step S161 that the frame number of the current frame is not a multiple of 30, then the processing proceeds to step S164. In step S164, the decoder 118 refers to the short-term reference frame, that is, the immediate previous frame. In other words, the decoder 118 reads the simple encoded data of the immediate previous frame from the frame memory 117 and decodes it. Upon completion of the processing of step S164, the reference frame control processing is terminated.

The respective processing operations performed as described above make it possible to suppress the drift (increase in deterioration of image quality) by the long-term reference frame, thereby suppressing the deterioration in image quality.

Reference to Head Frame

The long-term reference frame is not necessarily to be updated in the GOP. In other words, in a case of referring to a long-term reference frame, in general, the head frame (frame I0) of the GOP may be referred to. In the case of the GOP structure of FIG. 15, one GOP has 300 frames, and the long-term reference frame is applied as a reference image every 30 frames as indicated by arrow 211 or 212. Then, the long-term reference frame is the head frame (frame I0) of the relevant GOP. In one example, the frame I0 whose frame number is 0, which is the head frame of the GOP, is set as the long-term reference frame. In the frame P30 whose frame number is 30, the long-term reference frame, that is, the frame I0 is referred to (arrow 211). Similarly, in the frame P60 whose frame number is 60, the long-term reference frame, that is, the frame I0 is referred to (arrow 212). Then, the GOP is terminated at the frame P299 whose frame number 299 and the frame whose frame number 300 is set as an I-picture of the next GOP (I300).

This structure allows the drift to be less likely to occur (deterioration in image quality is less likely to increase) as compared with the structure of FIG. 12, so this makes it possible to further suppress the deterioration in image quality. However, in the case of this structure, the reference image is farther than the structure of FIG. 12, so the prediction accuracy is likely to be lowered.

Application of such GOP structure to the image coding device 100 of FIG. 7 makes it possible for the image coding device 100 to suppress the drift (increase in deterioration of image quality) as described above, thereby suppressing the deterioration in image quality.

Figure 15:
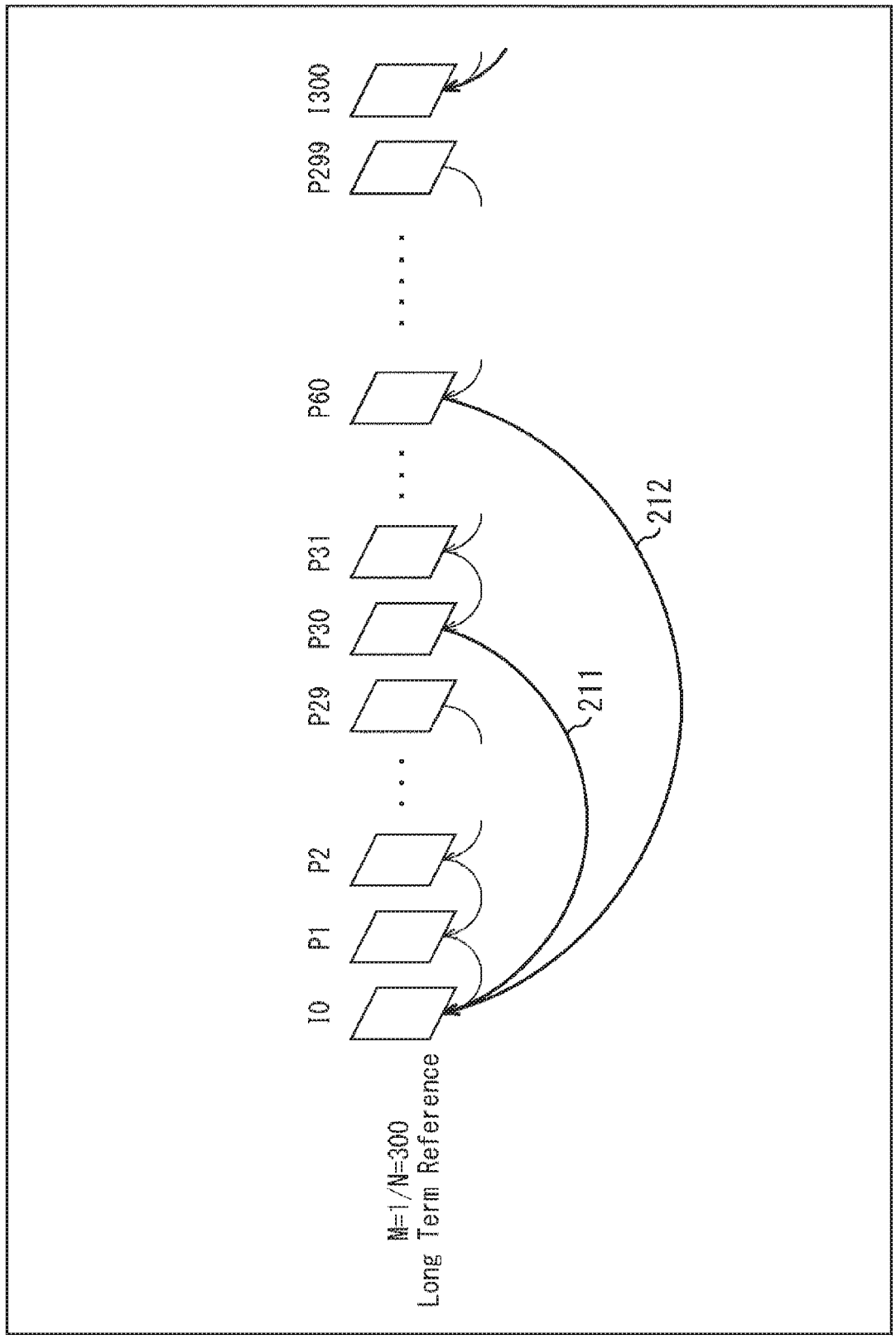
FIG. 15 is a diagram illustrating an example of GOP structure using a long-term reference frame.

Moreover, the length of the GOP (300 frames) and the period referring to the long-term reference frame (30 frames) illustrated in FIG. 15 are illustrative examples, and they are not limited to these values. These values are any value as long as no contradiction arises. In one example, it is sufficient if the period referring to the long-term reference frame is longer than the period of the short-term reference frame and is shorter than the length of the GOP. In addition, also in the case of using the long-term reference frame as described above, B-picture may be used as in the example of FIG. 10. Although this makes it possible to improve coding efficiency, decoding is more complicated.

Procedure for Reference Frame Control Processing

Figure 16:
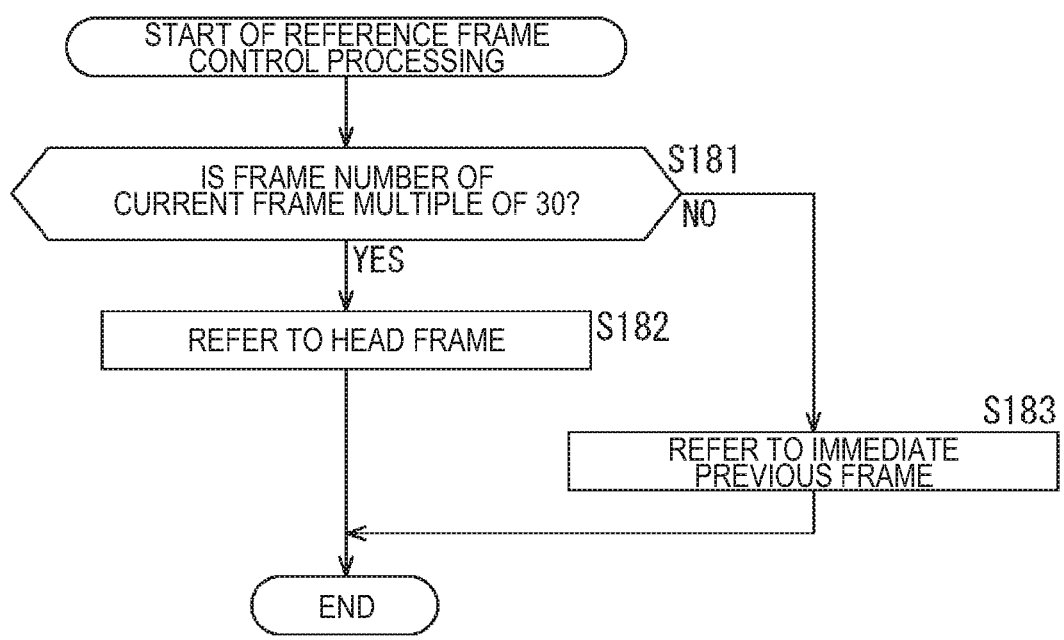
FIG. 16 is a flowchart illustrated to describe an example of a procedure for reference frame control processing.

The image coding processing in this case is also executed in a similar manner to that described with reference to FIG. 13. An example of the procedure for reference frame control processing in this case is described with reference to the flowchart of FIG. 16.

Upon start of the reference frame control processing, the decoder 118 determines whether or not the frame number of the current frame, which is a frame to be encoded, is a multiple of 30 in step S181. If it is determined that the frame number is a multiple of 30, then the processing proceeds to step S182.

In step S182, the decoder 118 refers to the long-term reference frame, that is, the head frame of the GOP. In other words, the decoder 118 reads the simple encoded data of the frame I0 from the frame memory 117 and decodes it. Upon completion of the processing of step S182, the reference frame control processing is terminated.

Further, if it is determined in step S181 that the frame number of the current frame is not a multiple of 30, then the processing proceeds to step S183. In step S183, the decoder 118 refers to the short-term reference frame, that is, the immediate previous frame. In other words, the decoder 118 reads the simple encoded data of the immediate previous frame from the frame memory 117 and decodes it. Upon completion of the processing of step S183, the reference frame control processing is terminated.

The respective processing operations performed as described above make it possible to suppress the drift (increase in deterioration of image quality) by the long-term reference frame, thereby suppressing the deterioration in image quality.

Adaptive Reference of Long-Term Reference Frame

The above description is given of the long-term reference frame referred to in a particular frame such as a multiple of 30 in the frame number, but it is also possible to refer to the long-term reference frame even in other frames. In one example, in a frame whose frame number is a multiple of 30 (a particular frame), the long-term reference frame may be set to be referred to necessarily, and the long-term reference frame may be set to be adaptively referred to in other frames (adaptive switching between reference targets). In one example, in a frame other than a particular frame, the long-term reference frame may be referred to if a predetermined condition is satisfied, and the short-term reference frame may be referred to if the predetermined condition is not satisfied.

Figure 17:
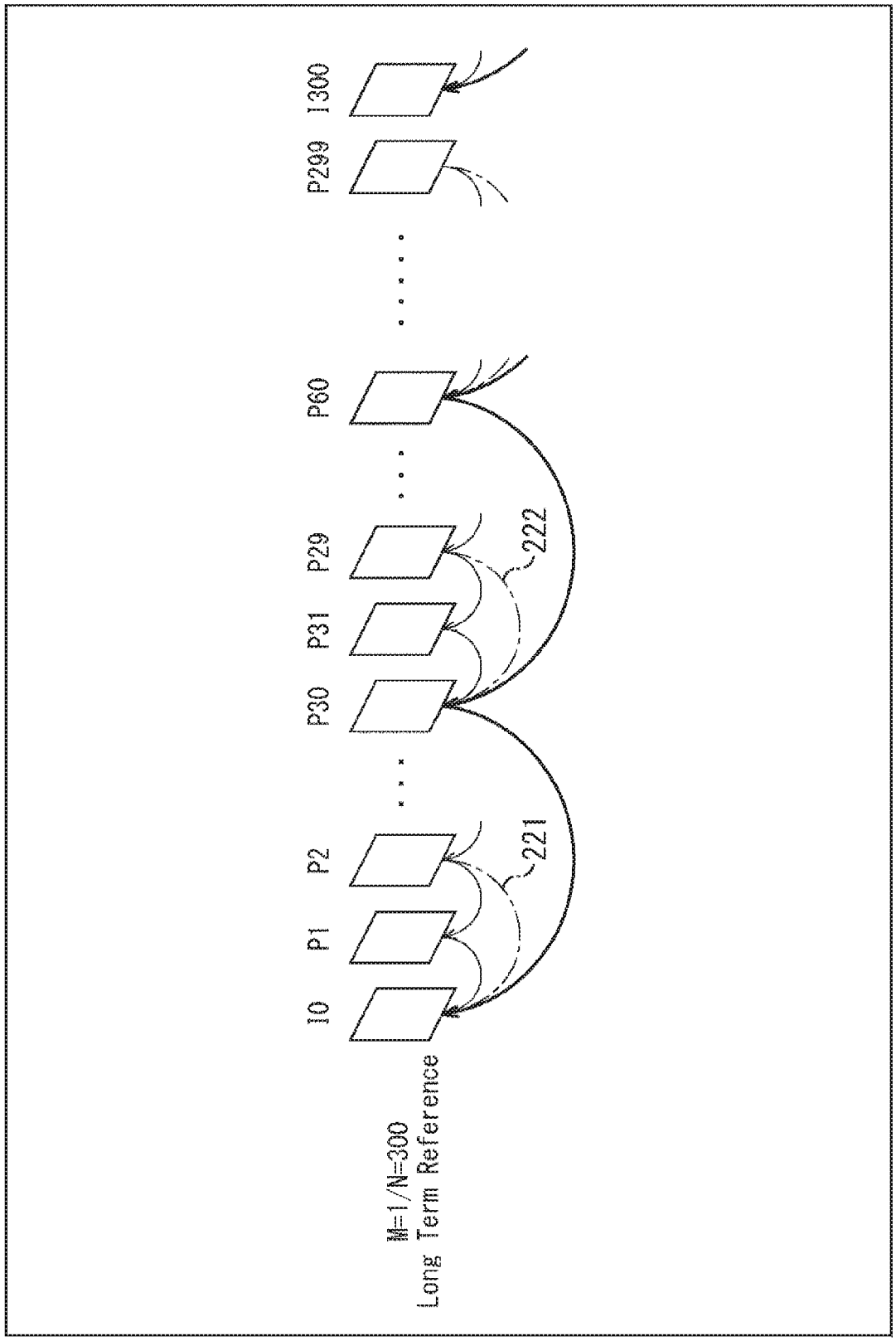
FIG. 17 is a diagram illustrating an example of GOP structure using a long-term reference frame.

An example of a case of applying such a configuration to the GOP structure of FIG. 12 is illustrated in FIG. 17. In the case of the example illustrated in FIG. 17 as well, one GOP has 300 frames, and the long-term reference frame (before 30 frames) is necessarily referred to in a frame whose frame number is a multiple of 30 such as frame P30 or frame P60, as described with reference to FIG. 12. However, in the case of the example of FIG. 17, when a predetermined condition is satisfied in the other frames, a reference destination is switched from the short-term reference frame to the long-term reference frame as indicated by arrow 221 or arrow 222. In other words, the long-term reference frame is referred to.

By doing so, the chance of referring to the long-term reference frame increases, so it is possible to further suppress occurrence of drift (increase in deterioration of image quality). Thus, deterioration in image quality can be further suppressed.

Moreover, the contents of a condition for switching between reference destinations are optional. In one example, it may be set as a condition that a difference between a current frame's image and an immediate previous frame's image is compared with a difference between the current frame's image and a long-term reference frame's image and the difference from the immediate previous frame is equal to or larger than the difference from the long-term reference frame. Generally, the smaller the difference, the higher the prediction accuracy is. Thus, use of such a condition makes it possible to select one having higher prediction accuracy of the long-term reference frame and the short-term reference frame as the reference destination, thereby improving the coding efficiency.

Application of such GOP structure to the image coding device 100 of FIG. 7 makes it possible for the image coding device 100 to suppress the drift (increase in deterioration of image quality) as described above, thereby suppressing the deterioration in image quality.

Moreover, the length of the GOP (300 frames), the period referring to the long-term reference frame (30 frames), and the period of updating the long-term reference frame (30 frames) illustrated in FIG. 17 are illustrative examples, and they are not limited to these values. These values are any value as long as no contradiction arises. In one example, it is sufficient if the period referring to the long-term reference frame or the period of updating the long-term reference frame is longer than the period of the short-term reference frame and is shorter than the length of the GOP. In addition, also in the case of using the long-term reference frame as described above, B-picture may be used as in the example of FIG. 10.

Figure 18:
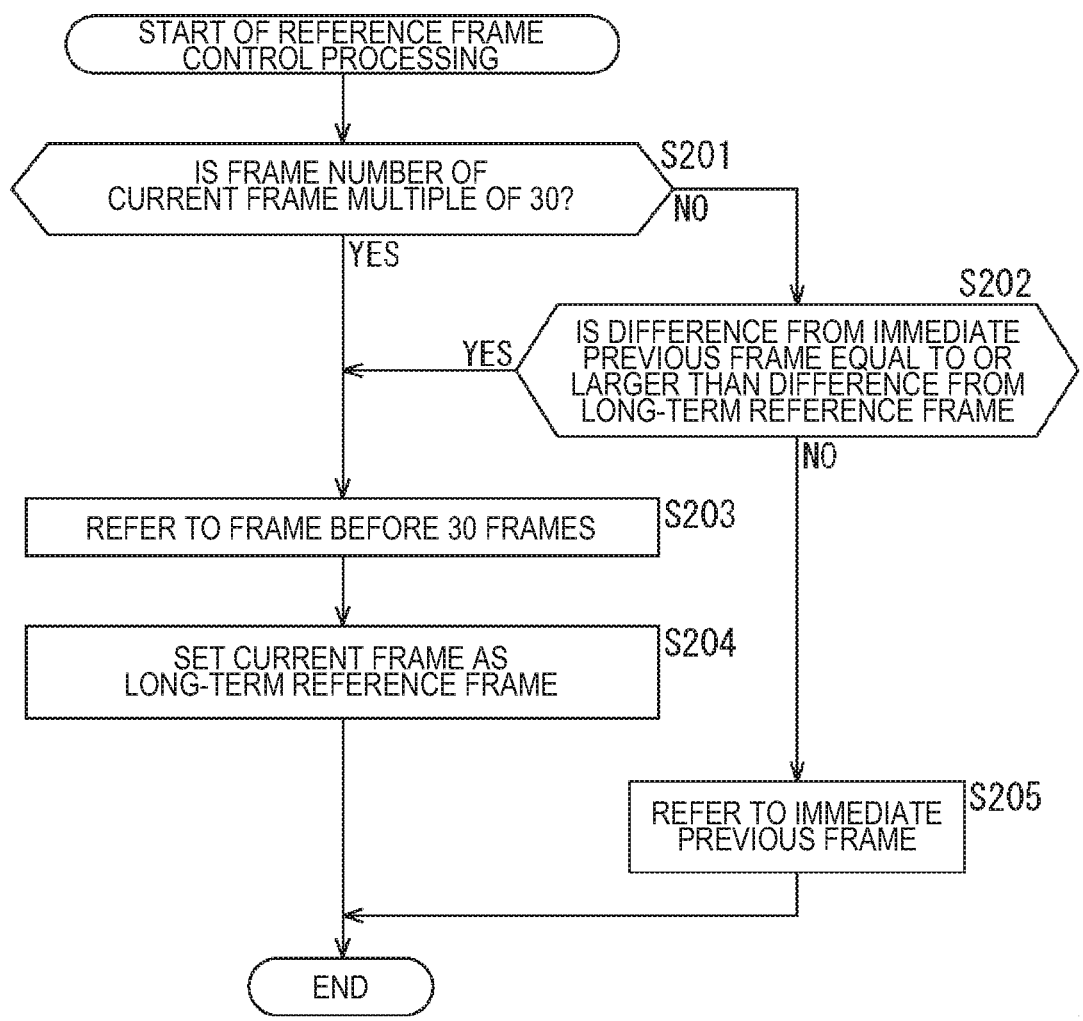
FIG. 18 is a flowchart illustrated to describe an example of a procedure for reference frame control processing.

In this case, the image coding processing is performed in a similar procedure to that of the flowchart of FIG. 13. An example of the procedure for the reference frame control processing in this case is described with reference to the flowchart of FIG. 18.

Upon start of the reference frame control processing, the decoder 118 determines whether or not the frame number of the current frame, which is a frame to be encoded, is a multiple of 30 in step S201. If it is determined that the frame number is not a multiple of 30, then the processing proceeds to step S202.

In step S202, the decoder 118 compares a difference between a current frame's image and an immediate previous frame's image with a difference between the current frame's image and a long-term reference frame's image, and determines whether or not the difference from the immediate previous frame is equal to or larger than the difference from the long-term reference frame. If it is determined that the difference between the current frame's image and the immediate previous frame's image is equal to or larger than the difference between the current frame's image and the long-term reference frame's image, then the processing proceeds to step S203. In other words, even the frame whose frame number is not a multiple of 30, if the condition is satisfied, then the processing proceeds to step S203.

Further, if it is determined in step S201 that the frame number is a multiple of 30, then the processing proceeds to step S203. In step S203, the decoder 118 refers to the long-term reference frame, that is, the frame before 30 frames. In other words, the decoder 118 reads the simple encoded data of the frame before 30 frames from the frame memory 117 and decodes it.

In step S204, the frame memory 117 sets the current frame as a long-term reference frame. In other words, the frame memory 117 stores simple encoded data of the current frame supplied from the encoder 116 as a long-term reference frame. Upon completion of the processing of step S204, the reference frame control processing is terminated.

Further, if it is determined in step S202 that the difference between the current frame's image and the immediate previous frame's image is smaller than the difference between the current frame's image and the long-term reference frame's image, then the processing proceeds to step S205. In other words, in a case where the frame whose frame number is not a multiple of 30 and the condition is not satisfied, the processing proceeds to step S205. In step S205, the decoder 118 refers to the short-term reference frame, that is, the immediate previous frame. In other words, the decoder 118 reads the simple encoded data of the immediate previous frame from the frame memory 117 and decodes it. Upon completion of the processing of step S205, the reference frame control processing is terminated.

The respective processing operations performed as described above make it possible to suppress the drift (increase in deterioration of image quality) by the long-term reference frame, thereby suppressing the deterioration in image quality.

Figure 19:
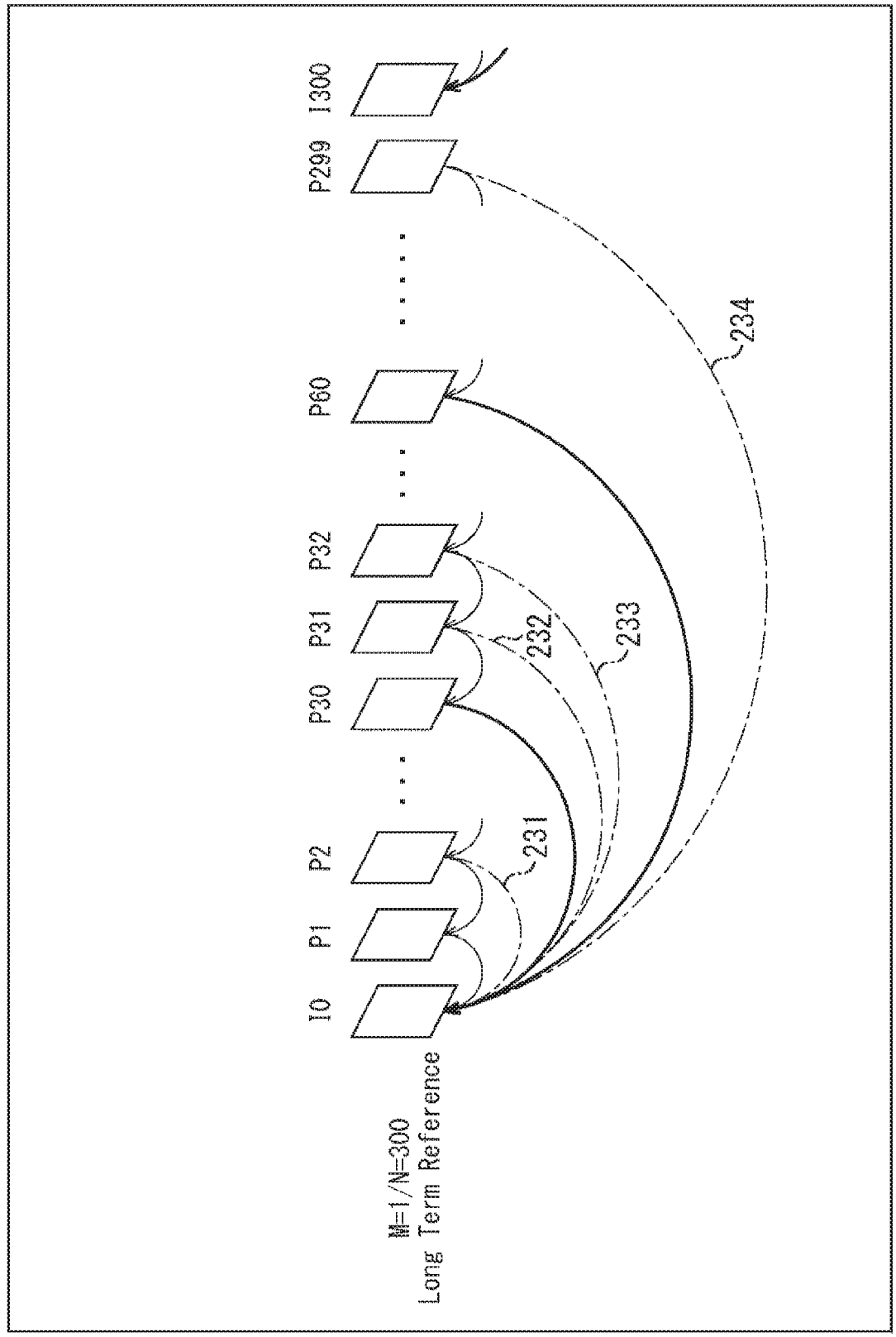
FIG. 19 is a diagram illustrating an example of GOP structure using a long-term reference frame.

An example of a case of applying such a configuration to the GOP structure of FIG. 15 is illustrated in FIG. 19. In the case of the example illustrated in FIG. 19 as well, one GOP has 300 frames, and the long-term reference frame (head frame of GOP) is necessarily referred to in a frame whose frame number is a multiple of 30 such as frame P30 or frame P60, as described with reference to FIG. 15. However, in the case of the example of FIG. 19, when a predetermined condition is satisfied in the other frames, a reference destination is switched from the short-term reference frame to the long-term reference frame as indicated by arrow 231, arrow 232, arrow 233, or arrow 234. In other words, the long-term reference frame is referred to.

By doing so, the chance of referring to the long-term reference frame increases, so it is possible to further suppress occurrence of drift (increase in deterioration of image quality). Thus, deterioration in image quality can be further suppressed.

Moreover, the contents of a condition for switching between reference destinations are optional. In one example, as described above, it may be set as a condition that a difference between a current frame's image and an immediate previous frame's image is compared with a difference between the current frame's image and a long-term reference frame's image and the difference from the immediate previous frame is equal to or larger than the difference from the long-term reference frame.

Application of such GOP structure to the image coding device 100 of FIG. 7 makes it possible for the image coding device 100 to suppress the drift (increase in deterioration of image quality) as described above, thereby suppressing the deterioration in image quality.

Moreover, the length of the GOP (300 frames) and the period referring to the long-term reference frame (30 frames) illustrated in FIG. 19 are illustrative examples, and they are not limited to these values. These values are any value as long as no contradiction arises. In one example, it is sufficient if the period referring to the long-term reference frame is longer than the period of the short-term reference frame and is shorter than the length of the GOP. In addition, also in the case of using the long-term reference frame as described above, B-picture may be used as in the example of FIG. 10.

Figure 20:
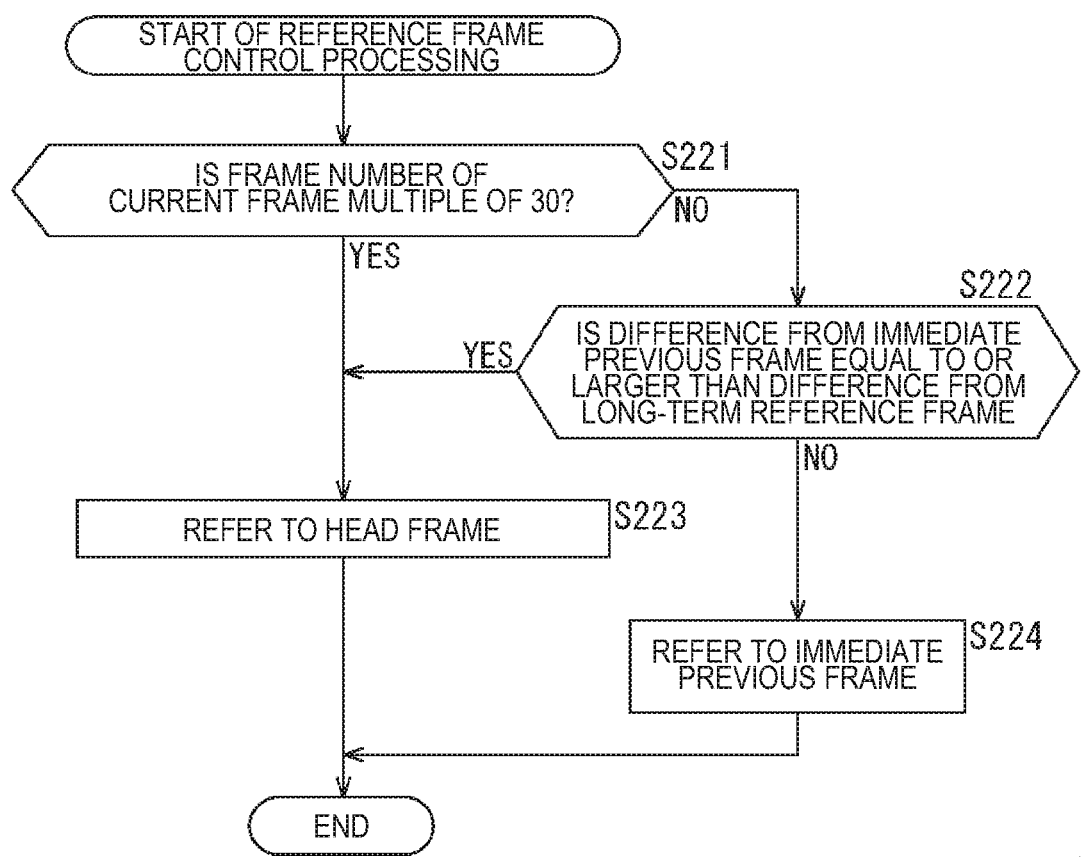
FIG. 20 is a flowchart illustrated to describe an example of a procedure for reference frame control processing.

In this case, the image coding processing is performed in a similar procedure to that of the flowchart of FIG. 13. An example of the procedure for the reference frame control processing in this case is described with reference to the flowchart of FIG. 20.

Upon start of the reference frame control processing, the decoder 118 determines whether or not the frame number of the current frame, which is a frame to be encoded, is a multiple of 30 in step S221. If it is determined that the frame number is not a multiple of 30, then the processing proceeds to step S222.

In step S222, the decoder 118 compares a difference between a current frame's image and an immediate previous frame's image with a difference between the current frame's image and a long-term reference frame's image, and determines whether or not the difference from the immediate previous frame is equal to or larger than the difference from the long-term reference frame. If it is determined that the difference between the current frame's image and the immediate previous frame's image is equal to or larger than the difference between the current frame's image and the long-term reference frame's image, then the processing proceeds to step S223. In other words, even the frame whose frame number is not a multiple of 30, if the condition is satisfied, then the processing proceeds to step S223.

Further, if it is determined in step S221 that the frame number is a multiple of 30, then the processing proceeds to step S223. In step S223, the decoder 118 refers to the long-term reference frame, that is, the first frame of the GOP. In other words, the decoder 118 reads the simple encoded data of the frame I0 from the frame memory 117 and decodes it. Upon completion of the processing of step S223, the reference frame control processing is terminated.

Further, if it is determined in step S222 that the difference between the current frame's image and the immediate previous frame's image is smaller than the difference between the current frame's image and the long-term reference frame's image, then the processing proceeds to step S224. In other words, in a case where the frame whose frame number is not a multiple of 30 and the condition is not satisfied, the processing proceeds to step S224. In step S224, the decoder 118 refers to the short-term reference frame, that is, the immediate previous frame. In other words, the decoder 118 reads the simple encoded data of the immediate previous frame from the frame memory 117 and decodes it. Upon completion of the processing of step S224, the reference frame control processing is terminated.

The respective processing operations performed as described above make it possible to suppress the drift (increase in deterioration of image quality) by the long-term reference frame, thereby suppressing the deterioration in image quality.

Switching Between Long-Term Reference Frame Settings

As a mode of setting a long-term reference frame, a mode of updating a long-term reference frame in a GOP and a mode of not updating are described with reference to FIG. 12, FIG. 15, and other figures, but these two modes can be adaptively selected (switched). In one example, these two modes can be selected (switched) on the basis of a predetermined condition. Although this condition is optional, in one example, the difference between the current frame's image and the long-term reference frame's image is compared with a predetermined threshold value, and modes of setting the long-term reference frame may be switched depending on the comparison result.

Generally, as the difference is larger, the prediction accuracy is lowered and the coding efficiency decreases. Thus, the control of the setting mode of the long-term reference frame as described above makes it possible to apply the mode of setting the long-term reference frame more suitable for the image, thereby suppressing the decrease in coding efficiency.

Procedure for GOP Structure Control

Figure 21:
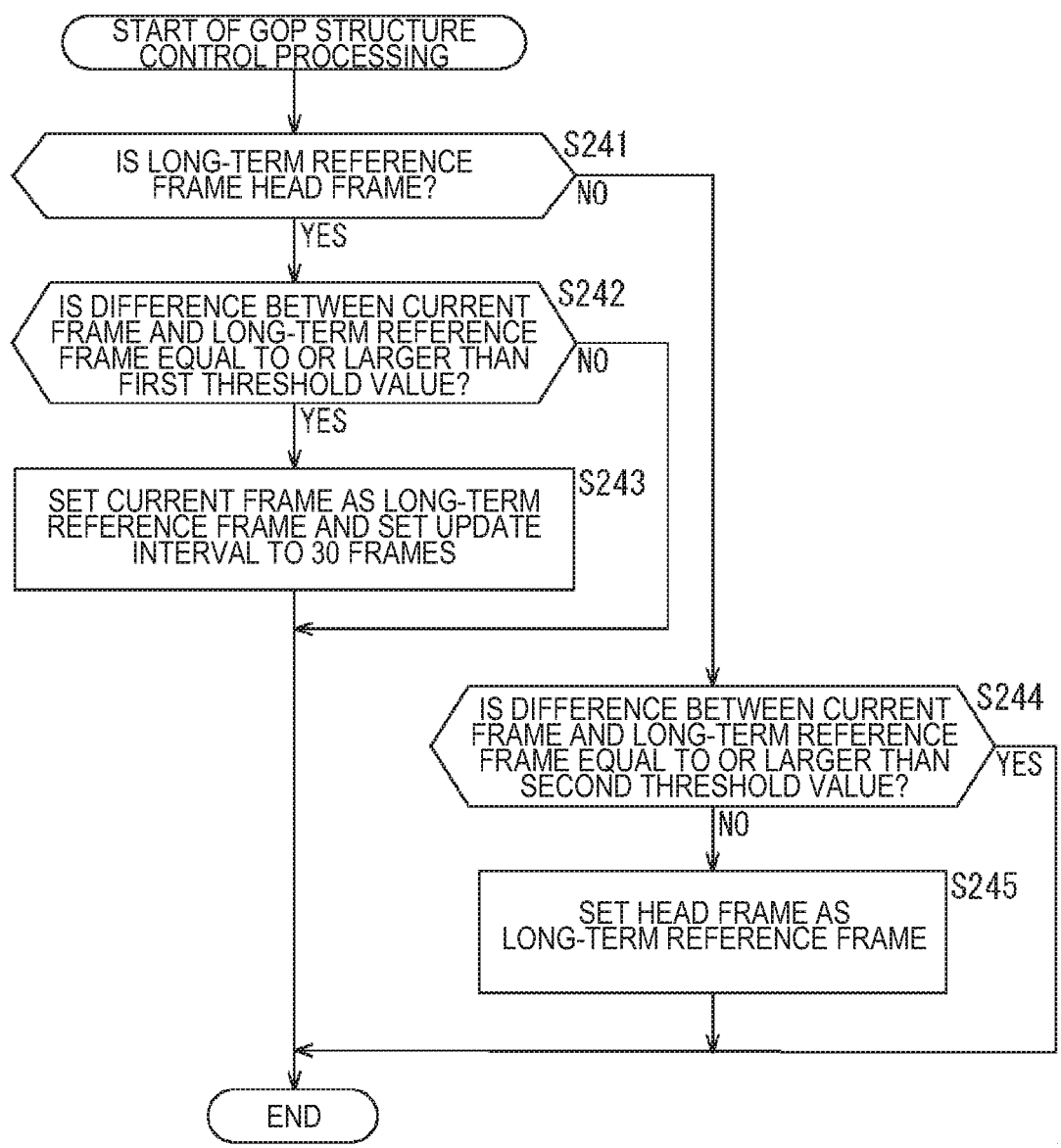
FIG. 21 is a flowchart illustrated to describe an example of a procedure for GOP structure control processing.

In this case, the image coding device 100 sets a mode of the long-term reference frame (performs switching between setting modes) by, in one example, executing GOP structure control processing. An example of the procedure for the GOP structure control processing is described with reference to the flowchart of FIG. 21.

Upon start of the GOP structure control processing, in step S241, the controller 101 determines whether or not the long-term reference frame setting mode is a mode of fixing the long-term reference frame to the head frame of the GOP (mode that does not update the long-term reference frame in the GOP). If this setting mode is determined to be the mode of fixing the long-term reference frame to the head frame of the GOP, then the processing proceeds to step S242.

In step S242, the controller 101 compares the difference between the current frame's image and the long-term reference frame's image with a predetermined first threshold value and determines whether or not the difference is equal to or larger than the first threshold value. If it is determined that the difference is equal to or larger than the first threshold value, then the processing proceeds to step S243.

In step S243, the controller 101 switches the long-term reference frame setting mode into a mode in which the current frame is set as a long-term reference frame and the update interval is set to 30 frames, that is, a mode in which long term is updated in the GOP. Upon completion of the processing of step S243, the GOP structure control processing is terminated. In other words, in this case, the GOP structure as illustrated in FIG. 12 is set.

Further, if it is determined in step S242 that the difference between the current frame's image and the long-term reference frame's image is smaller than the first threshold value, then the mode of setting the long-term reference frame is not switched and the GOP structure control processing is terminated. In other words, in this case, the GOP structure as illustrated in FIG. 15 is set.

Further, if it is determined in step S241 that it is the mode of updating the long-term reference frame in the GOP (a mode in which the long-term reference frame is set to a frame before 30 frames), then the processing proceeds to step S244.

In step S244, the controller 101 compares the difference between the current frame's image and the long-term reference frame's image with a predetermined second threshold value and determines whether or not the difference is equal to or larger than the second threshold value. If it is determined that the difference is smaller than the second threshold value, then the processing proceeds to step S245.

In step S245, the controller 101 switches the mode of setting the long-term reference frame into a mode of fixing the head frame of the GOP to the long-term reference frame, that is, a mode that does not updating the long-term in the GOP. Upon completion of the processing of step S245, the GOP structure control processing is terminated. In other words, in this case, the GOP structure as illustrated in FIG. 15 is set.

Further, if it is determined in step S244 that the difference between the current frame's image and the long-term reference frame's image is equal to or greater than the second threshold value, then the mode of setting the long-term reference frame is not switched and the GOP structure control processing is terminated. In other words, in this case, the GOP structure as illustrated in FIG. 12 is set.

Execution of the GOP structure control processing as described above makes it possible to suppress the decrease in coding efficiency.

Moreover, the magnitude of the first threshold value and the second threshold value described above is optional. The first threshold value and the second threshold value may be the same value or different values from each other.

Further, the control of the long-term reference frame setting mode (GOP structure control) as described above can be similarly applied to switching between the GOP structure illustrated in FIG. 17 and the GOP structure illustrated in FIG. 19.

Control of Period of Long-Term Reference Frame

Further, in the case of the GOP structure illustrated in FIGS. 12, 15, 17, and 19, that is, the GOP structure using the long-term reference frame, the period (the number of frames) referring to the long-term reference frame can be controlled. In other words, the above description is given of the case where the period is, in one example, a fixed value of 30 frames or the like, but this period may be variable.

In one example, the period referring to the long-term reference frame may be set to be capable of being controlled (set) on the basis of a predetermined condition. Although this condition is optional, in one example, the difference between the current frame's image and the long-term reference frame's image is compared with a predetermined threshold value, and the period of referring to the long-term reference frame may be set to be controlled depending on the comparison result.

Generally, as the difference is larger, the prediction accuracy is lowered and the coding efficiency decreases. Thus, the control of the period referring to the long-term reference frame as described above makes it possible to set the period to be more suitable for the image, thereby suppressing the decrease in coding efficiency.

Procedure for Long-Term Reference Frame Period Control Processing

Figure 22:
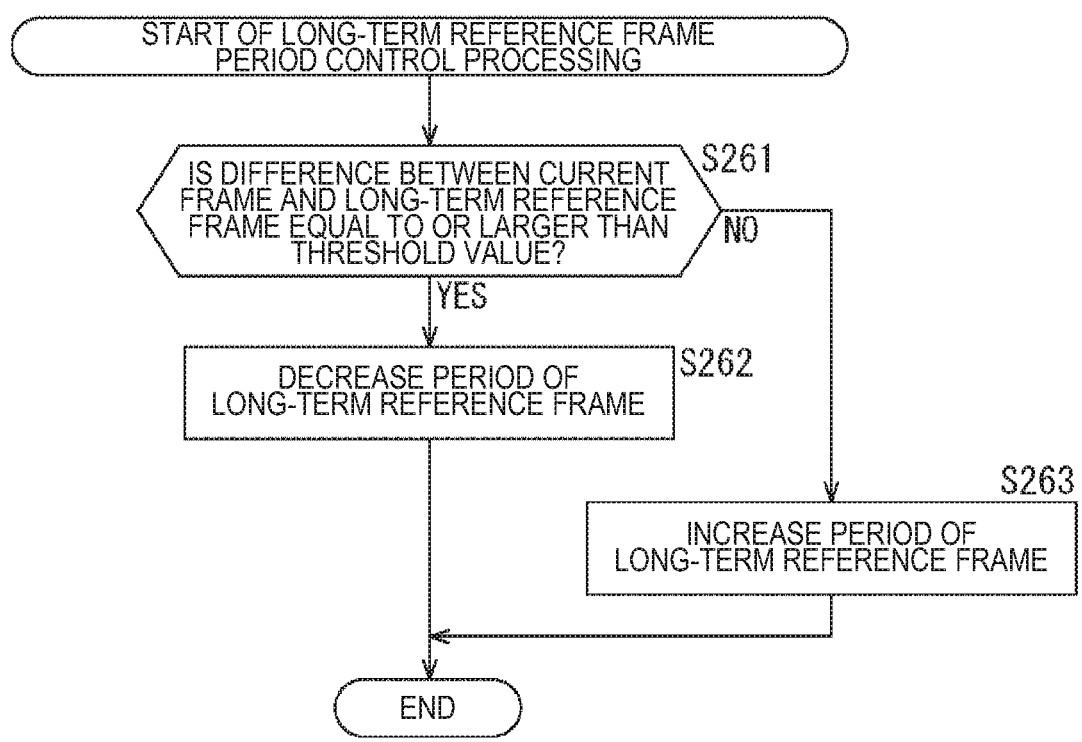
FIG. 22 is a flowchart illustrated to describe an example of a procedure for long-term reference frame period control processing.

In this case, the image coding device 100 sets the period of referring to the long-term reference frame by, in one example, executing long-term reference frame period control processing. An example of the procedure for the long-term reference frame period control processing is described with reference to the flowchart of FIG. 22.

Upon start of the long-term reference frame period control processing, in step S261, the controller 101 compares the difference between the current frame's image and the long-term reference frame's image with a predetermined threshold value, and determines whether or not the difference is equal to or larger than the threshold value. If it is determined that the difference is equal to or larger than the threshold value, then the processing proceeds to step S262.

In step S262, the controller 101 decreases the period of referring to the long-term reference frame to be smaller than the current period, that is, the period is shorten. This makes it possible to suppress the drop in prediction accuracy and to suppress the decrease in coding efficiency. Upon completion of the processing of step S262, the long-term reference frame period control processing is terminated.

Further, if it is determined in step S261 that the difference between the current frame's image and the long-term reference frame's image is smaller than the threshold value, then the processing proceeds to step S263.

In step S263, the controller 101 makes the period of referring to the long-term reference frame longer than the current period. In other words, the period lengthens. This makes it possible to make the GOP structure simpler, thereby suppressing the increase of load in decoding. Upon completion of the processing of step S263, the long-term reference frame period control processing is terminated.

4. Third Embodiment

Control of Simple Encoding and Simple Decoding

The above description is given of the case where simple encoding (simple compression) and simple decoding (simple decompression) are performed. However, execution of simple encoding and simple decompression may be controlled. In this case, it may be possible to control whether or not to use the long-term reference frame depending on whether or not simple encoding and simple decompression is performed.

Image Coding Device

Figure 23:
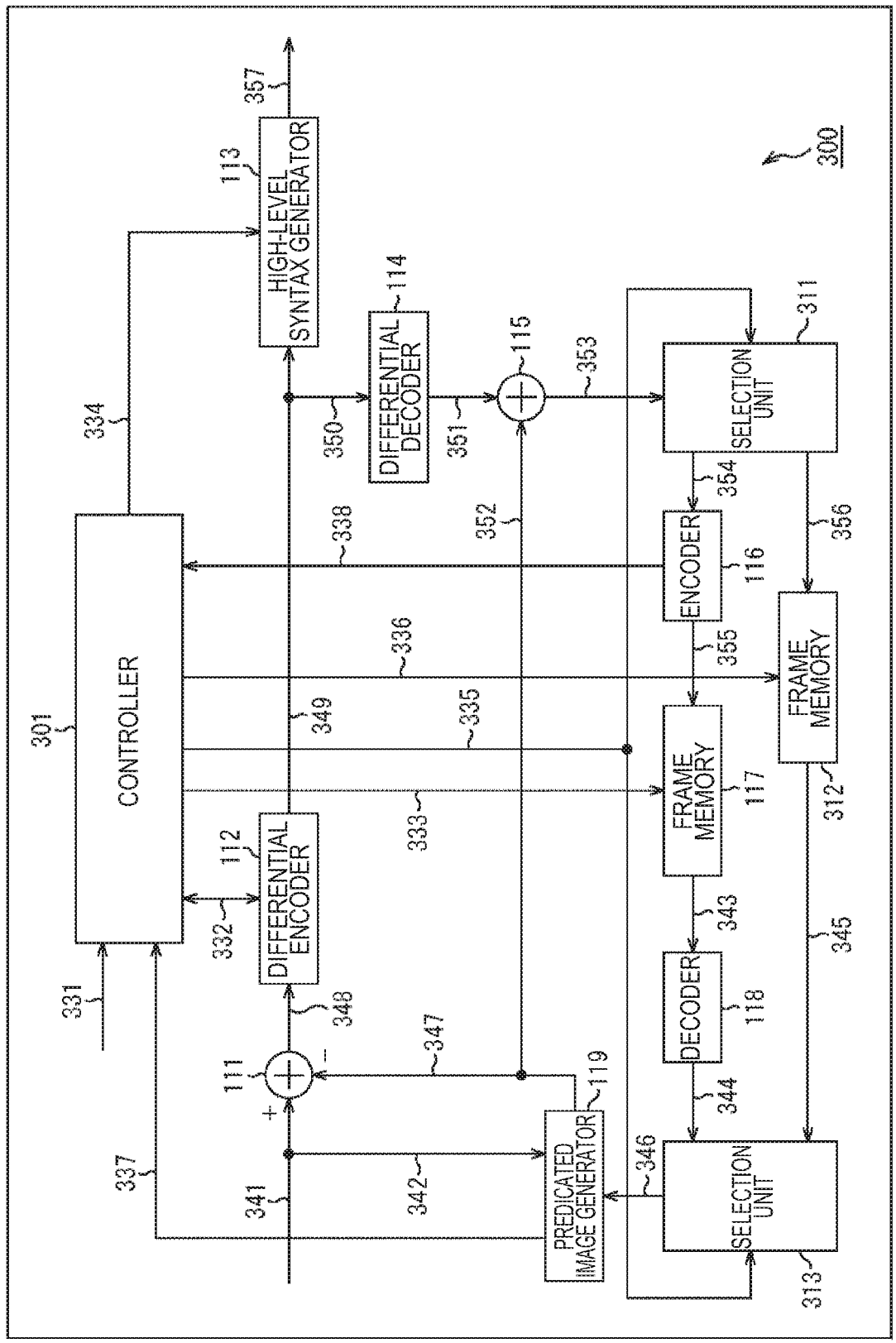
FIG. 23 is a block diagram illustrating an example of a main configuration of an image coding device.
Figure 25:
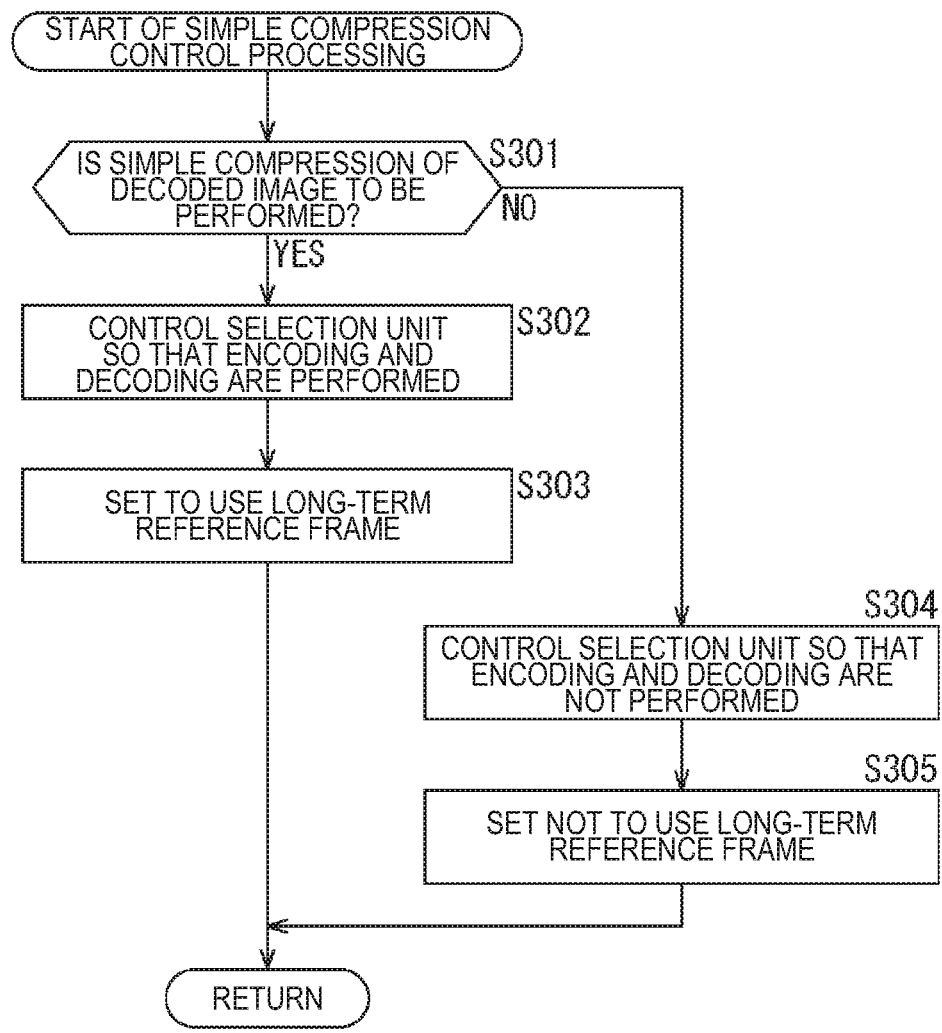
FIG. 25 is a flowchart illustrated to describe an example of a procedure for simple compression control processing.

FIG. 23 is a block diagram illustrating an example of a configuration of an image coding device that is one embodiment of an image processing apparatus to which the present technology is applied in this case. An image coding device 300 illustrated in FIG. 23 is a device for coding image data of a moving image, which is similar to the image coding device 100. As illustrated in FIG. 25, the image coding device 300 includes a controller 301 instead of the controller 101 of the image coding device 100, and includes an arithmetic operation unit 111 to a predicted image generator 119 similar to those of the image coding device 100. The image coding device 300 further includes a selection unit 311, a frame memory 312, and a selection unit 313.

The controller 301 performs processing relating to control of coding. In one example, the controller 301 controls the differential encoder 112 and the frame memory 117 (arrow 332 and arrow 333, respectively). In addition, in one example, the controller 301 supplies information relating to encoding to the high-level syntax generator 113 (arrow 334). In addition, in one example, the controller 301 is capable of accepting input from the outside such as user input (arrow 331). In addition, the controller 301 is capable of acquiring information from the differential encoder 112 and the predicted image generator 119 (arrow 332 and arrow 337, respectively).

Furthermore, the controller 301 controls the selection units 311 and 313 and the frame memory 312 (arrow 335 and arrow 336). In one example, the controller 301 controls the selection unit 311 and the selection unit 313 to control execution of simple encoding and simple decoding. In addition, in the case where the controller 301 does not execute simple encoding and simple decoding, the controller 301 controls the frame memory 312 to store data of the decoded image that is not simple encoded.

Further, the controller 301 is capable of acquiring information relating to the difficulty level of simple encoding from the encoder 116 (arrow 338).

The controller 301 is capable of controlling execution of simple encoding and simple decoding on the basis of any information. In one example, the controller 301 may receive an instruction from the outside such as a user, other device, or the like to control execution of simple encoding and simple decoding in accordance with the instruction. In addition, the controller 301 may control execution of simple encoding and simple decoding on the basis of the input image. In one example, the controller 301 may control execution of simple encoding and simple decoding on the basis of the data amount of the input image. In one example, the simple encoding and simple decoding are prevented from being executed in a case where the data amount of the input image is sufficiently small with respect to the capacity or bandwidth of the frame memory. The simple encoding and simple decoding may be executed in a case where the data amount of the input image is not sufficiently small with respect to the capacity and bandwidth of the frame memory.

The arithmetic operation unit 111 obtains a difference (differential image) between an input image (arrow 341) and a predicted image (arrow 347) supplied from the predicted image generator 119. The arithmetic operation unit 111 supplies the differential image to the differential encoder 112 (arrow 348).

The differential encoder 112 encodes the supplied differential image (arrow 348) using any coding scheme to generate encoded data of the differential image under the control of the controller 101. The differential encoder 112 supplies the generated encoded data to the high-level syntax generator 113 (arrow 349). The differential encoder 112 also supplies the encoded data to the differential decoder 114 (arrow 350).

The high-level syntax generator 113 generates high-level syntax for the supplied encoded data (arrow 349). In this event, the high-level syntax generator 113 incorporates the information relating to coding supplied from the controller 101 into the high-level syntax. The high-level syntax generator 113 associates the generated high-level syntax with the encoded data. The high-level syntax generator 113 outputs the high-level syntax and the encoded data to the outside of the image coding device 100 (arrow 357).

The differential decoder 114 decodes the supplied encoded data (arrow 350) using any decoding scheme corresponding to the encoding scheme of the differential encoder 112. The differential decoder 114 supplies a differential image obtained by the decoding processing to the arithmetic operation unit 115 (arrow 351).

The arithmetic operation unit 115 performs addition of the predicted image (arrow 352) supplied from the predicted image generator 119 to the differential image (arrow 351) supplied from the differential decoder 114 and generates a decoded image corresponding to the input image. The arithmetic operation unit 115 supplies the decoded image to the selection unit 311 (arrow 353).

The selection unit 311 selects either the encoder 116 or the frame memory 312 as a destination to supply the decoded image (arrow 353) supplied from the arithmetic operation unit 115 under the control of the controller 301. In one example, in a case where the controller 301 controls the simple encoding and simple decoding to be performed, the selection unit 311 selects the encoder 116 and supplies the supplied decoded image to the encoder 116 (arrow 354). In addition, conversely, in a case where the controller 301 controls the simple encoding and simple decoding not to be performed, the selection unit 311 selects the frame memory 312 and supplies the supplied decoded image to the frame memory 312 (arrow 356).

The encoder 116 performs simple encoding on the supplied decoded image (arrow 354), which is similar to the case of FIG. 7. The encoder 116 supplies the decoded image subjected to simple coding (encoded data of the decoded image) to the frame memory 117 (arrow 355).

The frame memory 117 stores the supplied encoded data (arrow 355). The frame memory 117 stores the supplied encoded data as a long-term reference frame or a short-term reference frame under the control of the controller 301. The frame memory 117 reads the stored encoded data of the long-term reference frame or the short-term reference frame and supplies it to the decoder 118 (arrow 343) as necessary.

The decoder 118 performs simple decoding (simple decompression) on the encoded data (decoded image subjected to coding) (arrow 343) of the decoded image read from the frame memory 117 using a scheme corresponding to the simple encoding scheme of the encoder 116, which is similar to the case of FIG. 7. The decoder 118 supplies the decoded image obtained by simple decoding to the selection unit 313 as a reference image (arrow 344).

The frame memory 312 stores the supplied decoded image (decoded image that is not subjected to simple encoding) (arrow 356). The frame memory 312 can be implemented by any storage medium, but it may be implemented by using, in one example, DRAM that has large capacity and inexpensive, which is similar to the frame memory 117. The frame memory 312 stores the supplied decoded image as a short-term reference frame under the control of the controller 301. The frame memory 312 reads the stored decoded image and supplies it to the selection unit 313 (arrow 345) as an image of the past frame (reference image), as necessary.

The selection unit 313 selects either the decoder 118 or the frame memory 312 as a source to supply a reference image to be supplied to the predicted image generator 119 under the control of the controller 301. In one example, in the case where the controller 301 controls the simple encoding and simple decoding to be performed, the selection unit 313 selects the decoder 118 and supplies the decoded image (arrow 344) supplied from the decoder 118 to the predicted image generator 119 (arrow 346). In addition, conversely, in the case where the controller 301 controls the simple encoding and simple decoding not to be performed, the selection unit 313 selects the frame memory 312 and supplies the decoded image (arrow 345) supplied from the frame memory 312 to the predicted image generator 119 (arrow 346).

The predicted image generator 119 generates a predicted image of an input image to be subjected to coding processing. The predicted image generator 119 acquires the input image (arrow 342) and the reference image (arrow 346), and generates a predicted image using them. Although this technique of generating a predicted image is optional, in one example, the predicted image generator 119 performs inter-prediction using the long-term reference frame or inter-prediction that does not use the long-term reference frame by using the input image and the predicted image. The predicted image generator 119 further performs intra-prediction similar to AVC, HEVC, or the like, and compares the predicted images generated by the prediction with each other to select an optimum predicted image. The predicted image generator 119 supplies the generated predicted image to the arithmetic operation unit 111 (arrow 347). In addition, the predicted image generator 119 also supplies the predicted image to the arithmetic operation unit 115 (arrow 352). Furthermore, the predicted image generator 119 supplies the information relating to the predicted image to the controller 101 (arrow 337).

In this manner, the control of execution of the simple encoding and simple decoding makes it possible for the image coding device 300 to reduce unnecessary execution of simple encoding and simple decoding, thereby suppressing the deterioration in image quality of the decoded image. In addition, it is possible to suppress an increase of load caused by encoding and decoding. In addition, the control of use of the long-term reference frame depending on execution of the simple encoding and simple decoding makes it possible for the image coding device 300 to be prevented from using the long-term reference frame in the case where the simple encoding and simple decoding is not executed, thereby making configuration of the GOP simpler. This makes it possible to make the decoding easier and to suppress an increase of load. In addition, in the case of executing the simple encoding and simple decoding, it is possible to use the long-term reference frame as described above. Thus, occurrence of drift can be suppressed and deterioration in image quality of the decoded image can be suppressed.

Procedure for Image Coding Processing

An example of the procedure for the image coding processing in this case is described with reference to the flowchart of FIG. 24. Upon start of the image coding processing, the controller 301 of the image coding device 300, in step S281, executes simple compression control processing and performs setting of simple compression and a long-term reference frame. Details of this simple compression control processing will be described later.

In step S282, the high-level syntax generator 113 generates syntax including information indicating the setting in accordance with the setting in step S281.

In step S283, the decoder 118 reads a decoded image subjected to simple encoding (simple encoded data of the decoded image) corresponding to the input image from the frame memory 117 and performs simple decoding on it in accordance with the setting in step S281. Moreover, this processing is omitted in the case where the simple encoding and simple decoding are controlled not to be executed in step S281.

In step S284, the predicted image generator 119 generates a predicted image with a prediction technique that uses inter-prediction and intra-prediction using the decoded image supplied from the decoder 118 or the frame memory 312 through the selection unit 313 and the input image.

The respective processing operations from step S285 to step S288 are executed in a similar manner to those from step S135 to step S138 in FIG. 13.

In step S289, the encoder 116 performs simple encoding on the decoded image obtained in step S288 in accordance with the setting in step S281. Moreover, this processing is omitted in the case where the simple encoding and simple decoding are controlled not to be executed in step S281.

In the case where the simple encoding and simple decoding are controlled to be executed in step S281, the frame memory 117, in step S290, stores the simple encoded data of the decoded image obtained in step S289 as a long-term reference frame or a short-term reference frame in accordance with the setting in step S281. Moreover, in the case where the simple encoding and simple decoding are controlled not to be executed in step S281, the frame memory 312 stores the decoded image obtained in step S288 as a short-term reference frame.

In step S291, the high-level syntax generator 113 associates the high-level syntax generated in step S282 with the encoded data generated in step S286. Then, the high-level syntax generator 113 outputs the encoded data (and high-level syntax) to the outside of the image coding device 100.

Upon completion of the processing of step S291, the image coding processing is terminated.

Procedure for Simple Compression Control Processing

Figure 24:
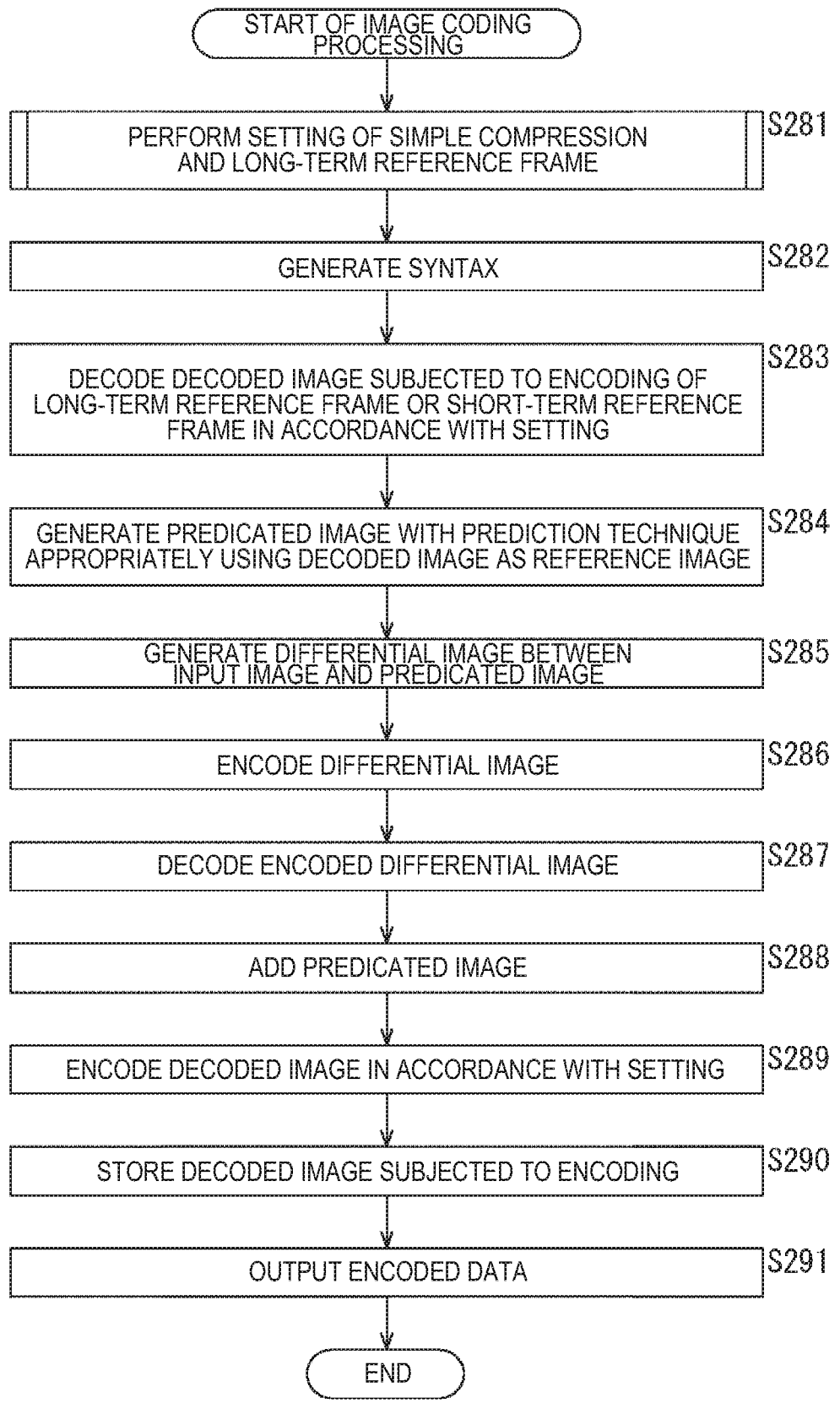
FIG. 24 is a flowchart illustrated to describe an example of a procedure for image coding processing.

An example of the procedure for the simple compression control processing executed in step S281 of FIG. 24 is described below with reference to the flowchart of FIG. 25.

Upon start of the simple compression control processing, the controller 301 determines whether or not to perform simple compression of the decoded image in step S301. If it is determined that the simple compression of the decoded image is performed on the basis of any information, then the processing proceeds to step S302.

In step S302, the controller 301 controls the selection unit 311 and the selection unit 313 so that the simple encoding and simple decoding are performed. In step S303, the controller 301 controls the frame memory 117 so that the long-term reference frame is set to be used. Upon completion of the processing of step S302, the simple compression control processing is terminated.

Further, if it is determined in step S301 that no simple compression of the decoded image is performed, then the processing proceeds to step S304. In step S304, the controller 301 controls the selection unit 311 and the selection unit 313 so that the simple encoding and simple decoding are not performed. In step S305, the controller 301 controls the frame memory 312 so that the long-term reference frame is set not to be used. Upon completion of the processing of step S305, the simple compression control processing is terminated.

Execution of the respective processing operations as described above make it possible to reduce unnecessary execution of simple encoding and simple decoding and to suppress deterioration in image quality of the decoded image.

First Procedure for Reference Frame Control Processing

Figure 26:
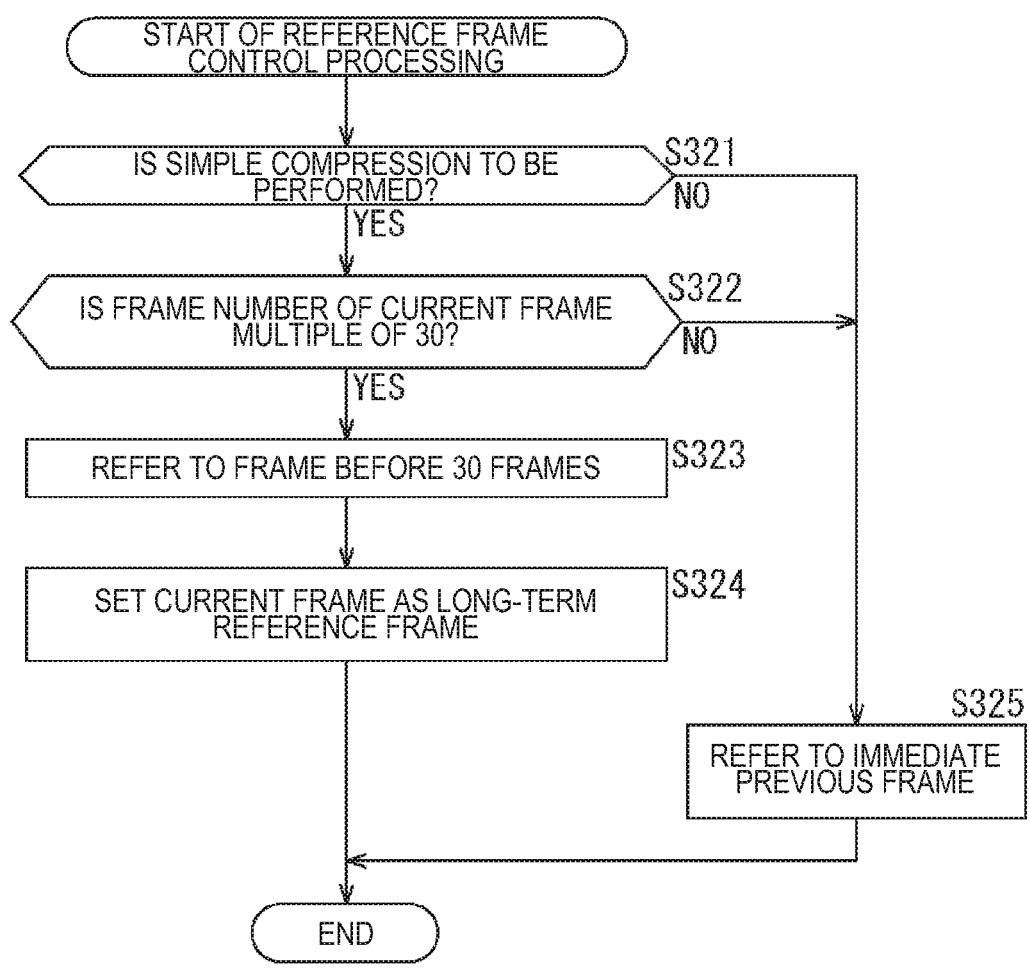
FIG. 26 is a flowchart illustrated to describe an example of a procedure for reference frame control processing.

In such a case, the reference frame control processing is executed, in one example, in the procedure as shown in the flowchart of FIG. 26.

Upon start of the reference frame control processing, the decoder 118 determines whether or not to perform simple compression in step S321. If it is determined that the simple compression is performed, then the processing proceeds to step S322. The respective processing operations in steps S322 to S324 are executed in a similar manner to those in step S161 to step S163 in FIG. 14. Upon completion of the processing of step S324, the reference frame control processing is terminated.

On the other hand, if it is determined in step S321 that no simple compression is performed, then the processing proceeds to step S325. In addition, if it is determined in step S322 that the frame number of the current frame is not a multiple of 30, then the processing proceeds to step S325.

Figure 14:
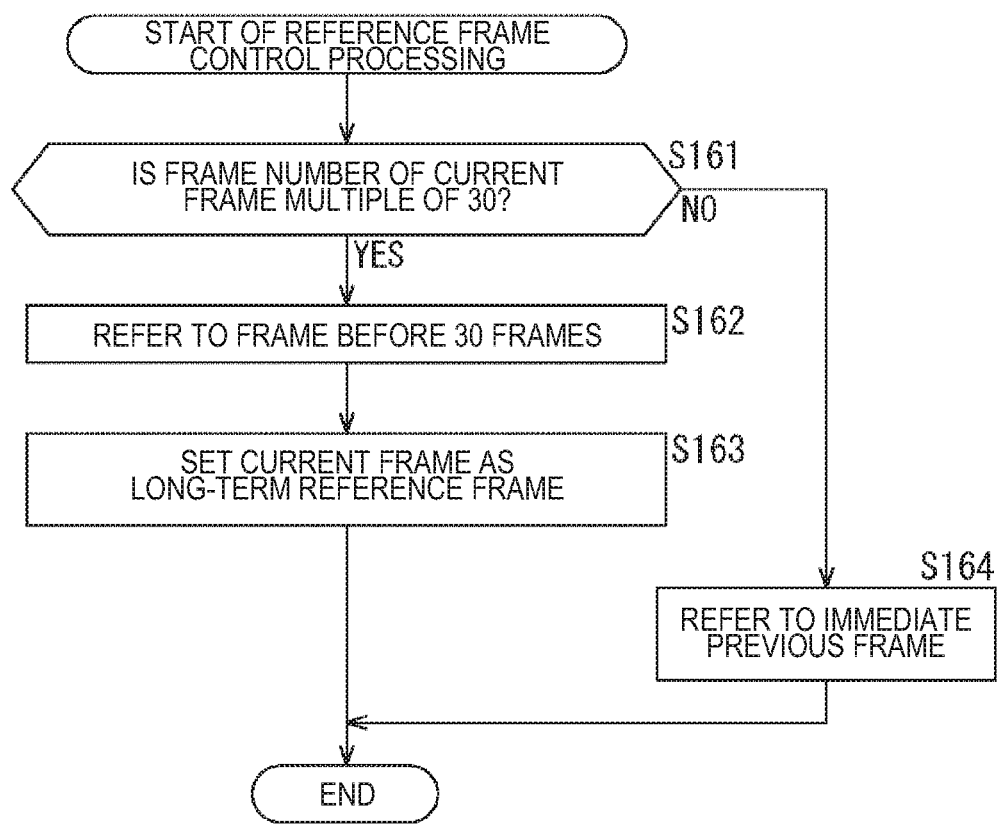
FIG. 14 is a flowchart illustrated to describe an example of a procedure for reference frame control processing.

The processing of step S325 is executed in a similar manner to the processing of step S164 of FIG. 14. Upon completion of the processing of step S325, the reference frame control processing is terminated.

The execution of the reference frame control processing as described above makes it possible to refer to the long-term reference frame only in the case where the simple compression is performed.

Second Procedure for Reference Frame Control Processing

Figure 27:
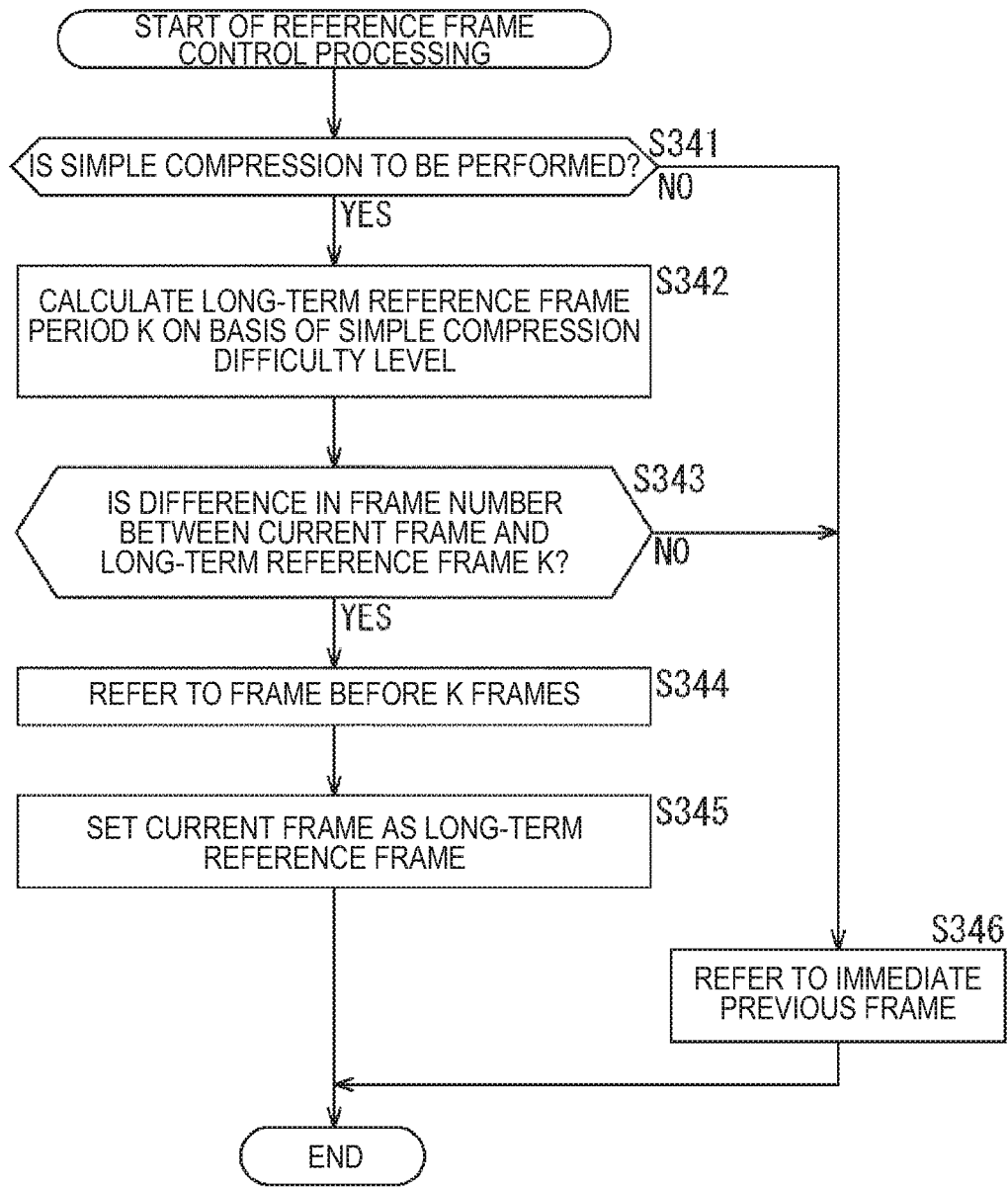
FIG. 27 is a flowchart illustrated to describe an example of a procedure for reference frame control processing.

Furthermore, the period of using the long-term reference of the case of using the long-term reference frame may be set on the basis of the difficulty level of simple compression. The reference frame control processing in this case is executed, in one example, in the procedure as shown in the flowchart of FIG. 27.

Upon start of the reference frame control processing, the decoder 118 determines whether or not the simple compression is performed in step S341. If it is determined that the simple compression is performed, then the processing proceeds to step S342.

In step S342, the controller 301 acquires information relating to simple compression from the encoder 116, obtains a difficulty level of simple compression on the basis of the information, and further calculates a period of using the long-term reference frame (long-term reference frame period K) on the basis of the difficulty level of simple compression.

In step S343, the decoder 118 determines whether or not the difference in frame number between the current frame and the long-term reference frame is identical to the long-term reference frame period K. If it is determined that the difference in frame number between the current frame and the long-term reference frame is identical to the long-term reference frame period K, then the processing proceeds to step S344.

In step S344, the decoder 118 refers to the long-term reference frame, that is, the frame before K frames. In other words, the decoder 118 reads the simple encoded data of the frame before K frames from the frame memory 117 and decodes it.

In step S345, the frame memory 117 sets the current frame as a long-term reference frame. In other words, the frame memory 117 stores simple encoded data of the current frame supplied from the encoder 116 as a long-term reference frame. Upon completion of the processing of step S345, the reference frame control processing is terminated.

Further, if it is determined in step S341 that no simple compression is performed, then the processing proceeds to step S346. In addition, if it is determined in step S343 that the difference in frame number between the current frame and the long-term reference frame is not identical to the long-term reference frame period K, then the processing proceeds to step S346.

In step S346, the decoder 118 refers to the short-term reference frame, that is, the immediate previous frame. In other words, the decoder 118 reads the simple encoded data of the immediate previous frame from the frame memory 117 and decodes it. Upon completion of the processing of step S346, the reference frame control processing is terminated.

The processing performed as described above makes it possible to set the long-term reference frame period K (length of period) on the basis of the content of the image (difficulty level of simple compression). Thus, it is possible to suppress the decrease in coding efficiency.

Moreover, the control of execution of simple encoding and simple decoding described with reference to FIG. 23 and other figures may be applied to other examples described above, such as the case where the long-term reference frame is not updated in the GOP, the case where the long-term reference frame is adaptively referred to, and the case where the length of the GOP is controlled. Even in these cases, the same effects as those of the present embodiment can be achieved.

5. Fourth Embodiment

Application to HEVC/AVC

The above description is given that the encoding scheme of the differential encoder 112 and the decoding scheme of the differential decoder 114 are optional, but these encoding and decoding schemes may be, in one example, AVC or HEVC. In other words, the present technology may be applied to an AVC or HEVC coding device.

Figure 28:
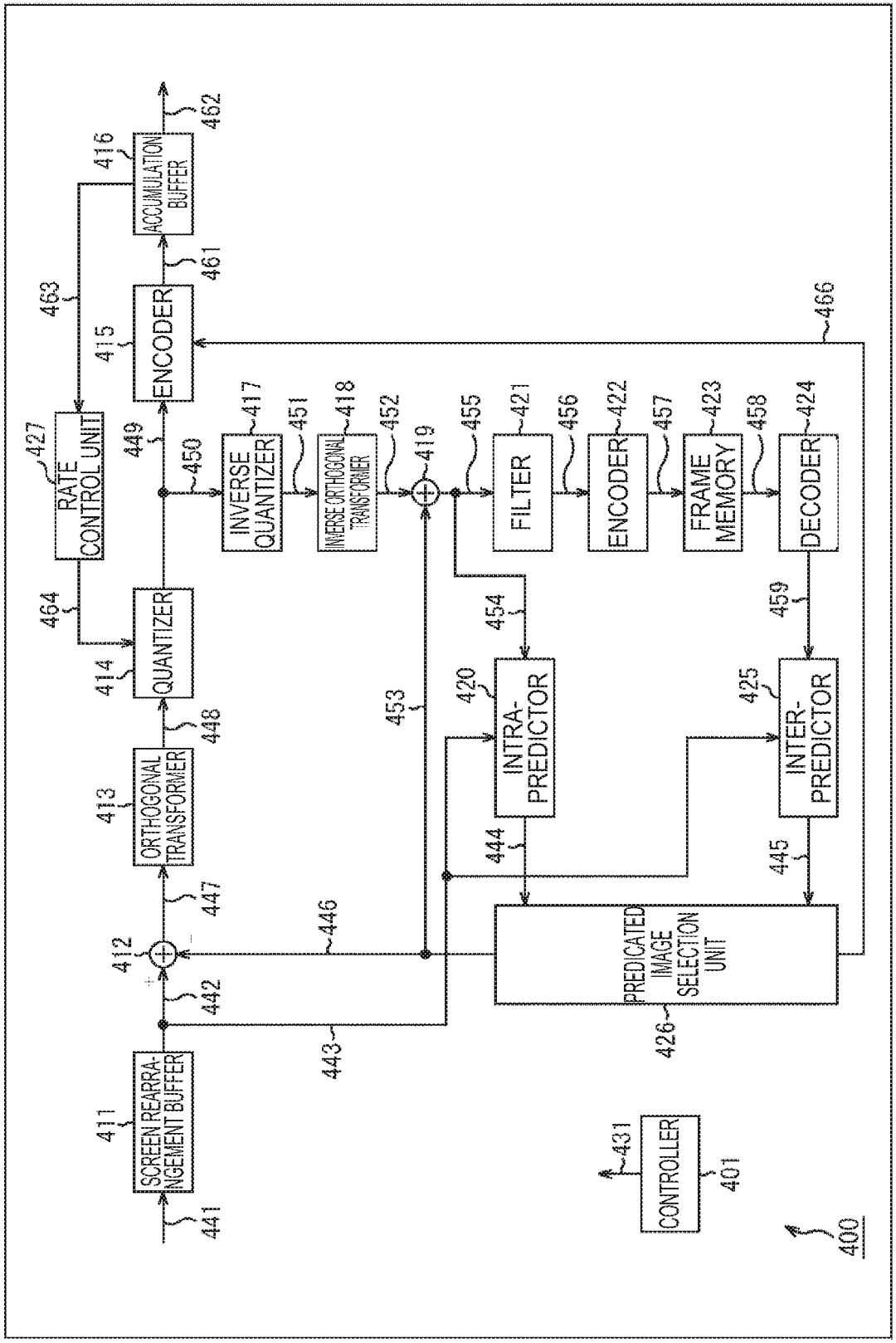
FIG. 28 is a block diagram illustrating an example of a main configuration of an image coding device.

A main configuration example of the image coding device in this case is illustrated in FIG. 28. An image coding device 400 illustrated in FIG. 28 is a coding device that encodes an input image using AVC or HEVC. The image coding device 400 performs processing similar to that of the image coding device 100 in FIG. 7.

As illustrated in FIG. 28, the image coding device 400 includes a controller 401, a screen rearrangement buffer 411, an arithmetic operation unit 412, an orthogonal transformer 413, a quantizer 414, an encoder 415, an accumulation buffer 416, an inverse quantizer 417, an inverse orthogonal transformer 418, an arithmetic operation unit 419, an intra-predictor 420, a filter 421, an encoder 422, a frame memory 423, a decoder 424, an inter-predictor 425, a predicted image selection unit 426, and a rate control unit 427.

The controller 401 performs control processing relating to coding. In one example, the controller 401 controls the operation of each component by supplying control information or the like to each processing component (arrow 431). Moreover, the controller 401 is capable of acquiring any information from each processing component. In addition, the controller 401 is also capable of acquiring information input from the outside of the image coding device 400. Then, the controller 401 is capable of performing processing relating to control on the basis of the acquired information.

The screen rearrangement buffer 411 rearranges the respective frames of the input image (arrow 441) from the display order to the coding order, and supplies each frame of the input image to the arithmetic operation unit 412, the intra-predictor 420, the inter-predictor 425, or the like in the rearranged order (arrow 442 and arrow 443).

The arithmetic operation unit 412 subtracts the predicted image (arrow 446) supplied from the predicted image selection unit 426 from the input image (arrow 442) read from the screen rearrangement buffer 411 and calculates a differential image between the input image and the predicted image. The arithmetic operation unit 412 supplies the differential image to the orthogonal transformer 413 (arrow 447).

The orthogonal transformer 413 orthogonally transforms the differential image (arrow 447) using a predetermined technique to obtain an orthogonal transformation coefficient. This orthogonal transformation technique is optional. The orthogonal transformer 413 supplies the generated orthogonal transformation coefficient to the quantizer 414 (arrow 448).

The quantizer 414 quantizes the orthogonal transformation coefficient (arrow 448) using a predetermined technique to obtain quantized data. This quantization technique is optional. The quantizer 414 supplies the generated quantized data to the encoder 415 and the inverse quantizer 417 (arrow 449 and arrow 450 respectively).

The encoder 415 encodes image-related information (arrow 466), such as quantized data (arrow 449) and information relating to the optimum prediction mode, to generate encoded data. The encoder 415 supplies the encoded data to the accumulation buffer 416 (arrow 461).

The accumulation buffer 416 temporarily holds the encoded data (arrow 461) and outputs it to the outside of the image coding device 400 as a bit stream or the like at a predetermined timing (arrow 462). In addition, the accumulation buffer 416 supplies information relating to the code amount of the accumulated encoded data to the rate control unit 427 (arrow 463).

Further, the inverse quantizer 417 inversely quantizes the quantized data (arrow 450) supplied from the quantizer 414 using a technique that supports quantization by the quantizer 414, and restores the orthogonal transformation coefficient. The inverse quantizer 417 supplies the orthogonal transformation coefficient to the inverse orthogonal transformer 418 (arrow 451).

The inverse orthogonal transformer 418 performs inverse orthogonal transformation on the orthogonal transformation coefficient (arrow 451) using a technique that supports orthogonal transformation processing by the orthogonal transformer 413, and restores the differential image. The inverse orthogonal transformer 418 supplies the restored differential image to the arithmetic operation unit 419 (arrow 452).

The arithmetic operation unit 419 adds the predicted image (arrow 453) supplied from the predicted image selection unit 426 to the restored differential image (arrow 452), and outputs a locally reconstructed image (also referred to as a reconstructed image). The arithmetic operation unit 419 supplies the reconstructed image to the intra-predictor 420 and the filter 421 (arrow 454 and arrow 455 respectively).

The intra-predictor 420 performs intra-prediction using a pixel value (arrow 454) in a picture to be processed that is a reconstructed image supplied as a reference image from the arithmetic operation unit 419, the input image (arrow 443) supplied from the screen rearrangement buffer 411, or the like, and generates a predicted image. This intra-prediction technique is optional. The intra-predictor 420 supplies the generated predicted image, information relating to intra-prediction, or the like to the predicted image selection unit 426 (arrow 444).

The filter 421 performs filtering processing on the reconstructed image (arrow 455) using, in one example, an appropriate deblocking filter or the like to obtain a decoded image. The contents of this filtering processing are optional, and any kind of filtering processing may be performed. The filter 421 supplies the decoded image to the encoder 422 (arrow 456).

The encoder 422 performs simple encoding (simple compression) on the decoded image (arrow 456) to obtain simple encoded data. The encoder 422 supplies the simple encoded data of the decoded image to the frame memory 423 (arrow 457).

The frame memory 423 stores simple encoded data (arrow 457) of the decoded image in its own storage area. The frame memory 423 may be configured as DRAM or the like, has a large-capacity storage area, and is capable of storing, in one example, decoded images (simple encoded data) for a plurality of frames. The simple encoded data is appropriately read as a reference image or the like in response to a request from the inter-predictor 425 or the like. The frame memory 423 supplies the read simple encoded data to the decoder 424 (arrow 458).

The decoder 424 performs simple decoding (simple decompression) on the simple encoded data (arrow 458) read from the frame memory 423 to obtain a decoded image. The decoder 424 supplies the decoded image to the inter-predictor 425 (arrow 459).

The inter-predictor 425 performs inter-prediction processing (motion prediction processing and compensation processing) using the input image (arrow 443) supplied from the screen rearrangement buffer 411, the reference image (decoded image) supplied from the decoder 424, or the like to generate a predicted image. The technique of performing the inter-prediction is optional. The inter-predictor 425 supplies the generated predicted image, information relating to inter-prediction, or the like to the predicted image selection unit 426 (arrow 445).

The predicted image selection unit 426 selects an optimum prediction mode from among the predicted image (arrow 444) supplied from the intra-predictor 420 and the predicted image (arrow 445) supplied from the inter-predictor 425. The predicted image selection unit 426 supplies the predicted image of the selected mode to the arithmetic operation unit 412 and the arithmetic operation unit 419 (arrow 446 and arrow 453 respectively). In addition, the predicted image selection unit 426 supplies a part or all of the pieces of information relating to the prediction result of the selected mode (information relating to intra-prediction, information relating to inter-prediction, etc.) to the encoder 415 as information relating to the optimum prediction mode (arrow 466).

The rate control unit 427 controls the rate of quantization operation by the quantizer 414 (arrow 464) such that overflow or underflow does not occur on the basis of the information (arrow 463), which is supplied from the accumulation buffer 416 and is related to the code amount of the encoded data accumulated in the accumulation buffer 416.

Each processing component of the image coding device 100 corresponds to each processing component of the image coding device 400. In one example, the controller 101 corresponds to the controller 401. In addition, the arithmetic operation unit 111 corresponds to the arithmetic operation unit 412. In addition, the differential encoder 112 and the high-level syntax generator 113 correspond to the orthogonal transformer 413 to the accumulation buffer 416, respectively. In addition, the differential decoder 114 and the arithmetic operation unit 115 correspond to the inverse quantizer 417, the inverse orthogonal transformer 418, the arithmetic operation unit 419, and the filter 421. Components of the encoder 116 to the decoder 118 correspond to components of the encoder 422 to the decoder 424. In addition, the predicted image generator 119 corresponds to the intra-predictor 420, the inter-predictor 425, and the predicted image selection unit 426.

In other words, the respective technology described above is applicable to the AVC or HEVC coding device. Thus, it is also possible for the image coding device 400 to suppress drift (increase in deterioration of image quality), thereby suppressing deterioration in image quality.

Figure 29:
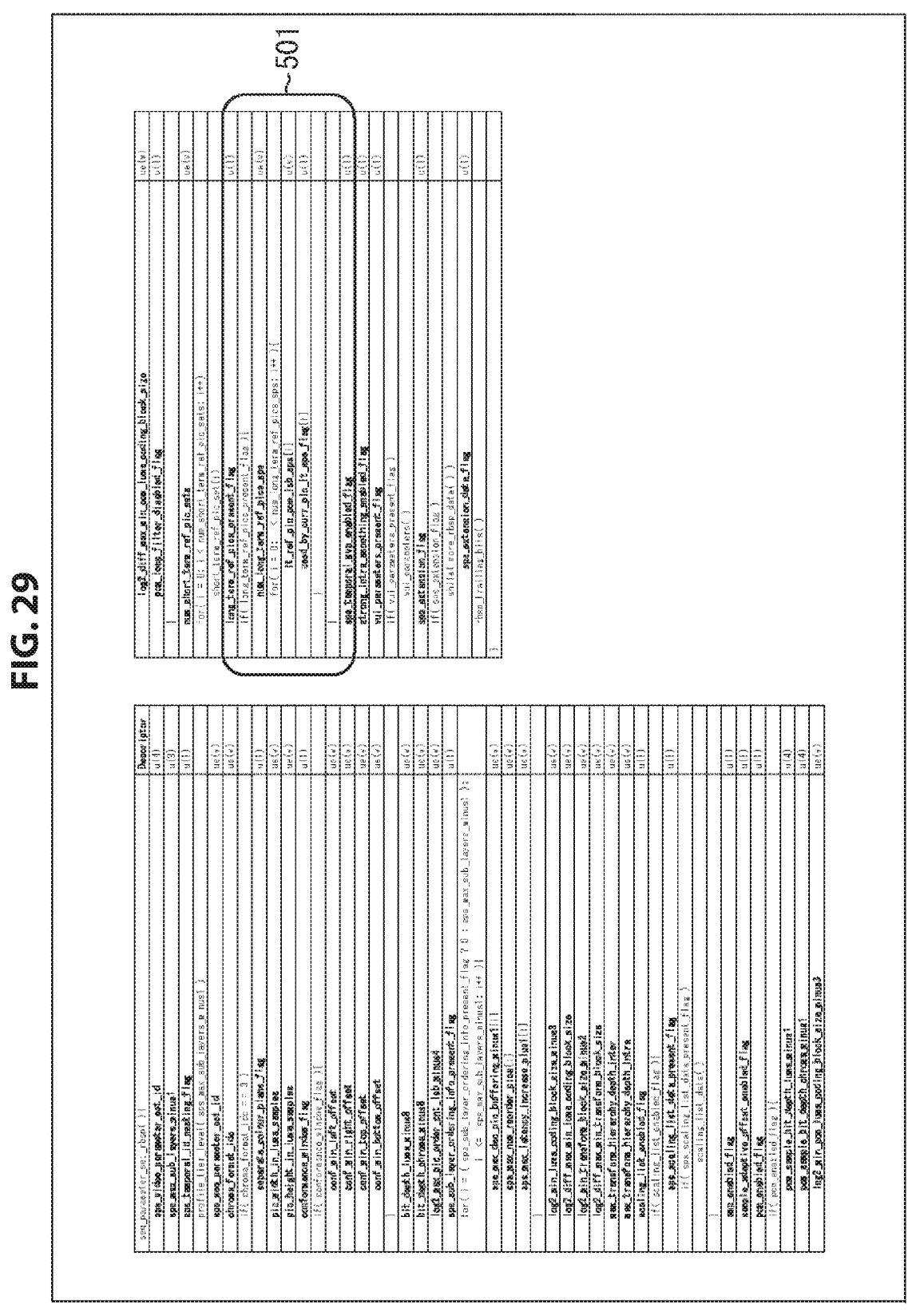

An example of the sequence parameter set of HEVC is illustrated in FIG. 29. In the case of the image coding device 400, the encoder 415 sets control information (e.g., long_term_ref_pics_present_flag, etc.) relating to the long-term reference frame, as in the portion surrounded by a frame 501 in the sequence parameter set (SPS).

An example of syntax of a slice header of HEVC is illustrated in FIG. 30. The encoder 415 of the image coding device 400 sets control information (e.g., num_long_term_sps, num_long_term_pics, etc.) relating to the long-term reference frame, as in a portion surrounded by a frame 502 in the slice header (slice segment header ( )).

This makes it possible for the image coding device 400 to transmit the control information relating to the long-term reference frame of HEVC to the decoding side.

Figure 32:
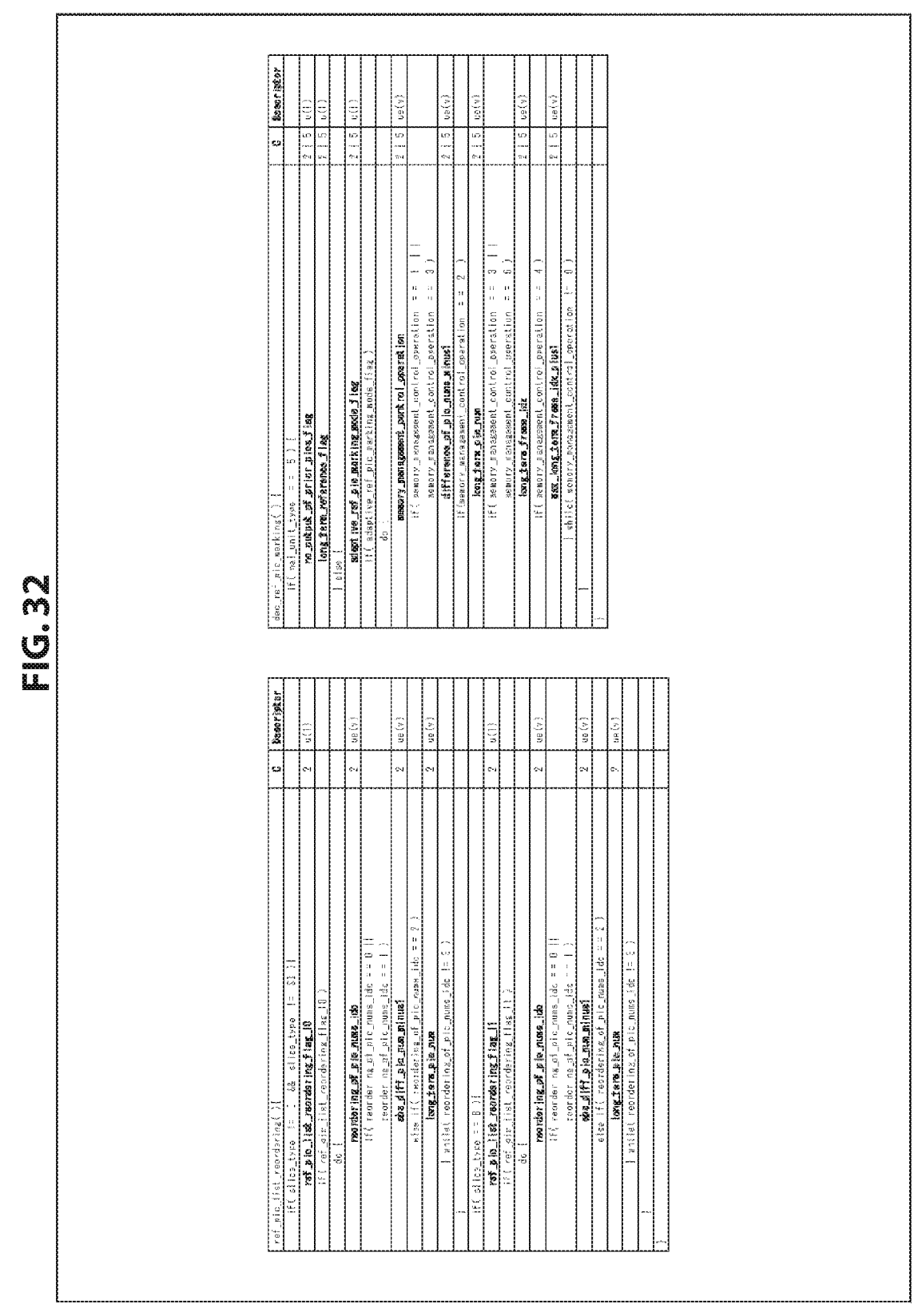

An example of a slice header of AVC is illustrated in FIGS. 31 and 32. In the case of the image coding device 400, the encoder 415 sets control information (e.g., dec_ref_pic_marking, etc.) relating to the long-term reference frame, as in the portion surrounded by a frame 503 in the slice header (slice_header) of FIG. 31. In addition, the encoder 415 sets the syntax regarding the details of the control information relating to the long-term reference frame, as in the example illustrated in FIG. 32.

This makes it possible for the image coding device 400 to transmit the control information relating to the long-term reference frame of AVC to the decoding side.

Procedure for Image Coding Processing

Figure 33:
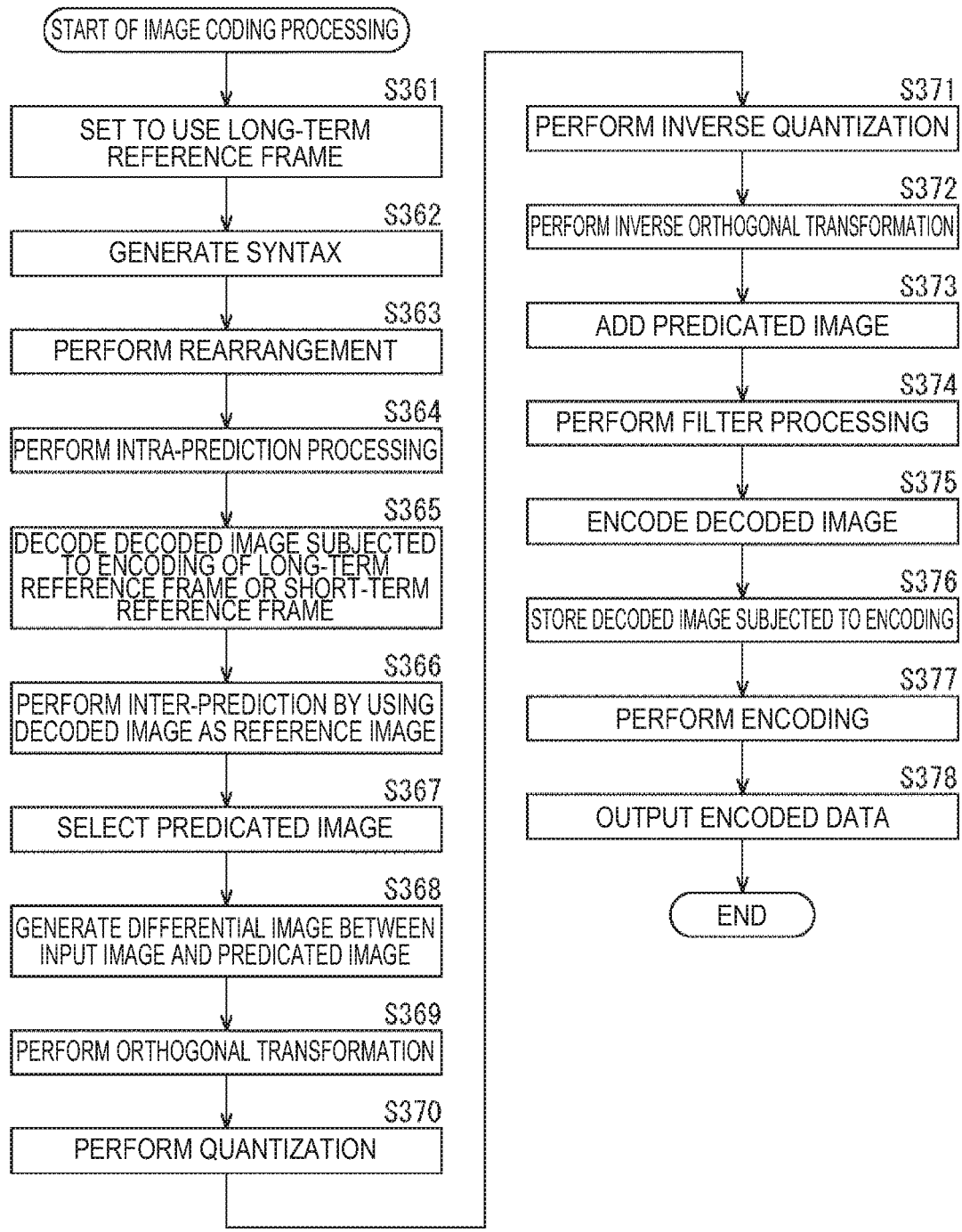
FIG. 33 is a flowchart illustrated to describe an example of a procedure for image coding processing.

An example of the procedure for the image coding processing in this case is described with reference to the flowchart of FIG. 33. Upon start of the image coding processing, in step S361, the controller 401 controls the respective processing units so that they are set to use the long-term reference frame in generating the predicted image. In step S362, the encoder 415 generates syntax.

In step S363, the screen rearrangement buffer 411 rearranges the order of frames from the display order to the coding order. In step S364, the intra-predictor 420 performs intra-prediction. In step S365, the decoder 424 reads the simple encoded data of the decoded image of the long-term reference frame or the short-term reference frame from the frame memory 523 and decodes it. In step S366, the inter-predictor 425 performs inter-prediction by using the decoded image acquired in step S365 as a reference image. In step S367, the predicted image selection unit 426 selects a predicted image of the optimum prediction mode from among the predicted image obtained in step S364 and the predicted image obtained in step S366.

In step S368, the arithmetic operation unit 412 generates a differential image between the input image and the predicted image selected in step S367. In step S369, the orthogonal transformer 413 orthogonally transforms the differential image to obtain an orthogonal transformation coefficient. In step S370, the quantizer 414 quantizes the orthogonal transformation coefficient to obtain quantized data.

In step S371, the inverse quantizer 417 inversely quantizes the quantized data and restores the orthogonal transformation coefficient. In step S372, the inverse orthogonal transformer 418 performs inverse orthogonal transformation on the orthogonal transformation coefficient and restores the differential image. In step S373, the arithmetic operation unit 419 adds the predicted image selected in step S367 to the differential image to obtain a reconstructed image. In step S374, the filter 421 performs filter processing on the reconstructed image to obtain a decoded image. In step S375, the encoder 422 performs simple encoding on the decoded image to generate simple encoded data. In step S376, the frame memory 423 stores the simple encoded data.

In step S377, the encoder 415 encodes the quantized data obtained in step S370 and generates encoded data. In step S378, the accumulation buffer 416 temporarily holds the encoded data, and then outputs it to the outside of the image coding device 400. Upon completion of the processing of step S378, the image coding processing is terminated.

The image coding processing performed in this manner makes it possible for the image coding device 400 to suppress drift (increase in deterioration of image quality), thereby suppressing deterioration in image quality even in the case of AVC or HEVC.

Moreover, although the above description is given of the case of using the long-term reference frame, the other present technology described above is also applicable to image coding devices that perform coding of AVC or HEVC.

6. Fifth Embodiment

Increase of Drift Due to Intra-Prediction

Figure 34C:
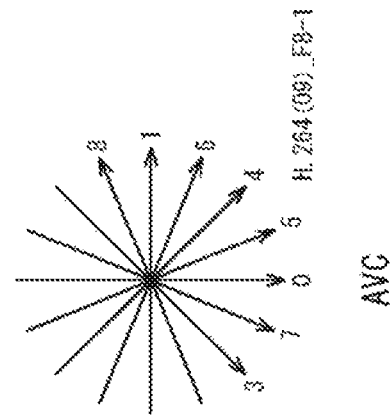
FIGS. 34A, 34B, and 34C are diagrams illustrated to describe an example of intra-prediction.
Figure 34B:
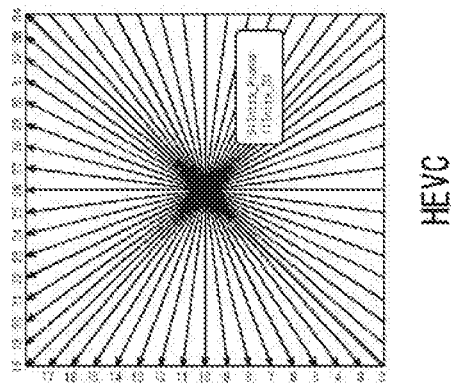
Figure 34A:
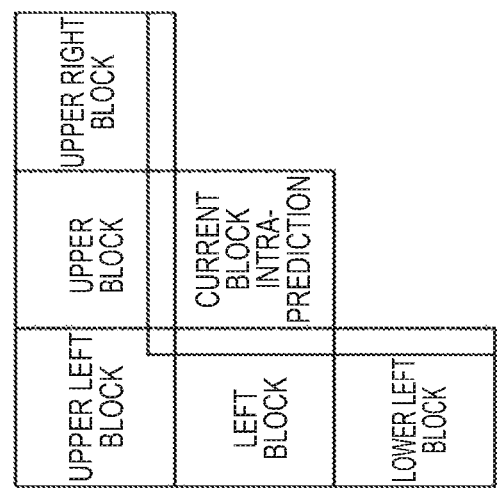

In intra-prediction performed in AVC, HEVC, or the like, the prediction is performed by using neighboring pixels of the current block to be processed, in one example, as shown in FIG. 34A. In one example, in the case of HEVC, the prediction direction is selected from among candidates as shown in FIG. 34B In addition, in one example, in the case of AVC, the prediction direction is selected from among candidates as shown in FIG. 34C.

Figure 35B:
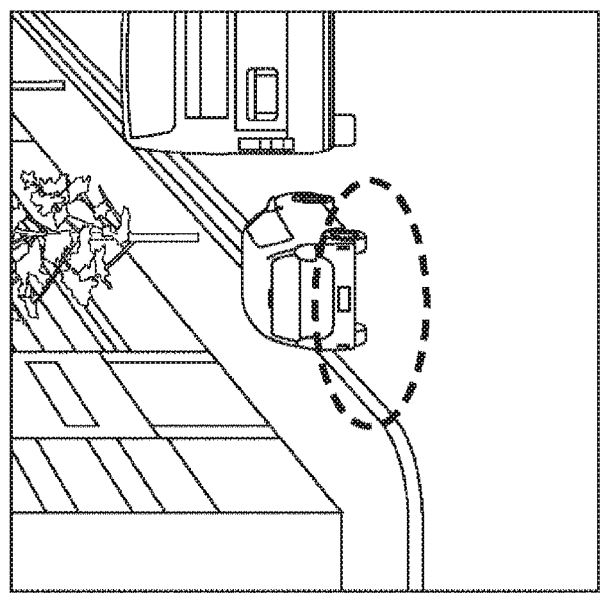
FIGS. 35A and 35B are diagrams illustrating an example of how drift occurs.
Figure 35A:
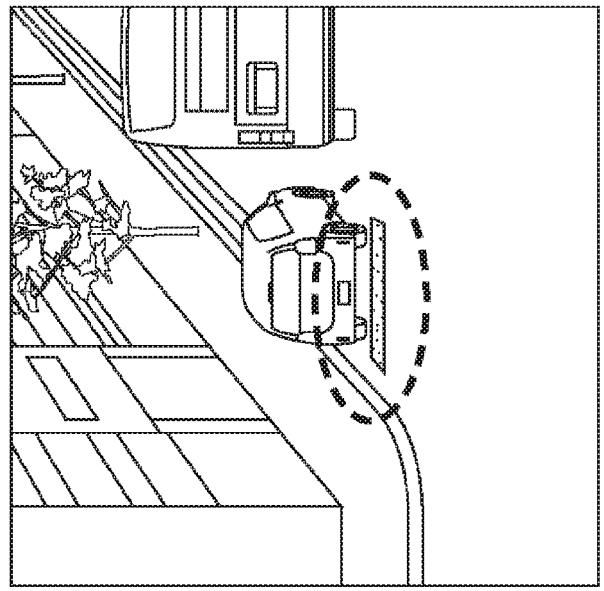

For this reason, in one example, as shown in FIG. 34A, if noise (deterioration of image quality) is accumulated in the decoded image, the noise propagates to other pixels by intra-prediction as shown in FIG. 35B, which is likely to lead to an increase in deterioration of image quality. In other words, the image quality is likely to be deteriorated.

Constrained Intra-Prediction

Thus, in the case of performing simple encoding and simple decoding on the decoded image accumulated in the frame memory as described above, constrained intra-prediction is applied as illustrated in FIG. 36. The constrained intra-prediction is a technique of performing intra-prediction without using neighboring pixels generated by inter-prediction. In one example, in the case of AVC, in a case where inter-predicted blocks exist around the current block, DC prediction is performed as intra-prediction. In addition, in one example, in the case of HEVC, the pixels around the inter-predicted block are filled using values of neighboring pixels of intra-prediction.

Use of such constrained intra-prediction makes it possible to suppress an increase of drift due to intra-prediction. Thus, the deterioration in image quality can be suppressed.

Procedure for Image Coding Processing

Figure 37:
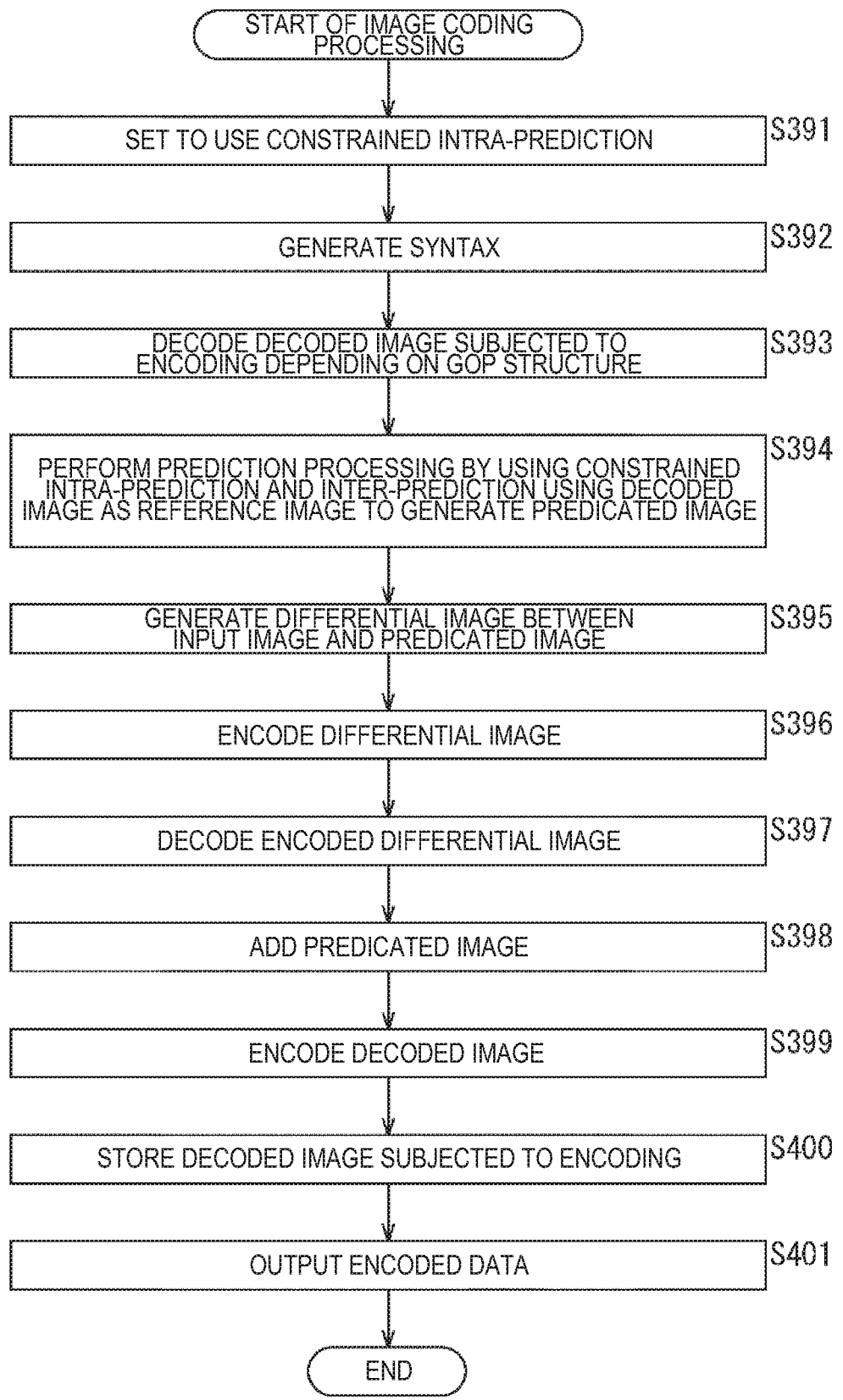
FIG. 37 is a flowchart illustrated to describe an example of a procedure for image coding processing.

Such constrained intra-prediction can also be implemented, in one example, in the image coding device 100 (FIG. 7) described above. In other words, the above-described coding direction is applicable to the image coding device 100. An example of the procedure for the image coding processing in this case is described with reference to the flowchart of FIG. 37.

Upon start of the image coding processing, in step S391, the controller 101 sets so that the constrained intra-prediction is used as intra-prediction in generating the predicted image. In step S392, the high-level syntax generator 113 generates syntax in accordance with the setting in step S391.

In step S393, the decoder 118 acquires simple encoded data of the decoded image from the frame memory 117 and performs simple decoding, depending on the GOP structure. In step S394, the predicted image generator 119 performs prediction processing using constrained intra-prediction and inter-prediction that uses the decoded image as a reference image, and generates a predicted image.

The respective processing operations of steps S395 to S401 are executed in a similar manner to those of steps S105 to S111 of FIG. 11.

The image coding processing performed as described above makes it possible for the image coding device 100 to suppress the increase of drift due to intra-prediction. Thus, the deterioration in image quality can be suppressed.

First Control of Constrained Intra-Prediction

Moreover, execution of constrained intra-prediction may be set to be controlled. Generally, the constrained intra-prediction has lower coding efficiency than that of normal intra-prediction. Thus, execution of constrained intra-prediction may be controlled so that unnecessary execution of constrained intra-prediction is suppressed. In one example, execution of constrained intra-prediction may be controlled on the basis of an image (or image-related information). This makes it possible to suppress the decrease in coding efficiency.

In one example, the control of execution of constrained intra-prediction is performed on a frame basis, but in the case of a frame in which drift is less accumulated (a case where deterioration in image quality is small), the merit obtained by performing constrained intra-prediction is less than in the case of a frame in which drift is much accumulated. Thus, in such a frame, constrained intra-prediction is not necessarily to be executed. In one example, the execution of constrained intra-prediction may be controlled on the basis of a distance (the number of frames) between the current picture and the I-picture. In one example, the constrained intra-prediction may be performed only for a frame separated by a predetermined distance (the number of frames) or more from the I-picture.

Procedure for Constrained Intra-Prediction Control Processing

Figure 38:
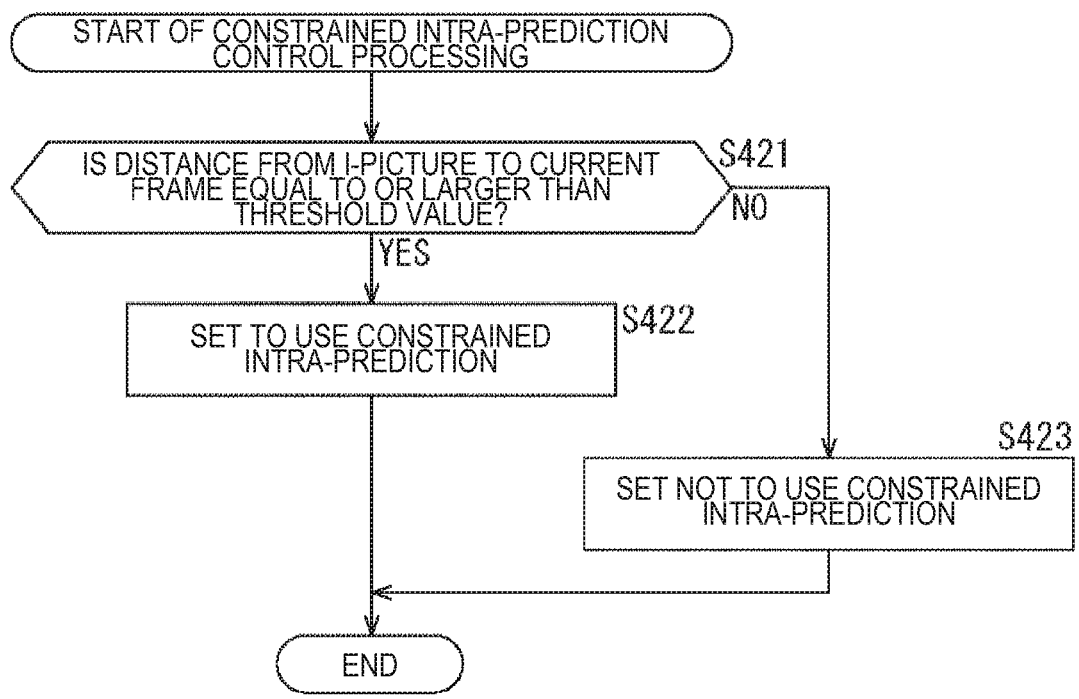
FIG. 38 is a flowchart illustrated to describe an example of a procedure for constrained intra-prediction control processing.

An example of the procedure for constrained intra-prediction control processing of performing such control is described with reference to the flowchart of FIG. 38.

Upon start of the constrained intra-prediction control processing, the controller 101 determines whether or not the distance from the I-picture to the current frame is equal to or larger than a threshold value in step S421. If it is determined that the distance from the I-picture to the current frame is equal to or larger than the threshold value (the number of frames is large), then the processing proceeds to step S422.

In step S422, the controller 101 controls the respective processing components so that they are set to use constrained intra-prediction in the current frame. If the processing of step S422 is terminated, then the constrained intra-prediction control processing is terminated.

Further, if it is determined in step S421 that the distance from the I-picture to the current frame is closer than the threshold (the number of frames is small), then the processing proceeds to step S423. In step S423, the controller 101 controls the respective processing components so that they are set to prevent the constrained intra-prediction in the current frame from being used. Upon completion of the processing of step S423, the constrained intra-prediction control processing is terminated.

This makes it possible to execute the constrained intra-prediction only for a frame in which drift is expected to be much accumulated and to suppress unnecessary execution of constrained intra-prediction, thereby suppressing the decrease in coding efficiency.

Second Control of Constrained Intra-Prediction

Moreover, the execution of constrained intra-prediction may be controlled on the basis of not only the distance from the I-picture but also an integrated value of the difficulty level of simple compression. Generally, if the difficulty level of simple compression is low, the deterioration in image quality (occurrence of noise) due to simple compression is reduced. Thus, in this case, the effect obtained by performing constrained intra-prediction is reduced. Thus, the execution of constrained intra-prediction may be controlled on the basis of the integrated value of the difficulty level of simple compression from the I-picture to the current frame. In one example, in a case where the integrated value of the difficulty level of simple compression is small, the constrained intra-prediction may be set to be prevented from being performed. This makes it possible to suppress the unnecessary execution of constrained intra-prediction, thereby suppressing the decrease in coding efficiency.

Procedure for Constrained Intra-Prediction Control Processing

Figure 39:
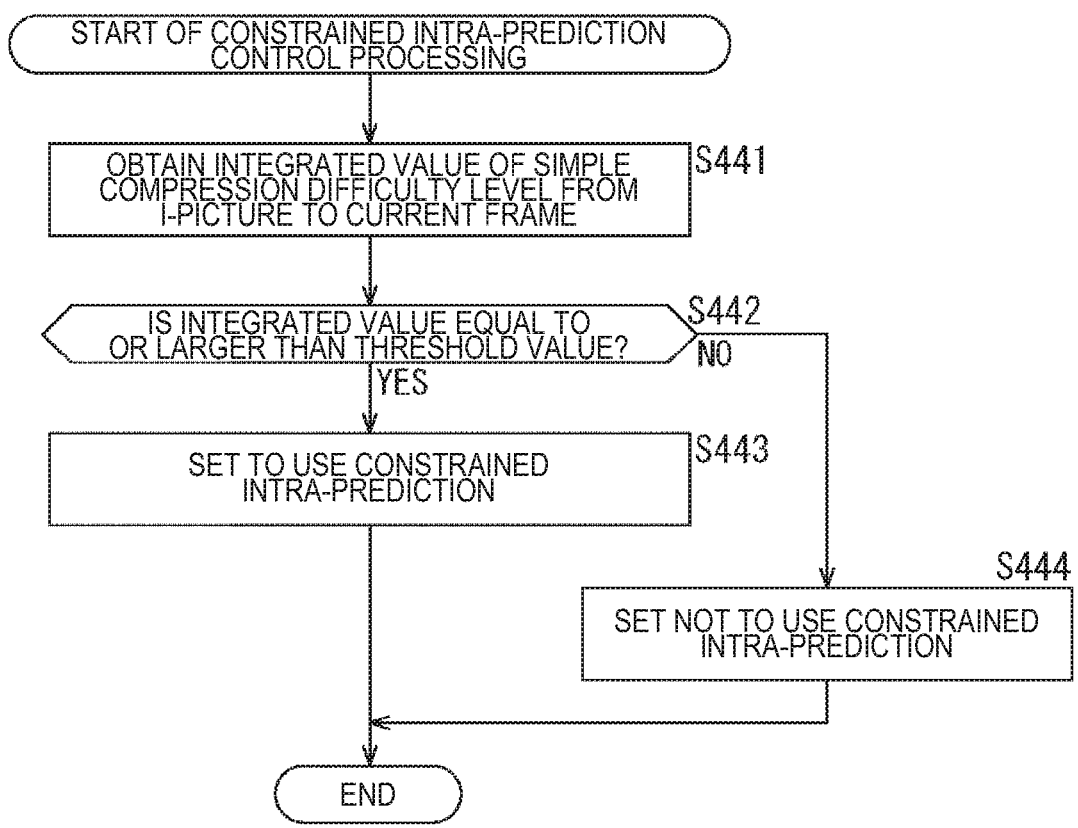
FIG. 39 is a flowchart illustrated to describe an example of a procedure for constrained intra-prediction control processing.

An example of the procedure for constrained intra-prediction control processing of performing such control is described with reference to the flowchart of FIG. 39.

Upon start of the constrained intra-prediction control processing, the controller 101 obtains an integrated value of the difficulty level of simple compression from the I-picture to the current frame in step S441. In step S442, the controller 101 determines whether or not the integrated value of the difficulty degree of simple compression obtained in step S441 is equal to or larger than a predetermined threshold value. If it is determined that the integrated value is equal to or larger than the threshold value, then the processing proceeds to step S443.

In step S443, the controller 101 controls the respective processing components so that they are set to use constrained intra-prediction in the current frame. If the processing of step S443 is terminated, then the constrained intra-prediction control processing is terminated.

On the other hand, if it is determined in step S442 that the integrated value is smaller than the threshold value, then the processing proceeds to step S444. In step S444, the controller 101 controls the respective processing components so that they are set to prevent the constrained intra-prediction in the current frame from being used. Upon completion of the processing of step S444, the constrained intra-prediction control processing is terminated.

This makes it possible to execute the constrained intra-prediction only for a frame in which drift is expected to be much accumulated and to suppress unnecessary execution of constrained intra-prediction, thereby suppressing the decrease in coding efficiency.

Application Examples

Although the above description is based on the use of the image coding device 100, the technique of generating a predicted image using the constrained intra-prediction is applicable to each of the above-described technology. In other words, in one example, it is also applicable to the image coding device 300. In addition, it is also applicable to image coding of AVC or HEVC. In other words, it is applicable to the image coding device 400.

An example of the picture parameter set (PPS) of HEVC in this case is illustrated in FIG. 40. In this case, the encoder 415 sets control information (e.g., Constrained_intra_pred_flag, etc.) relating to constrained intra-prediction, as in a portion surrounded by a frame 552 in the picture parameter set.

This makes it possible for the image coding device 400 to transmit the control information relating to the constrained intra-prediction of HEVC to the decoding side.

Figure 41:
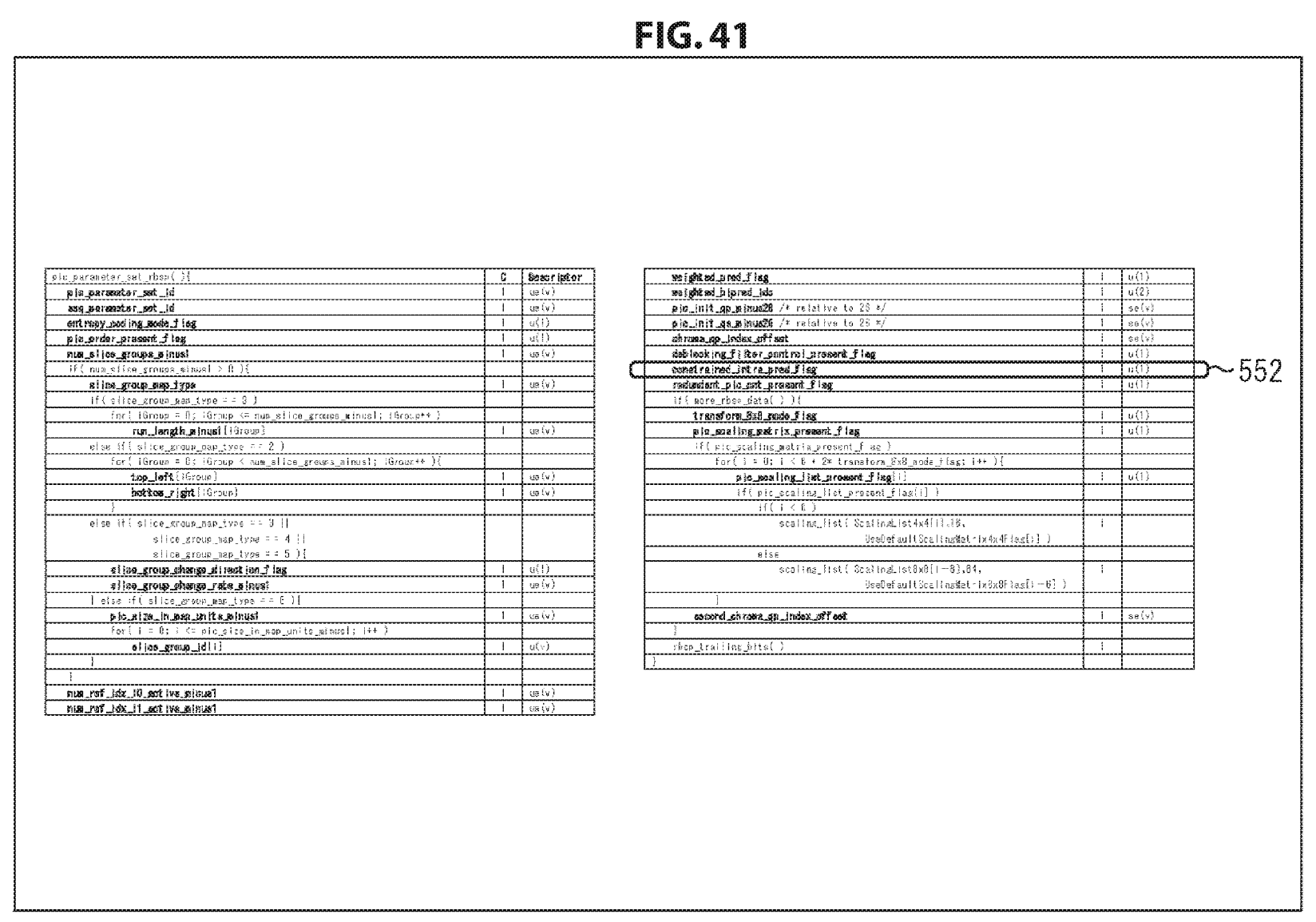

Further, an example of the picture parameter set (PPS) of AVC in this case is illustrated in FIG. 41. In this case, the encoder 415 sets control information (e.g., Constrained_intra_pred_flag, etc.) relating to constrained intra-prediction, as in a portion surrounded by a frame 552 in the picture parameter set of FIG. 41.

This makes it possible for the image coding device 400 to transmit the control information relating to the constrained intra-prediction of AVC to the decoding side.

7. Others

Fields of Application of Present Technology

The system, apparatus, processor, and the like to which the present technology is applied can be used in any fields, such as traffic, medical care, crime prevention, agriculture, livestock industry, mining industry, beauty, factory, household appliance, weather, natural surveillance, or the like.

In one example, the present technology is applicable to systems and devices that transmit an image provided for viewing. In addition, in one example, the present technology is applicable to systems and devices provided for traffic. Furthermore, in one example, the present technology is applicable to systems and devices provided for security. In addition, in one example, the present technology is applicable to systems and devices provided for sports. Furthermore, in one example, the present technology is applicable to systems and devices provided for agriculture. In addition, in one example, the present technology is applicable to systems and devices provided for livestock industry. Furthermore, in one example, the present technology is also applicable to systems and devices for monitoring conditions of natural such as volcanoes, forests, oceans, and the like. In addition, in one example, the present technology is applicable to weather observation systems and weather observation devices for observing weather, temperature, humidity, wind speed, sunshine duration, and the like. Furthermore, in one example, the present technology is also applicable to systems, devices, or the like for observing ecology of wildlife such as birds, fish, reptiles, amphibians, mammals, insects, plants, and the like.

Computer

The series of processes described above can be executed by hardware, and can also be executed in software. In the case of executing the series of processes by software, a program forming the software is installed on a computer. Herein, the term computer includes a computer built into special-purpose hardware, a computer able to execute various functions by installing various programs thereon, such as a general-purpose personal computer, for example, and the like.

Figure 42:
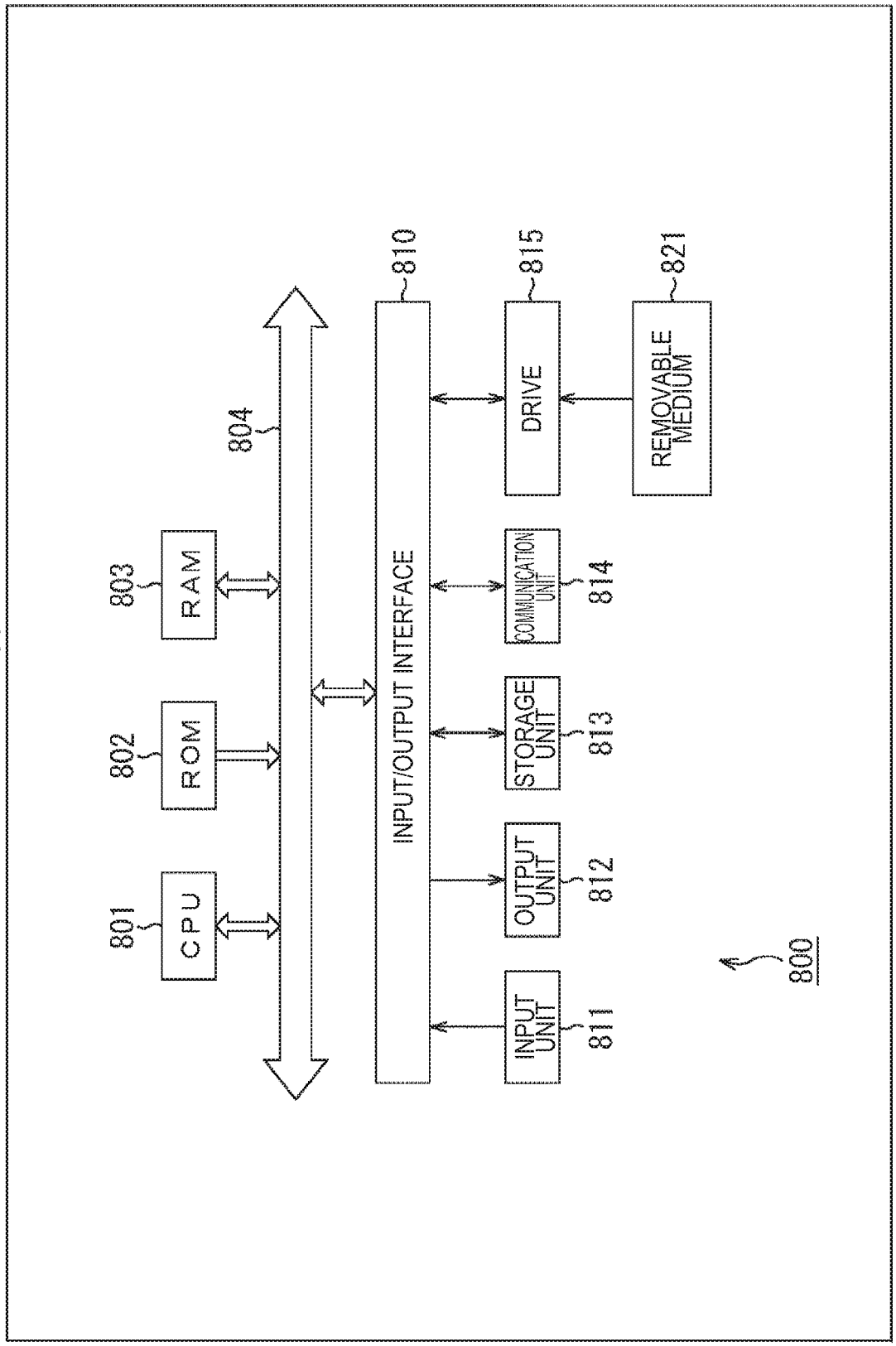
FIG. 42 is a block diagram illustrating an example of a main configuration of a computer.

FIG. 42 is a block diagram illustrating an exemplary hardware configuration of a computer that executes the series of processes described above according to a program.

In the computer 800 illustrated in FIG. 42, a central processing unit (CPU) 801, read-only memory (ROM) 802, and random access memory (RAM) 803 are interconnected through a bus 804.

Additionally, an input/output interface 810 is also connected to the bus 804. An input unit 811, an output unit 812, a storage unit 813, a communication unit 814, and a drive 815 are connected to the input/output interface 810.

The input unit 811 includes a keyboard, a mouse, a microphone, a touch panel, an input terminal, and the like, for example. The output unit 812 includes a display, a speaker, an output terminal, and the like, for example. The storage unit 813 includes a hard disk, a RAM disk, non-volatile memory, and the like, for example. The communication unit 814 includes a network interface, for example. The drive 815 drives a removable medium 821 such as a magnetic disk, an optical disc, a magneto-optical disc, or semiconductor memory.

In a computer 800 configured as above, the series of processes described above are performed by having the CPU 801 load a program stored in the storage unit 813 into the RAM 803 via the input/output interface 810 and the bus 804, and execute the program, for example. Additionally, data required for the CPU 801 to execute various processes and the like is also stored in the RAM 803 as appropriate.

The program executed by the computer 800 may be applied by being recorded onto the removable medium 821 as an instance of packaged media or the like, for example. In this case, the program may be installed in the storage unit 813 via the input/output interface 810 by inserting the removable medium 821 into the drive 815.

In addition, the program may also be provided via a wired or wireless transmission medium such as a local area network, the Internet, or digital satellite broadcasting. In this case, the program may be received by the communication unit 814 and installed in the storage unit 813.

Otherwise, the program may also be preinstalled in the ROM 802 or the storage unit 813.

Other Matters

Moreover, various types of information relating to the encoded data (bit stream) may be multiplexed in the encoded data and transmitted or recorded, or may be transmitted or recorded as individual data associated with the encoded data without being multiplexed in the encoded data. The term "associated with" used herein means, in one example, that when one data is processed, other data can be used (linkable). In other words, the data associated with each other may be collected as one data or may be individual data. In one example, information associated with encoded data (image) may be transmitted on a transmission path different from that of the encoded data (image). In addition, in one example, the information associated with encoded data (image) may be recorded on a recording medium (or other recording areas of the same recording medium) different from that of the encoded data (image). Moreover, this term "associated with" may be a part of data, not the entire data. In one example, an image and information corresponding to the image may be associated with each other in any units such as a plurality of frames, one frame, a part within a frame, or the like.

Further, as described above, herein, the terms "combine", "multiplex", "attach", "integrate", "include", "store", "push into", "put into", "insert", and the like mean combining a plurality of objects into one, for example, combining encoded data and metadata into a single data item, which means one usage of "associated with" described above.

In addition, an embodiment of the present technology is not limited to the embodiments described above, and various changes and modifications may be made without departing from the scope of the present technology.

In one example, in this specification, a system means a set of a plurality of constituent elements (e.g., devices or modules (parts)), regardless of whether or not all the constituent elements are in the same housing. Accordingly, a plurality of devices that is contained in different housings and connected via a network and one device in which a plurality of modules is contained in one housing are both systems.

Further, for example, an element described as a single device (or processing unit) may be divided and configured as a plurality of devices (or processing units). Conversely, elements described as a plurality of devices (or processing units) above may be configured collectively as a single device (or processing unit). Further, an element other than those described above may be added to the configuration of each device (or processing unit). Furthermore, a part of the configuration of a given device (or processing unit) may be included in the configuration of another device (or another processing unit) as long as the configuration or operation of the system as a whole is substantially the same.

In addition, for example, the present technology can adopt a configuration of cloud computing which performs processing by allocating and sharing one function by a plurality of devices through a network.

In addition, for example, the program described above can be executed in any device. In this case, it is sufficient if the device has a necessary function (functional block or the like) and can obtain necessary information.

In addition, for example, each step described by the above-described flowcharts can be executed by one device or executed by being allocated to a plurality of devices.

Furthermore, in the case where a plurality of processes is included in one step, the plurality of processes included in this one step can be executed by one device or executed by being allocated to a plurality of devices.

Note that in a program executed by a computer, processing in steps describing the program may be executed chronologically along the order described in this specification, or may be executed concurrently, or individually at necessary timing such as when a call is made. In other words, unless a contradiction arises, processing in the steps may be executed in an order different from the order described above. Furthermore, processing in steps describing the program may be executed concurrently with processing of another program, or may be executed in combination with processing of another program.

Note that the plurality of present technologies described in this specification can be performed alone independently of each other, unless a contradiction arises. Of course, any plurality of the present technologies can be performed in combination. In one example, the present technology described in any of the embodiments can be performed in combination with the present technology described in another embodiment. In addition, any of the present technologies described above can be performed in combination with another technology that is not described above.

Additionally, the present technology may also be configured as below.

(1)

An image processing apparatus including:
a predicated image generator configured to generate a predicated image using inter-prediction and constrained intra-prediction, the inter-prediction using as a reference image an image of a past frame processed before a current frame, the constrained intra-prediction using no neighboring pixels subjected to inter-prediction, the image of the past frame being encoded, stored in a frame memory, read from the frame memory, and then decoded.

(2)

The image processing apparatus according to (1), further including:
a controller configured to control whether or not constrained intra-prediction is performed as intra-prediction on the basis of an image.

(3)

The image processing apparatus according to (2),
in which the controller controls whether or not constrained intra-prediction is performed as intra-prediction on the basis of a distance between a current frame and an I-picture.

(4)

The image processing apparatus according to (2),
in which the controller controls whether or not constrained intra-prediction is performed as intra-prediction on the basis of an integrated value of coding difficulty levels from an I-picture to a current frame in storing in the frame memory.

(5)

The image processing apparatus according to any of (1) to (4), further including:
a control information generator configured to generate control information relating to the constrained intra-prediction.

(6)

The image processing apparatus according to any of (1) to (5),
in which the image of the past frame is encoded and stored in the frame memory as an image of a long-term reference frame or a short-term reference frame, and
the predicted image generator is configured to generate the predicated image using inter-prediction and the constrained intra-prediction, the inter-prediction using as a reference image an image of the long-term reference frame or the short-term reference frame, which is decoded after being read from the frame memory.

(7)

The image processing apparatus according to (6),
in which the long-term reference frame is updated at a predetermined period longer than the short-term reference frame, and
the predicted image generator is configured to, in the inter-prediction, refer to the image of the long-term reference frame in a case where a current frame is a frame having an interval of the period and refer to the image of the short-term reference frame in a case where a current frame is an other frame.

(8)

The image processing apparatus according to (7),
in which the predicted image generator, in the case where a current frame is the other frame, adaptively selects whether to refer to the image of the short-term reference frame or to refer to the image of the long-term reference frame.

(9)

The image processing apparatus according to (8),
in which the predicted image generator refers to the image of the long-term reference frame in a case where a difference between a current frame and an immediate previous frame is equal to or larger than a difference between the current frame and the long-term reference frame.

(10)

The image processing apparatus according to (7), further including:
a controller configured to control a length of the period.
The image processing apparatus according to (10),
in which the controller decreases the period in a case where a difference between a current frame and the long-term reference frame is equal to or larger than a predetermined threshold value.

(12)

The image processing apparatus according to (10),
in which the controller increases the period in a case where a difference between a current frame and the long-term reference frame is smaller than a predetermined threshold value.

(13)

The image processing apparatus according to (6),
in which the long-term reference frame is fixed to an I-picture, and
the predicated image generator is configured to, in the inter-prediction, refer to an image of an I-picture set in the long-term reference frame in a case where a current frame is a frame having an interval of a predetermined period longer than the short-term reference frame and refer to the image of the short-term reference frame in a case where a current frame is an other frame.

(14)

The image processing apparatus according to (13),
in which the predicted image generator, in the case where a current frame is the other frame, adaptively selects whether to refer to the image of the short-term reference frame or to refer to the image of the I-picture.

(15)

The image processing apparatus according to (14),
in which the predicted image generator refers to the image of the I-picture in a case where a difference between a current frame and an immediate previous frame is equal to or larger than a difference between the current frame and the long-term reference frame.

(16)

The image processing apparatus according to (6), further including:
a selection unit configured to adaptively select
whether the predicated image generator is configured to, in the inter-prediction, refer to the image of the long-term reference frame being updated at a predetermined period longer than the short-term reference frame in a case where a current frame is a frame having an interval of the period and refer to the image of the short-term reference frame in a case where a current frame is an other frame, or
whether the predicated image generator is configured to, in the inter-prediction, refer to an image of an I-picture set in the long-term reference frame being fixed to an I-picture in a case where a current frame is a frame having an interval of a predetermined period longer than the short-term reference frame and refer to the image of the short-term reference frame in a case where a current frame is an other frame.

(17)

The image processing apparatus according to (16),
in which the selection unit performs selection depending on whether or not a difference between a current frame and a long-term reference frame is equal to or larger than a predetermined threshold value.

(18)

The image processing apparatus according to any of (6) to (17), further including:
a controller configured to control whether or not to encode the image of the past frame to be stored in the frame memory,
in which the predicted image generator, in a case where the image of the past frame is controlled to be encoded by the controller, is configured to generate the predicated image using inter-prediction and the constrained intra-prediction, the inter-prediction using as a reference image an image of the long-term reference frame or the short-term reference frame, which is decoded after being read from the frame memory.

(19)

The image processing apparatus according to any of (1) to (18), further including:
a differential image generator configured to generate a differential image between an input image and the predicted image generated by the predicted image generator;
a first encoder configured to encode the differential image generated by the differential image generator;
a first decoder configured to decode encoded data of the differential image obtained by the first encoder;
a second encoder configured to encode decoded image of the differential image obtained by the first decoder;
the frame memory storing encoded data of the decoded image obtained by the second encoder as an encoded image of the past frame; and
a second decoder configured to decode the encoded image of the past frame read from the frame memory.

(20)

An image processing method including:
generating a predicated image using inter-prediction and constrained intra-prediction, the inter-prediction using as a reference image an image of a past frame processed before a current frame, the constrained intra-prediction using no neighboring pixels subjected to inter-prediction, the image of the past frame being encoded, stored in a frame memory, read from the frame memory, and then decoded.

REFERENCE SIGNS LIST 100 image coding device
101 controller
111 arithmetic operation unit
112 differential encoder
113 high-level syntax generator
114 differential decoder
115 arithmetic operation unit
116 encoder
117 frame memory
118 decoder
119 predicted image generator
300 image coding device
301 controller
311 selection unit
312 frame memory
313 selection unit
400 image coding device
401 controller
411 screen rearrangement buffer
412 arithmetic operation unit
413 orthogonal transformer
414 quantizer
415 encoder
416 accumulation buffer
417 inverse quantizer
418 inverse orthogonal transformer
419 arithmetic operation unit
420 intra-predictor
421 filter
422 encoder
423 frame memory
424 decoder
425 inter-predictor
426 predicted image selection unit
427 rate control unit
800 computer

The invention claimed is:

1. An image processing apparatus, comprising:
a processor configured to:
generate a predicted image based on inter-prediction and constrained intra-prediction, wherein
the inter-prediction is based on a reference image,
the reference image is an image of a past frame processed before a current frame, and
the reference image is accessed from a frame memory; and
determine that a distance between the current frame and an I-picture is equal to or larger than a threshold value; and
control execution of the constrained intra-prediction as intra-prediction based on the determination that the distance between the current frame and the I-picture is equal to or larger than the threshold value, wherein the constrained intra-prediction is executed using no neighboring pixels subjected to the inter-prediction.

2. The image processing apparatus according to claim 1, wherein the constrained intra-prediction is executed as the intra-prediction based on an integrated value of coding difficulty levels from the I-picture to the current frame stored in the frame memory.

3. The image processing apparatus according to claim 1, wherein the processor is further configured to generate control information related to the constrained intra-prediction.

4. The image processing apparatus according to claim 1, wherein
the image of the past frame is encoded and stored in the frame memory as one of an image of a long-term reference frame or a short-term reference frame, and
the processor is further configured to generate the predicted image based on the inter-prediction and the constrained intra-prediction, wherein the inter-prediction is based on one of the long-term reference frame or the short-term reference frame, which is decoded after being read from the frame memory.

5. The image processing apparatus according to claim 4, wherein
the long-term reference frame is updated at a determined period longer than the short-term reference frame, and
the processor is further configured to:
in the inter-prediction:
refer to the image of the long-term reference frame in a case where the current frame is a first frame having an interval of the determined period; and
refer to the image of the short-term reference frame in a case where the current frame is a second frame different from the first frame.

6. The image processing apparatus according to claim 5, wherein the processor is further configured to adaptively select one of the image of the short-term reference frame or the image of the long-term reference frame based on the current frame is the second frame.

7. The image processing apparatus according to claim 6, wherein the selection of the image of the long-term reference frame is further based on a difference between the current frame and an immediate previous frame that is equal to or larger than a difference between the current frame and the long-term reference frame.

8. The image processing apparatus according to claim 5, wherein the processor is further configured to control a length of the determined period.

9. The image processing apparatus according to claim 8, wherein the processor is further configured to decrease the length of the determined period based on a difference between the current frame and the long-term reference frame that is equal to or larger than a determined threshold value.

10. The image processing apparatus according to claim 8, wherein the processor is further configured to increase the length of the determined period based on a difference between the current frame and the long-term reference frame that is smaller than a determined threshold value.

11. The image processing apparatus according to claim 4, wherein
the long-term reference frame is fixed to the I-picture, and
the processor, in the inter-prediction, is further configured to:
refer to an image of the I-picture set in the long-term reference frame in a case where the current frame is a first frame having an interval of a determined period longer than the short-term reference frame; and
refer to the image of the short-term reference frame in a case where the current frame is a second frame different from the first frame.

12. The image processing apparatus according to claim 11, wherein the processor is further configured to adaptively select one of the image of the short-term reference frame or the image of the I-picture based on the current frame is the second frame.

13. The image processing apparatus according to claim 12, wherein the selection of the image of the I-picture is further based on a difference between the current frame and an immediate previous frame that is equal to or larger than a difference between the current frame and the long-term reference frame.

14. The image processing apparatus according to claim 4, the processor is further configured to adaptively select one of:
the image of the long-term reference frame being updated at a determined period longer than the short-term reference frame in a case where the current frame is a first frame having an interval of the determined period and refer to the image of the short-term reference frame in a case where the current frame is a second frame different from the first frame; or
an image of the I-picture set in the long-term reference frame being fixed to the I-picture in a case where the current frame is a third frame having the interval of the determined period longer than the short-term reference frame and refer to the image of the short-term reference frame in a case where the current frame is a fourth frame different from the third frame.

15. The image processing apparatus according to claim 14, wherein the selection of one of the image of the long-term reference frame or the I-picture is based on a difference between the current frame and the long-term reference frame that is equal to or larger than a determined threshold value.

16. The image processing apparatus according to claim 4, the processor is further configured to:
control encoding of the image of the past frame to be stored in the frame memory; and
generate the predicted image based on the inter-prediction and the constrained intra-prediction, wherein the inter-prediction is based on the of one of the long-term reference frame or the short-term reference frame, which is decoded after being read from the frame memory.

17. The image processing apparatus according to claim 1, wherein the processor is further configured to:
generate a differential image between an input image and the predicted image;
encode, by a first encoder, the differential image;
decode, by a first decoder, encoded data of the differential image obtained by the first encoder;
encode, by a second encoder, decoded image of the differential image obtained by the first decoder;
store encoded data of the decoded image obtained by the second encoder as an encoded image of the past frame in the frame memory; and
decode, by a second decoder, the encoded image of the past frame read from the frame memory.

18. An image processing method, comprising:
generating a predicted image based on inter-prediction and constrained intra-prediction, wherein
the inter-prediction is based on a reference image of a past frame processed before a current frame, the reference image is accessed from a frame memory; and determining that a distance between the current frame and an I-picture is equal to or larger than a threshold value; and controlling execution of the constrained intra-prediction as intra-prediction based on the determination that the distance between the current frame and the I-picture is equal to or larger than the threshold value, wherein the constrained intra-prediction is executed using no neighboring pixels subjected to the inter-prediction.

* * * * *